United States Patent
Barone et al.

(10) Patent No.: US 7,705,743 B2
(45) Date of Patent: Apr. 27, 2010

(54) SELF-ASSEMBLING WIRELESS NETWORK, VEHICLE COMMUNICATIONS SYSTEM, RAILROAD WHEEL AND BEARING MONITORING SYSTEM AND METHODS THEREFOR

(75) Inventors: Gerard A. Barone, Orlando, FL (US); Jason O. Breitfeller, Viera, FL (US); David Andrew Jacobs, Winter Springs, FL (US); Charles W. Nyquist, Londwood, FL (US); Roger E. Rose, Jr., Orlando, FL (US)

(73) Assignee: L-3 Communications Corporation, New York, NY (US)

( * ) Notice: Subject to any disclaimer, the term of this patent is extended or adjusted under 35 U.S.C. 154(b) by 408 days.

(21) Appl. No.: 11/655,672

(22) Filed: Jan. 19, 2007

(65) Prior Publication Data
US 2007/0208841 A1    Sep. 6, 2007

Related U.S. Application Data

(60) Provisional application No. 60/778,502, filed on Mar. 1, 2006.

(51) Int. Cl.
*G08B 21/00* (2006.01)
(52) U.S. Cl. .................. 340/682; 246/169 A
(58) Field of Classification Search ........... 340/682, 340/686.1, 933; 246/167 R, 169 S, 169 A
See application file for complete search history.

(56) References Cited

U.S. PATENT DOCUMENTS 3,718,040 A    2/1973    Freeman et al.

(Continued)

FOREIGN PATENT DOCUMENTS

DE    19827931 C1    12/1999

(Continued)

OTHER PUBLICATIONS

US Department of Transportation Federal Railroad Administration: "Developed Wheel and Axle Assembly Monitoring System to Improve Passenger Train Safety", www.fra.dot.gov/downloads/Research/rr00_02.pdf, Mar. 2000.

(Continued)

*Primary Examiner*—John A Tweel, Jr.
(74) *Attorney, Agent, or Firm*—Tiajoloff & Kelly LLP

(57) ABSTRACT

A low power self-organizing network is made up of a plurality of wireless communication nodes communicating wirelessly with each other. The nodes each have a sensor providing a respective sensor data value indicative of a physical parameter in the environment of that node. The wireless network discontinues communication with any nodes in which the sensor data value is outside a range of network sensor data values. The network is preferably a group of vehicles moving together, especially a train in which each node is associated with a respective wheel of a railroad car. The nodes are low-power devices that communicate using wireless communications according to a Zigbee protocol. The nodes each have an additional sensor sensing a physical parameter the respective wheel thereof and determines from said electrical signal a degree of degradation of a bearing of the wheel, and transmits data of the degree of degradation to the main node. The main node communicates with another computer system using a higher power communication system and transmits thereto data indicative of degradation of said bearings.

66 Claims, 35 Drawing Sheets

U.S. PATENT DOCUMENTS

| | | | |
|---|---|---|---|
| 4,119,284 | A | 10/1978 | Belmont |
| 4,812,826 | A | 3/1989 | Kaufman et al. |
| 5,150,618 | A * | 9/1992 | Bambara .................... 340/682 |
| 5,356,098 | A * | 10/1994 | Post ....................... 246/169 A |
| 5,381,700 | A * | 1/1995 | Grosskopf, Jr. ............. 340/682 |
| 5,438,322 | A | 8/1995 | Martin et al. |
| 5,633,628 | A | 5/1997 | Denny et al. |
| 6,535,135 | B1 * | 3/2003 | French et al. ............... 340/682 |
| 7,034,711 | B2 * | 4/2006 | Sakatani et al. ............. 340/682 |
| 7,184,930 | B2 * | 2/2007 | Miyasaka et al. ....... 246/169 A |
| 2004/0036621 | A1 * | 2/2004 | Morita et al. ............... 340/682 |
| 2007/0152107 | A1 * | 7/2007 | LeFebvre et al. ........ 246/169 R |
| 2008/0195265 | A1 * | 8/2008 | Searle et al. .................. 701/19 |
| 2009/0001226 | A1 * | 1/2009 | Haygood ................ 246/169 S |

FOREIGN PATENT DOCUMENTS

| | | |
|---|---|---|
| DE | 10307950 A1 | 9/2004 |
| DE | 10/2006/035703 A1 | 2/2008 |
| EP | 0288155 A | 10/1988 |
| WO | 96/02903 A | 2/1996 |
| WO | 2004/076257 A1 | 9/2004 |
| WO | 2008/014766 A1 | 2/2008 |
| WO | 2008/080211 A | 7/2008 |
| WO | 2009/109200 A1 | 9/2009 |

OTHER PUBLICATIONS

Donelson, J. III, and Dicus, R.L, "Bearing Defect Detection Using On-Board Accelerometer Measurements", Proceedings of the 2002 ASME/IEEE Joint Rail Conference, Washington D.C., Apr. 23-25, 2002.

Azovtsev, A.Y., et al., "Improving the Accuracy of Rolling Element Bearing Condition Assessment", www.vibrotek.com/articles/abcvi96/abcvi96.htm (1996).

Azovtsev, A.Y., Barkov, A.V. and Yudin, I.A., "Automatic Diagnostics and Condition Prediction of Rolling Element Bearings Using Enveloping Methods", www.vibrotek.com/articles/new94vi/index.htm (1994).

Barkov, A.V. and Barkova, N.A., "The Artificial Intelligence Systems for Machine Condition Monitoring and Diagnostics by Vibration", www.vibrotek.com/article.php?article=articles/intelect-eng/index.htm (1999).

Barkov, A.V., "The Capabilities of the New Generation of the Monitoring and Diagnostic Systems", www.vibrotek.com/articles/metale/index.htm (1998).

Reliability Direct, Sales Technology, Inc., "Field Application Notes, Rolling Element Bearings", www.reliabilitydirect.com/appnotes/reb.html (2001).

Howard, I., "A Review of Rolling Element Bearing Vibration, Detection, Diagnosis and Prognosis", Research Report DSTO-RR-0013, Aeronautical and Maritime Research Laboratory Airframes and Engines Division, Department of Defence, Defence Science and Technology Organization (DSTO), Oct. 1994, Melbourne, Victoria, Australia.

US Department of Transportation Federal Railroad Administration, "On-Board Condition Monitoring System", www.fra.dot.gov/us/printcontent/1446, Mar. 29, 2004.

Bladon, K., Rennison, G., Izbinsky, R., Tracy, R. and Bladon, T., "Predictive Condition Monitoring of Railway Rolling Stock", Railway Technical Society of Australasia, Conference on Railway Engineering, Darwin, Jun. 20-23, 2004.

Krishnappa, G. and Donovan, M. "TP 13472E Railway Bearing Diagnostics Laboratory Data Analysis", National Research Council Canada, Vancouver, Canada, Sep. 1999.

US Department of Transportation Federal Railroad Administration, "Acoustic Detection of Roller Bearing Defects: Phase II, Field Test", Final Report, National Technical Information Service, Springfield, VA, www.fra.dot.gov/downloads/Research/ord0066ii.pdf, Aug. 2003.

US Department of Transportation Federal Railroad Administration, "Acoustic Detection of Roller Bearing Defects: Phase III, System Evaluation Test", Final Report, National Technical Information Service, Springfield, VA, www.fra.dot.gov/downloads/Research/ord0066iii.pdf, Aug. 2003.

Amsted Rail Group, "Technical Forum, Bearing Life, Fatigue Life vs. Service Life in Freight Car Applications", www.amstedrail.com/tech_sheets/9001.asp (2006).

Timken, "Calculate Bearing Life", www.timken.com/en-us/Knowledge/engineers/Pages/BearingLife.aspx (2009).

Miettinen et al., "Acoustic Emission in Monitoring Extremely Slowly Rotating Rolling Bearings", Proceedings of COMADEM '99. Oxford, Coxmoor Publishing Company, 1999, ISB 1-901892-13-1, pp. 289-297.

SKF Reliability Systems, "Early Warning Fault Detection in Rolling Element Bearings Using Microlog Enveloping", Application Note CM3021, Feb. 2000.

* cited by examiner

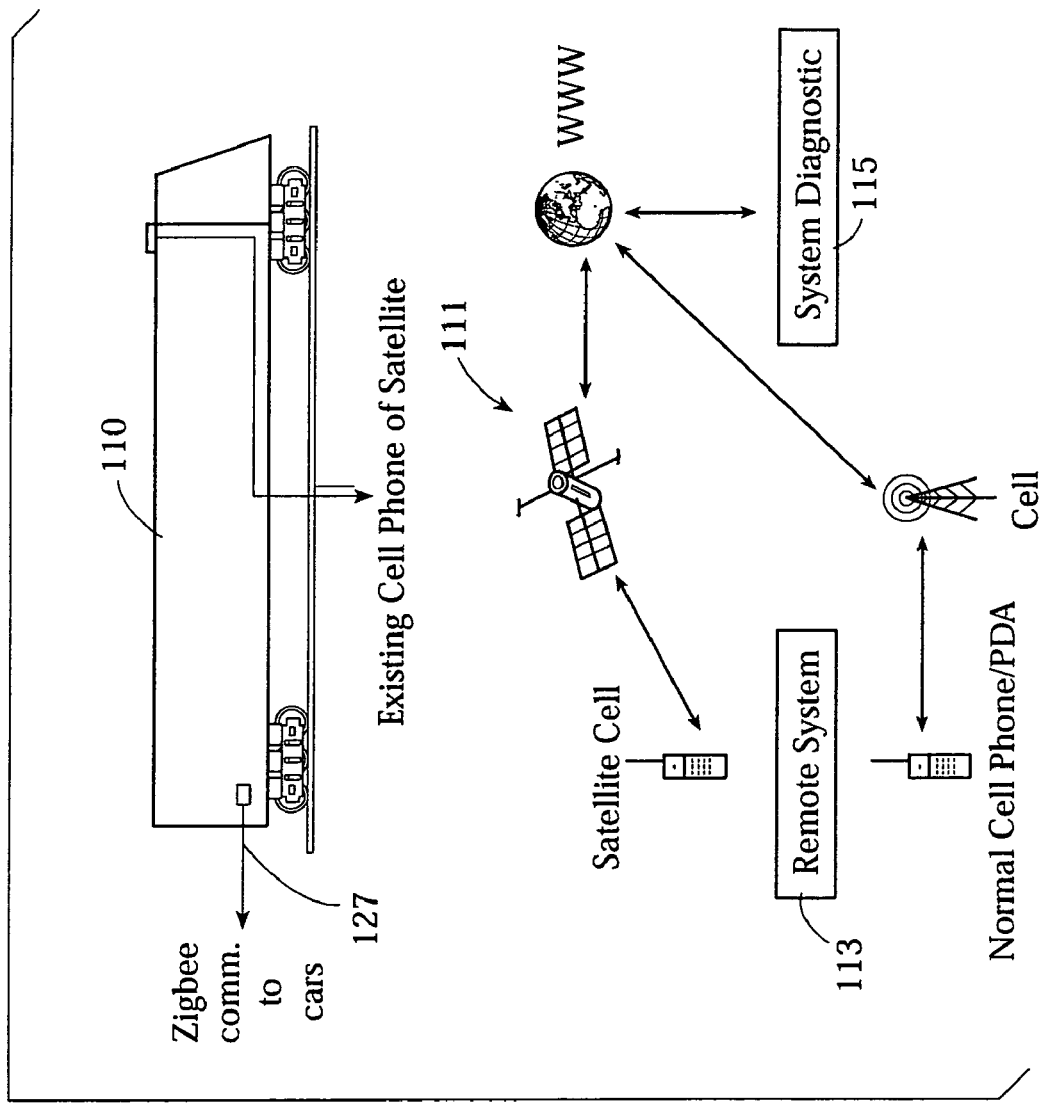

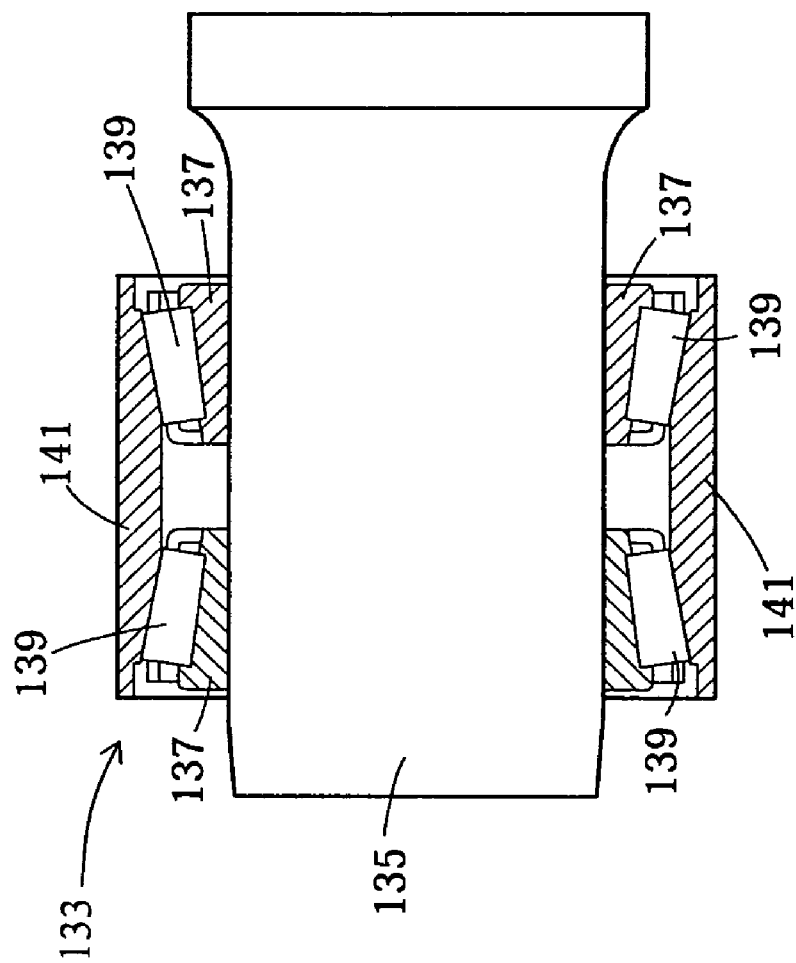

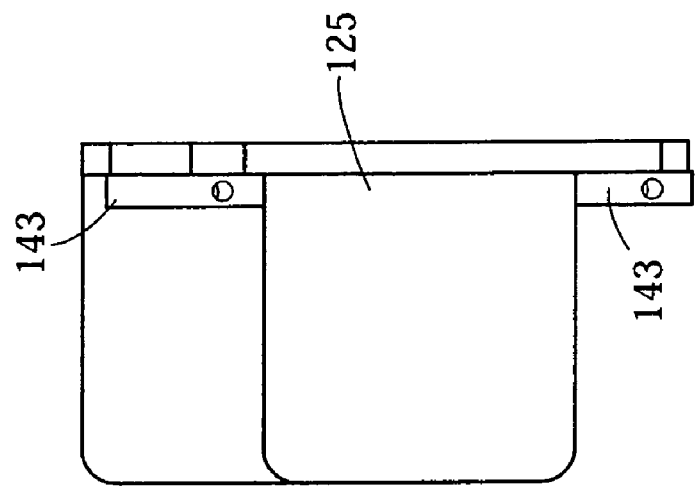
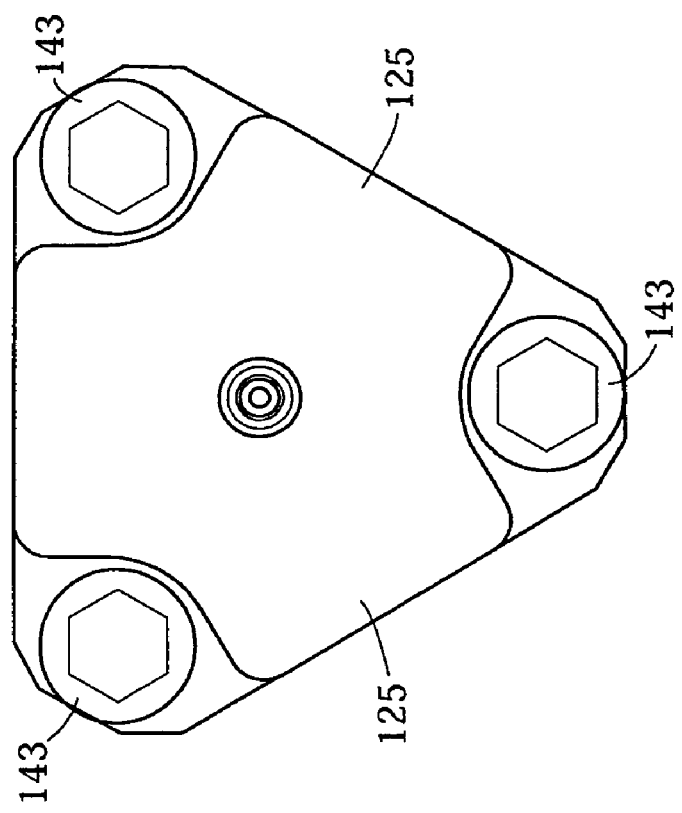
FIG. 4C
FIG. 4B

SELF-ASSEMBLING WIRELESS NETWORK, VEHICLE COMMUNICATIONS SYSTEM, RAILROAD WHEEL AND BEARING MONITORING SYSTEM AND METHODS THEREFOR

RELATED APPLICATIONS

This application claims the benefit of U.S. provisional application 60/778,502 filed on Mar. 1, 2006, which is herein incorporated by reference in its entirety.

FIELD OF THE INVENTION

This invention relates to the field of networked wireless communications, and more particularly to wireless self-assembling networks that assemble communication nodes that each can sense some common environmental parameter. In an especially preferred application, this invention relates to the field of wirelessly networking vehicles, especially where the vehicles are railroad cars, and where the communications are part of a system for monitoring the degree of wear on the wheel bearings of railroad cars.

BACKGROUND OF THE INVENTION

In a typical wireless communication application, every active receiver and transmitter in range joins the network, although in some applications ID numbers are assigned to transmitter and receiver nodes so that only nodes with allowed ID numbers join the network. Consequentially, in prior art network schemes, the nodes of the network are defined either by range or by prior definition based on pre-assigned ID numbers for the nodes participating.

Systems that access all nodes in range may include unnecessary nodes that use up bandwidth of the network. Bandwidth is an issue in common networks, which do not address wide bandwidth signal acquisition due to monitoring hardware and wireless communication bandwidth limitations. The common commercial communication bands, e.g., Bluetooth and Zigbee, do not support wide bandwidth transmission. Wide bandwidth transmissions are generally only provided by military wireless bands or by expensive commercial civilian bands.

On the other hand, systems relying on node IDs are inflexible and may fail to pick up nodes that appropriately should be in the network due to various reasons, such as a failure to include a particular node ID in the list of nodes, or based on a lack of information that the node should be in the network.

In the specific area of railroad cars, no suitable systems exist for properly monitoring them in real time, particularly in the area of monitoring wear and performing predictive maintenance of the bearings of the railroad cars. Bearing failures of individual railcars are responsible for expensive and potentially disastrous derailments.

A number of trackside systems have been developed for monitoring bearing wear and other aspects of individual railroad car operation and movement of common rolling stock, including wayside monitoring systems such as Hot Box Detector (HBD), Trackside Acoustic Detection System (TADS) and Wheel Impact Load Detector (WILD), in which detectors adjacent the railroad track detects passing railroad cars and derives data from them that may indicate a problem with an individual railroad car. These systems can be said to work adequately for the vast majority of existing rolling stock applications, but, as speed of the passing railcars increases, there is less and less time to detect and react to potential problems, since these systems do not provide continuous real-time data. This could theoretically be improved by increasing the number (and thus decreasing the distance) between wayside monitoring systems, allowing more communication with each railcar, but this involves substantial cost associated with installation and maintenance of the trackside detectors.

As can be seen by the bibliography and references listed below, all of which are herein incorporated by reference, the possibility of onboard monitoring devices has been investigated. However, these earlier efforts or devices did not address:

Ease of use and installation
Long power life or power generation
Onboard data processing yielding OK, Caution or Danger status
Viable communication schemes.

These attributes are necessary for a feasible, practical and economical end item product.

A substantial problem is that wireless systems of the prior art that perform on-board monitoring require substantial amounts of electrical energy to power them. Due to the duration of use of railway cars, the long distances they cover, and the fact that they do not usually have their own source of electrical energy, these systems are not optimal.

Literature of on-board monitoring of railway cars reveals the following:

RR00-02, US Department of Transportation Federal Railroad Administration, "Developed Wheel and Axle Assembly Monitoring System to Improve Passenger Safety", www.fra.dot.gov/downlods/Research/rr00-02.pdf, March 2000, incorporated herein by reference.

The Federal Railroad Administration (FRA) sponsored test of two systems. The program was initiated in 1995 and the results published in 2000. (www.fra.dot.gov/downlods/Research/rr00-02.pdf), incorporated herein by reference.

The FRA sponsored a program in 1999 with Science Applications International Corporation (SAIC) as the prime contractor. The resulting publication, J. Donelson III and R. L. Dicus, "Bearing Defect Detection Using On-Board Accelerometer Measurements", Proceedings of 2002 ASME/IEEE Joint Rail Conference, Washington, D.C., 23-25 Apr. 2002, incorporated herein by reference, discusses advantages of onboard monitoring and the enveloping signal processing method which is widely acclaimed in other publications. Other discussions of the enveloping technique can be found in A. Y. Azovtsev and A. V. Barkov, "Improving The Accuracy Of Rolling Element Bearing Condition Assessment", www.vibrotek.com/articles/abcvi96/abcvi96.htm, Y. A. Azovtsev, A. V. Barkov and I. A. Yudin, "Automatic Diagnostics And Condition Monitoring Of Rolling Element Bearings Using Enveloping Techniques", www.vibrotek.com/articles/new94vi/index.htm, A. V. Barkov and N. A. Barkov, "The Artificial Intelligence Systems For Machine Condition Monitoring And Diagnostics By Vibration", www.vibrotek.com/articles/intelect-englindex.htm, A. V. Barkov, "The Capabilities Of The New Generation Of The Monitoring And Diagnostic Systems", www.vibrotek.com/articles/metal-e/index.htm, D. Gluzman, "Recognizing Impending Bearing Failure", Reliability Magazine, June, 2001, Reliability Direct, Sales Technology, Inc., "Field Application Notes, Rolling Element Bearings", www.reliabilitydirect.com/appnotes/reb.html, and I. Howard, "A Review Of Rolling Element Bearing Vibration, Detection, Diagnosis and Prognosis", Research Report DSTO-RR-0013, Aeronautical and Maritime Research Laboratory Airframes and Engines Division, Department Of Defense, Defense Science And Technology Organization (DSTO), to mention a few, all of which are incorporated herein by reference.

The FRA web site, US Department of Transportation Federal Railroad Administration, Current Projects, Rolling Stock & Components, On-Board Condition Monitoring System (OBCMS), www.fra.dot.gov/us/content/926, incorporated herein by reference, discusses the On-Board Condition Monitoring System (OBCMS) including a demonstration of data collected in 2004.

Also of possible relevance is K. Bladon, D. Rennison, G. Izbinsky, R. Tracy, T. Bladon, "Predictive Condition Monitoring Of Railway Rolling Stock", Railway Technical Society Of Australasia, Conference On Railway Engineering, Darwin, 20-23 Jun. 2004, also incorporated herein by reference.

All of the above demonstrated successful monitoring and bearing diagnostic capability using the available bulky power consuming technologies. It appears, however, that development of onboard monitoring systems was discontinued due to the success of the wayside monitoring systems and the inconveniences (large, power-consuming systems requiring cumbersome installation and logistics) imposed by the available onboard monitoring technology.

There is consequently no system available that adequately provides a suitable system for on-board real-time monitoring of railway car bearings to alert the railroad of potential or imminent bearing failure that may create a very dangerous situation or derailment.

SUMMARY OF THE INVENTION

It is accordingly an object of the present invention to provide a network system and method that overcomes the limitations of prior art networks.

According to an aspect of the invention, a networking system comprises a plurality of wireless communication nodes communicating wirelessly with each other so as to form a low power wireless network. The nodes each have a sensor providing a respective sensor data value indicative of a physical parameter in the environment of the node. The wireless network discontinues communication with any nodes therein in which the sensor data value is outside a range of network sensor data values.

According to another aspect of the invention, a method of forming a wireless network comprises transmitting a wireless communication signal from a first node responsive to an interrupt therein, receiving the wireless communication signal at a second node, determining whether a sensor data value obtained from a sensor of the second node equals a discrimination value or falls within a discrimination range of values, and making a determination at one of the nodes whether the sensor data value satisfies a network discrimination criterion. Responsive to a determination that the sensor data value does not satisfy the network discrimination criteria, the second node is caused to discontinue communications with the first node.

According to still another aspect of the invention, a node comprises a mounting structure configured to be secured in engagement with a railcar wheel axle assembly so that the node turns when a wheel of the railcar wheel axle assembly turns. A housing is supported on the mounting structure, and the housing supports a generator configured to produce electrical power when the wheel turns as the railcar moves. Circuitry is supported in the housing and receiving the electrical power. The circuitry includes a microprocessor and a low-power wireless communication transceiver. A sensor assembly is operatively associated with the axle assembly. The sensor assembly has accelerometers detecting axial and radial accelerations of the wheel axle assembly. The circuitry receives electrical signals from the accelerometers. The microprocessor has memory storing software configured to cause the microprocessor to analyze the electrical signals and derive therefrom bearing condition data corresponding to a degradation condition of bearings of the associated wheel axle assembly. A rotation sensor is operatively associated with the circuitry and supplies thereto a rotation frequency signal corresponding to the rate of rotation of the wheel. The circuitry is configured to assemble the node into a network communicating wirelessly via the low-power transceiver wherein the network is made up of nodes traveling in a train together with a locomotive node to which the nodes transmit the bearing condition data, and the nodes are retained in the network only if the rotation rate of the associated wheel is consistent with the railcars moving together in the train.

According to another aspect of the invention, a method for monitoring a wheel assembly of a railway car comprises providing a monitoring unit on an axle structure connected with the wheel so that an accelerometer of the monitoring unit detects radial accelerations of the axle and transmits a data signal corresponding thereto. Accelerometer data is obtained from the data signal over a period of time while the railway car is in movement and is analyzed so as to derive flat data indicative of whether the wheel of the wheel assembly has a flat, or bearing condition data corresponding to a degree of degradation of the bearing of the wheel. The analyzing comprises screening the accelerometer data for characteristics of the flat or bearing component failure.

According to an aspect of the invention, a method for monitoring a wheel assembly of a railway car having a wheel on an axle and a bearing on said axle comprises providing a monitoring unit on the wheel assembly so that a microphone of the monitoring unit detects ultrasonic sound of the axle and transmits a data signal corresponding to it. Acoustic data is obtained from the data signal over a period of time while the railway car is in movement, and the acoustic data is analyzed so as to derive condition data comprising flat data indicative of whether the wheel has a flat or bearing condition data corresponding to a degree of degradation of the bearing of the wheel. The analyzing comprises screening the acoustic data for characteristics of the flat or bearing component failure.

A system is herein described that selects a subset of wireless communication nodes from a large number of available and active nodes for assembly onto a local network. The selection or discrimination process is performed by assembling only nodes that have a common parameter, such as a detected or sensed environmental condition or stimulus. A number of parameters may be used, including temperature, vibration, light, varying or constant magnetic or electrical fields, humidity, location (such as indicated by a GPS system or otherwise), acceleration, velocity, sound, shock, pressure, or the flow rate of a fluid or a gas.

In one embodiment, the system forms part of a permanently-placed wireless monitoring system that allows processing (and a much higher power usage) and reporting by wireless communication nodes that share a common environment or stimulus. Preferably, the wireless nodes contain wide bandwidth sensors, fast analog-to-digital converters, low power microcontrollers, high-speed and low-power digital signal processors with sleep modes, and fast low power memory that allow wide bandwidth measurements and signal processing on the nodes so that wide bandwidth communication, not possible in communication bands such as Bluetooth or Zigbee, is not necessary to support the network.

According to another aspect of the invention, a network system is provided that self-assembles from a plurality of individual communication nodes or units, each of which transmits a respective data set representing some sort of sensed or detected environmental parameter or condition expressed by at least one value using a limited-range communications protocol, such as Bluetooth or Zigbee. When the data value sensed or detected by a unit is within a range specified for the network, the unit is joined into the network with other units having data values in that range as well.

According to another aspect of the invention, a method defines and limits network membership based on discriminators, such as common environments or stimulus. To determine a discriminator for wireless network membership, a wide bandwidth, high-speed data acquisition is used that does not require wide bandwidth wireless communication with all the nodes. High-speed data sampling and distributed signal processing is maintained on the individual wireless nodes, and then low-bandwidth results of the on-node processing are transmitted over the network, eliminating the need for high-bandwidth wireless communication or data compression.

As another aspect of the invention, the inventive method is one in which any node that senses an environmental parameter above a certain trip level, preferably implemented by a comparator circuit (with rectification if the signal of the detected environmental condition is an AC signal, such as the sound from a microphone), can "wake up" or initiate every node in communication range with it, and begin a process of "self-assembling" the network.

A particularly preferred embodiment of the invention is its use in systems and methods for monitoring railway cars, especially with respect to the wear conditions of their wheel bearings, which, if not detected, can produce derailments. Eliminating derailments and maximizing use of the individual wheel bearings would enhance profitability of the railroad industry.

In the railroad aspect of the invention, wide bandwidth measurement and signal processing performed at the node unit is combined with the self-assembling network by environmental or stimulus discrimination in a mobile application. The node units monitor the bearing vibration using accelerometers, the temperature of the bearing using a thermocouple, and the acoustic signature using a microphone.

In this wireless monitoring of railroad car wheel bearings, only cars with common velocity and acceleration are self-assembled into the unique moving network of a train in which the cars of the network are moving together. Any other nearby cars, such as other cars in a rail yard, not moving as part of the train of interest, do not meet the common velocity and/or acceleration criteria, and are consequently not included in the self-assembled network. The nodes on the network monitor wheel bearing health and, if a problem is predicted, the assembled network relays the alarm or alert from car to car to the locomotive, where a high-power communication link to a central monitoring station in the outside world is supported. If the estimated time to bearing failure permits, a maintenance action can be scheduled. If failure is estimated to be imminent, the train can be diverted or stopped before catastrophic bearing failure and derailment.

Detection of the bearing condition must be high in probability of detection, and low in probability of false alarms due to the costs associated with missing a dangerous wear condition, and also the cost of going to address false positives. Detection may rely on a number of different methods and/or algorithms known in the art, including:

1. high bearing temperatures, indicative of catastrophic bearing lubrication failure;
2. bearing vibration and acoustics, in which vibrations of certain frequencies are indicative of various types of bearing defects;
3. wheel impacts, indicating damage where periodic impacts relate to the rotation rate of the wheel; and
4. lateral accelerations, indicative of car hunting (meaning yaw oscillation of the wheel truck about a vertical rotational axis).

Effective algorithms include classic defect detection algorithms well known in the art, enveloping signal analysis, and trending analysis.

Onboard monitoring of fleets of railroad cars is more economically feasible due to the drastic decrease in the cost of modern sensors and electronics when mass produced. Onboard monitoring is a more robust solution due to continual monitoring. The resulting continuous data allows true trending analysis that has been widely acclaimed in the literature (see Gluzman, supra, Reliability Direct, supra, Howard, supra, to mention a few) as leading to vastly improved failure prediction capability.

The overall desirable features of such a system include the need for a long operational life, i.e., ten or more years. This is advantageously provided according to an aspect of the invention by a self-generating power supply in each unit that derives electrical power from rotation of the wheel associated with the unit.

One preferred embodiment of a system incorporating many aspects of the invention is applicants' onboard bearing monitoring system known as the Autonomous Rolling Stock Monitoring System (hereinafter "ARMS"). The ARMS system is a fully self-contained miniature onboard wheel monitoring system that is easily installed on the wheel axle assembly using simple hand tools without requiring any modification to existing equipment. ARMS is self powered by a self contained generator in each node so that no routine or scheduled maintenance is required. When the car begins to move the ARMS system wakes up due to the self generation of power created by rotation of the wheel. As excess power is available from the generator, ARMS stores energy in a super capacitor such that short duration stops will not power down the system.

On power up, the self-contained ARMS wireless communication system forms a "discriminatory" network limited to the cars on the train of interest. This network of ARMS devices in the train forms a "leap frog" mesh network that ultimately terminates at the locomotive. The ARMS network interfaces to existing locomotive communication systems such as IntelliTrain™ manufactured by General Electric, which is powered at the locomotive, which has a super-supply of electrical power available, and enables communication of wheel status to be relayed back to a central monitoring station by wireless communication methods that require more substantial amounts of electrical power, such as satellite, cell telephone or wireless internet access technologies. While powered, the ARMS system monitors bearing temperature, bearing vibration, bearing acoustic signature, wheel impact load, and car hunting and reports critical situations back to the central monitoring station, thus allowing continuous monitoring and true trending data analysis.

Other advantages and objects of the invention will be apparent from the present specification to those of skill in the art.

BRIEF DESCRIPTION OF DRAWINGS

FIG. 2 is a schematic diagram of the locomotive of a train equipped with a network system according to the invention illustrating the connections of the network therethrough to the rest of the world.

FIG. 3C is a partly cut-away plan view of the bearing showing the cup, cone and roller components.

FIG. 4B is a detailed end view of the node unit of FIG. 4A.

FIG. 4C is a detailed plan view of the node unit of FIG. 4A.

DETAILED DESCRIPTION

Figure 1:
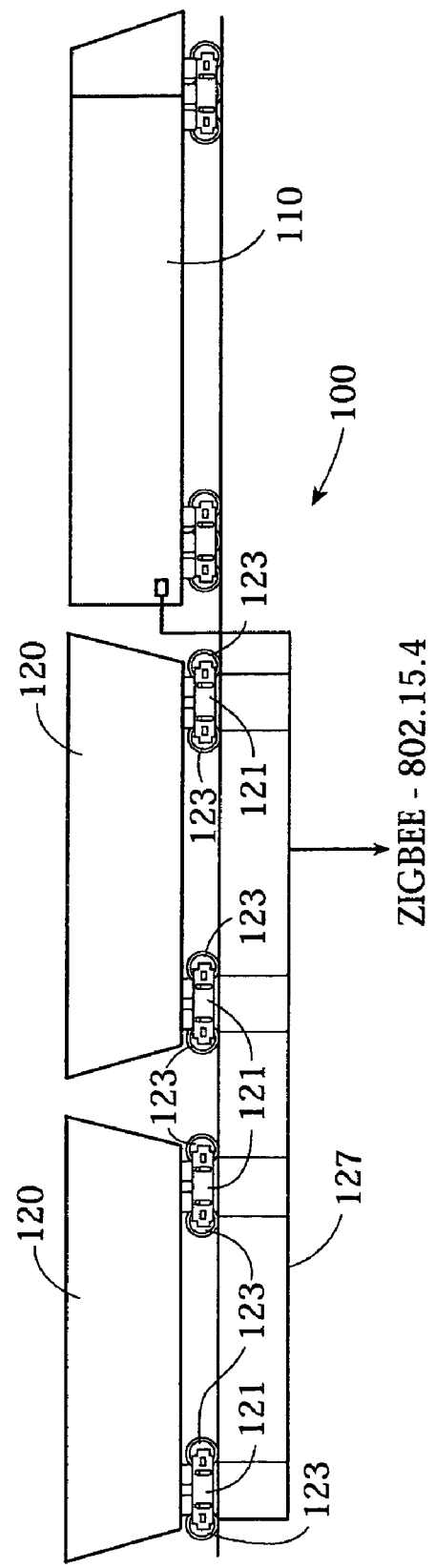
FIG. 1 is a schematic diagram illustrating a railroad train equipped with a network system according to the invention.

FIG. 1 shows an illustrative network system 100 according to the invention, i.e., an ARMS system applied in the context of railroad trains. The train comprises a locomotive 110 and a plurality of serially connected railroad cars 120. Each car is supported on two trucks 121, each having four wheels 123.

The ARMS implementation comprises onboard monitoring devices that wirelessly communicate status and data to existing remote database and monitoring infrastructures such as Electro-Motive Diesel, Inc. IntelliTrain™. The communication system architecture includes for each wheel 123 a self-contained monitoring and diagnostic ARMS device containing an IEEE 802.15.4 Zigbee wireless communication radio, as best seen in FIGS. 4A to 8. Each wheel-mounted device or node 125, when powered, will autonomously form a network (indicated schematically in FIG. 1 as 127), as described below, and wirelessly transmit status and diagnostic data as required to the locomotive 110, either by direct wireless communication with a Zigbee radio-equipped computer system supported on and powered by the locomotive 110, or by a leap-frog or mesh network using the other nodes 125 by Zigbee communications to act as intermediaries to receive and forward communications for the locomotive system.

The locomotive also is the network coordinator. Powered by the locomotive's on-board power system, it transmits network beacons to the nodes, sets up the network of nodes, manages the networked operation, stores network node information, and routes messages, when appropriate, between paired nodes. It is constantly receiving communications from nodes, and it interfaces with the existing locomotive computer processor and communication system.

As best seen in FIG. 2, the locomotive 110, which has an abundance of electrical power, supports long-range communications, such as satellite communications 111 or cell phone communications, and transmits via cell phone or satellite phone, or via a combination thereof, status and data derived from the nodes 125 of the train of railway cars attached to the locomotive to existing remote database and monitoring infrastructures such as Electro-Motive Diesel, Inc., IntelliTrain™ or remote system 113 or system diagnostic computer system 115, or other computerized systems with operator input devices such as a keyboard, a control panel or a mouse, and output devices such as a monitor or a printer. An audible alarm system also can be used to alert the operator of especially urgent conditions.

The locomotive computer system processes and/or stores the data from the locomotive 110 and the nodes 125 and displays reports of the data to users in the locomotive itself, and also to users having access to the distributed system via the Internet or other communications systems. Those systems, e.g., a pda carried by a railroad worker, also preferably have a display for displaying data, input mechanisms for requesting information, and an audible alarm to alert the worker to an urgent condition.

Figure 3A:
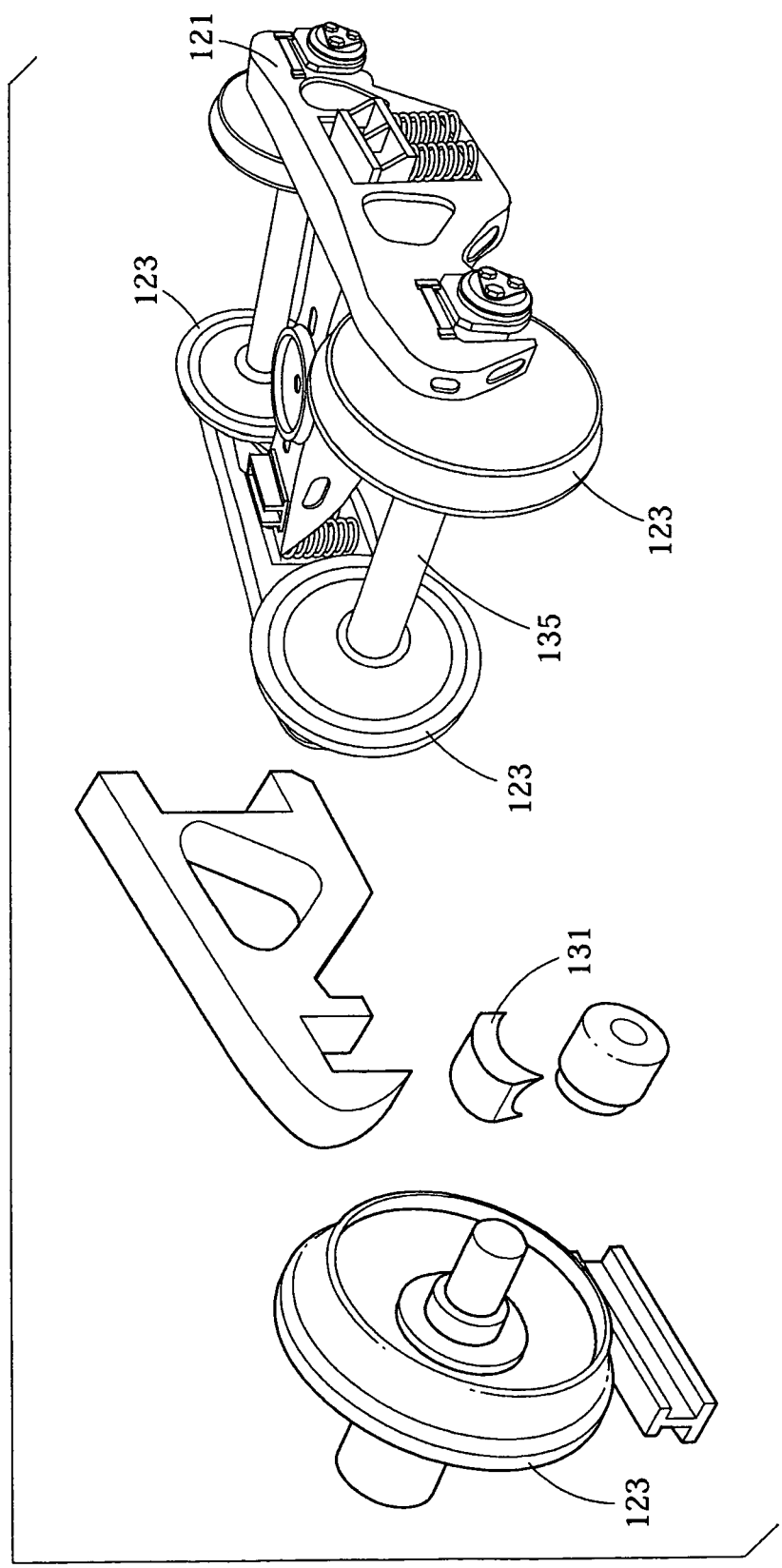
FIG. 3A is a perspective view and exploded diagram of a four-wheel truck of a railroad car showing the location of the bearing assembly.
Figure 3B:
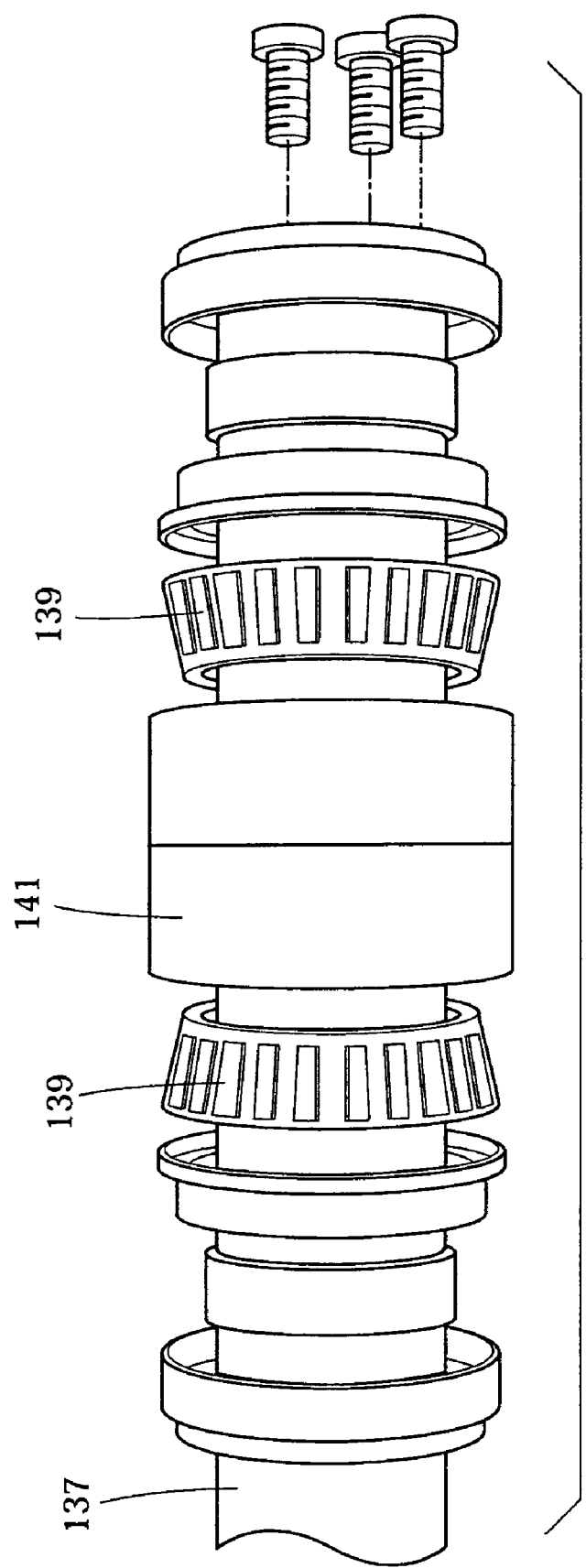
FIG. 3B is an exploded view of an exemplary railroad car wheel bearing.
Figure 4A:
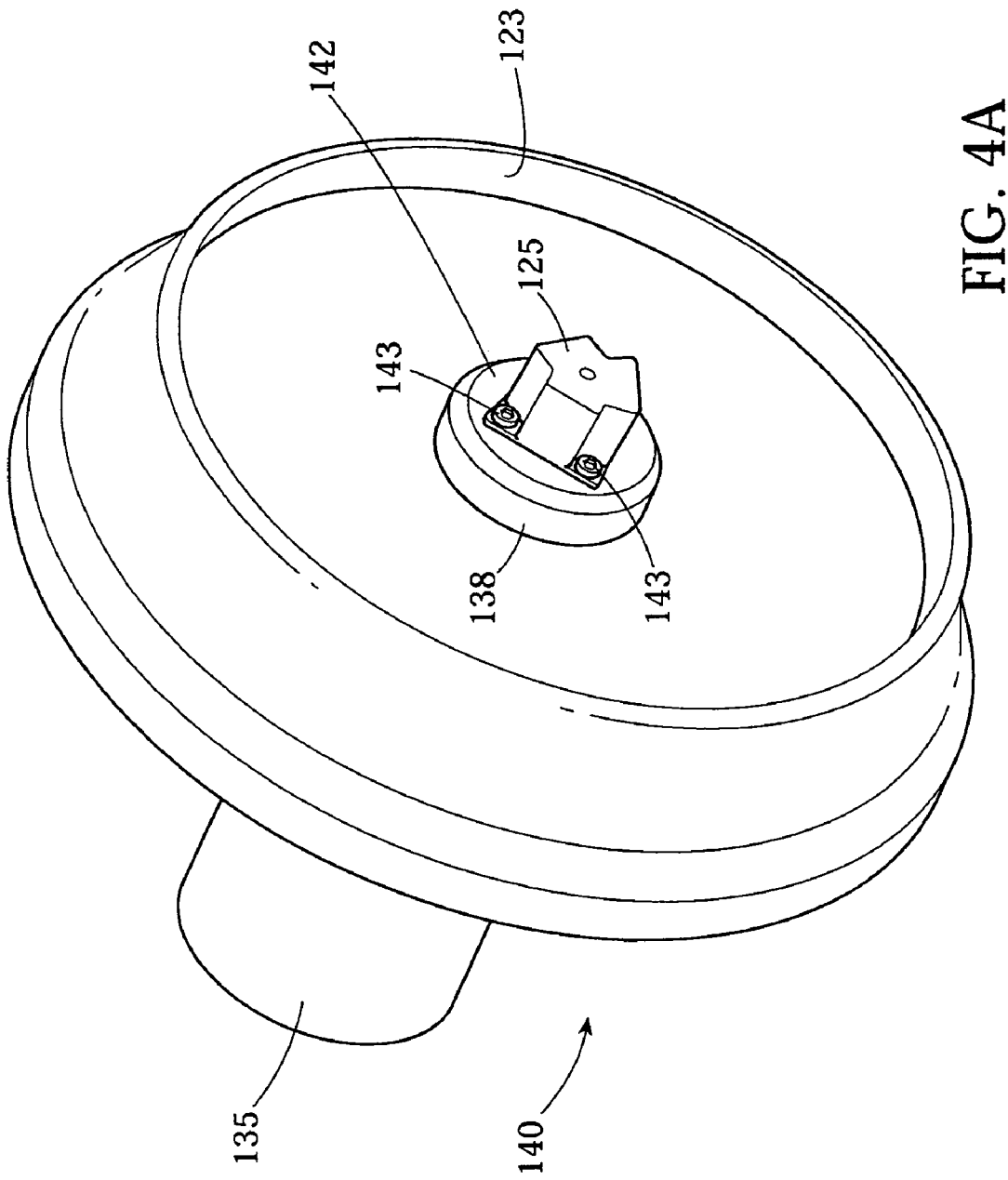
FIG. 4A is a perspective view of a railroad wheel with a node unit according to the invention.

Details of the truck configurations are well known in the art, and are shown in FIGS. 3A to 3C. The body of the car 120 rests on the truck centerplate, which in turn is supported on two side frames each resting on an adapter 131 that rests on a bearing assembly 133. The bearing assembly 133 receives therein an axle 135. As best seen in FIGS. 3*b* and 3*c*, in a typical three-piece truck, the bearing assembly is composed of a cone or inner race 137 surrounding the axle 135. Rollers 139 interface between the cone or inner race 137 and cup or outer race 141. The truck body rests via the adapter 131 on the outer race 141. Wear and damage of the bearing, if it occurs, generally will occur in the cone 137, roller 139 or cup 141.

Individual ARMS Node Units

Referring to FIGS. 4A to 6, a wheel assembly 140 comprises a wheel 123 at each end of the axle 135, and in the preferred embodiment, the ARMS node or sensor pack unit 125 is mounted on three securement bolts that are commonly used to secure a cap 138 to the end of axle 135, and project from the outward end of the axle 135 laterally outside the wheel 123. Securement collars 143 engage the ends of these bolts securely, as will set out below, allowing ready and secure attachment of the ARMS node 125 on the wheel. The unit 125 rotates with the wheel 123 as the car 120 rolls along the track.

The ARMS node units 125 are miniature, fully self contained, sealed, one-piece units designed for durability. All electronics and the ARMS package are water resistant (sealed against rain and wash down), and the general configuration of the outer housing 145 is best shown in FIGS. 4B and 4C. All electronics and the ARMS package and mounting are configured to survive a 500 g, 20 ms, ½ sine wave pulse shock to ensure survivability in all railcar movement and operation, including humping. All electronics and the ARMS package and mounting also are built to survive 20 GRMS random vibration (20 Hz to 2000 Hz). All electronic components are rated for −40° C. to +80° C.

As will be set out in more detail below, each unit is a node (sometimes referred to as a mote) that has a self-generating power system that powers a self-contained monitoring and bearing diagnostic system. The node searches for available networks when powered, and transmits data as necessary or appropriate to remain in the network and provide its identification and maintenance functions. The node can sleep or be dormant for extended periods of time, but when active communicates data at approximately 250 kbps at a range of up to about 100 meters, operating with an unlicensed frequency of RF, preferably 915 MHz OR 2.4 GHz.

Figure 26:
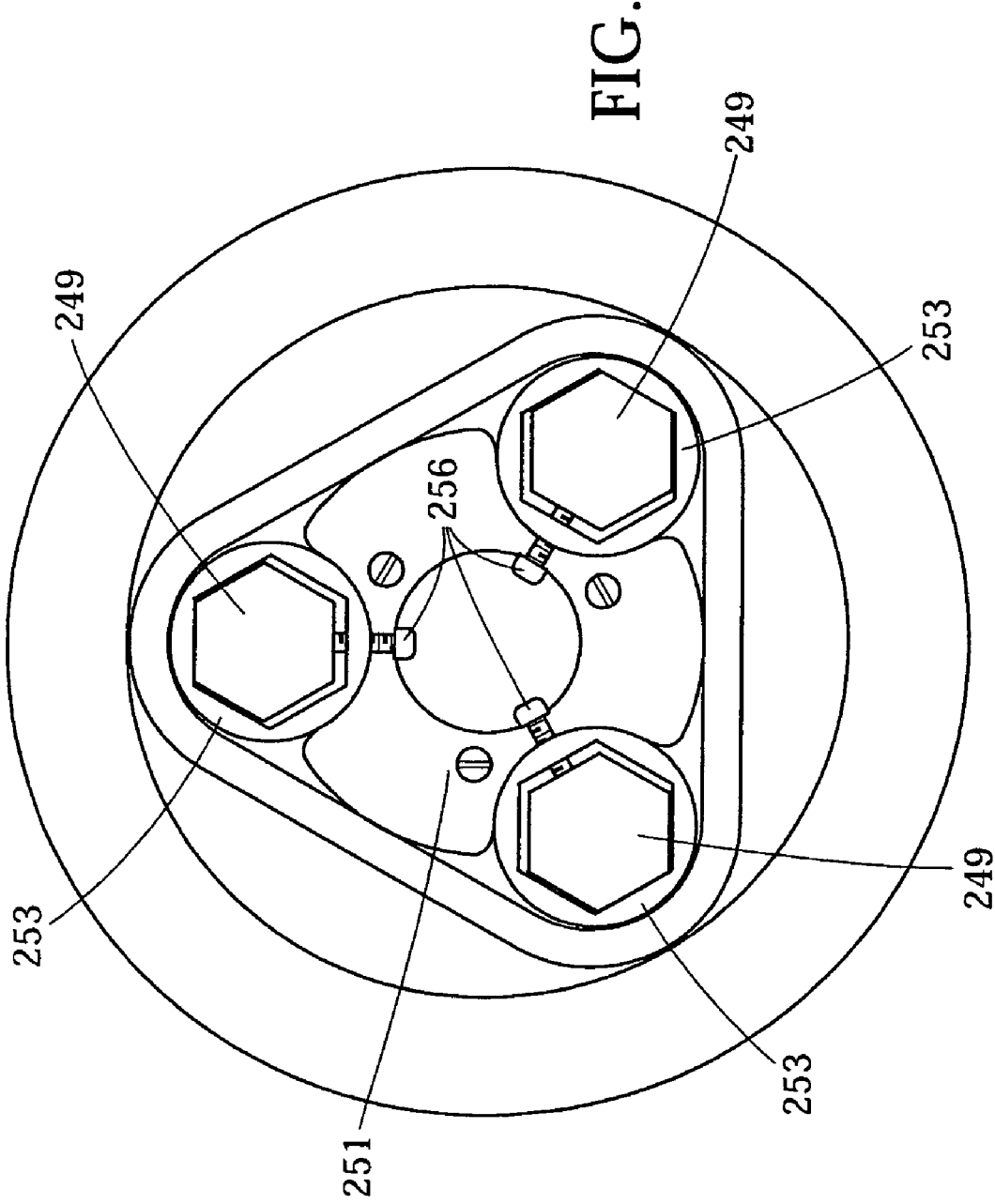
FIG. 26 is a view of the placement of the mounting plate of the unit of FIG. 24 on the axle cap of a railcar truck.

Installation of the ARMS unit 125 is simple and readily repeatable. The configuration of node 125 allows repeatable sensor placement and contact force and simplified secure fastening to a rotation member (enabling energy harvesting) without the modification of any railroad (car/bogie) equipment design. The miniature ARMS sealed device, approximately 5.5 inch diameter by 2.75 inch high, is fastened to the exposed rotating end cap of the wheel axle as shown in FIG. 4B and FIG. 26 by placing the ARMS assembly's round clearance holes in its base over the 3 hex bolt heads on the wheel axle assembly. Next, the locking collars (containing hex shaped clearance holes) are aligned with the hex head bolts on the wheel axle and inserted into the ARMS base round clearance holes. Finally, the radial locking screws in the ARMS base are screwed in to make contact with the locking collars. This jams the locking collars into the hex bolt heads on the wheel axle assembly, thus clamping the ARMS device to the locking collars and clamping the locking collars to the hex head bolts. Torque values and Loctite are used on the radial screws to ensure that adequate clamping force is attained and that the screws will not loosen while exposed to the wheel axle environments (rotation induced forces, temperature cycling, shock, vibration, etc.).

Figure 5:
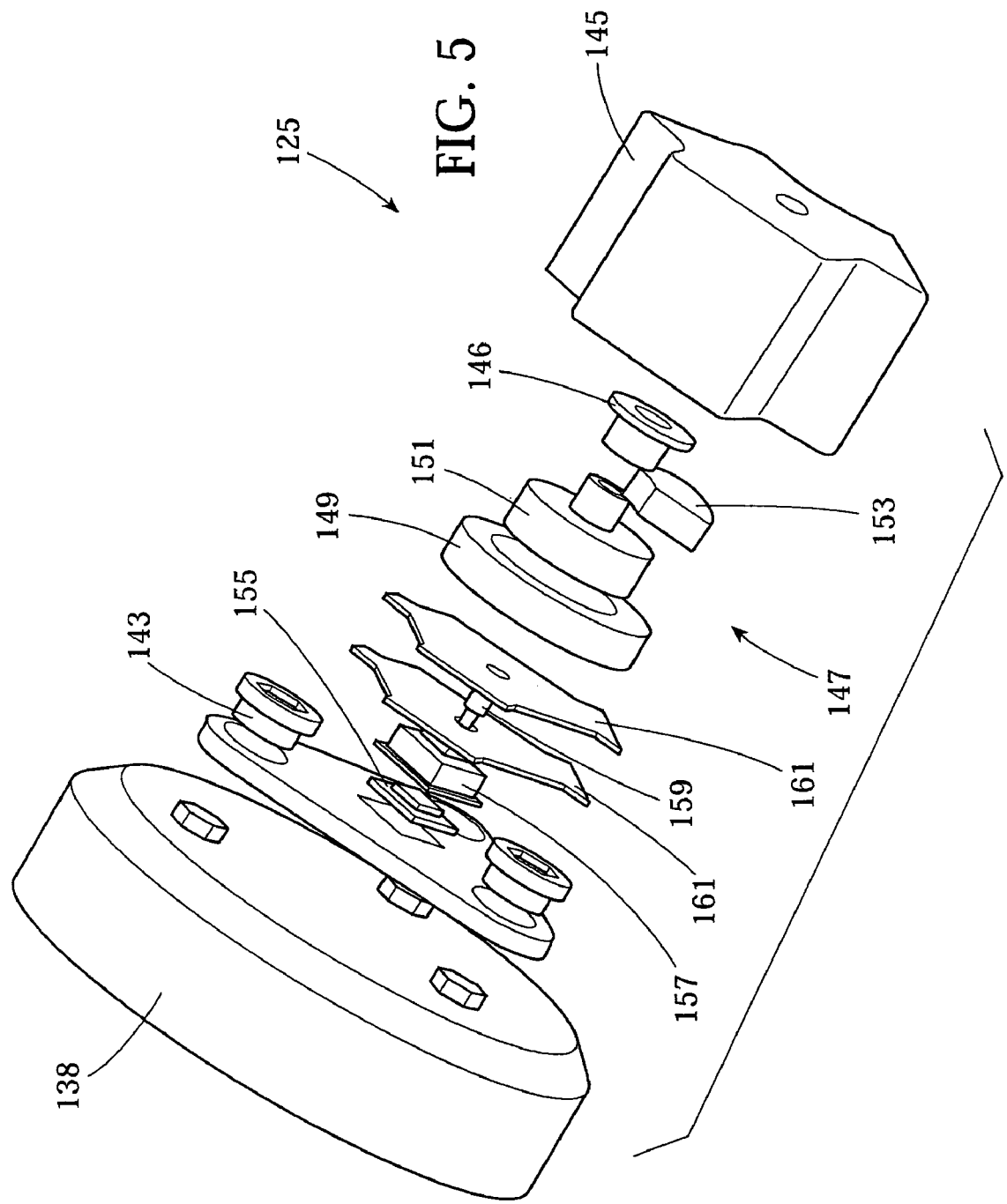
FIG. 5 is an exploded perspective view of the node unit of FIG. 4A showing its mounting on the wheel.
Figure 6:
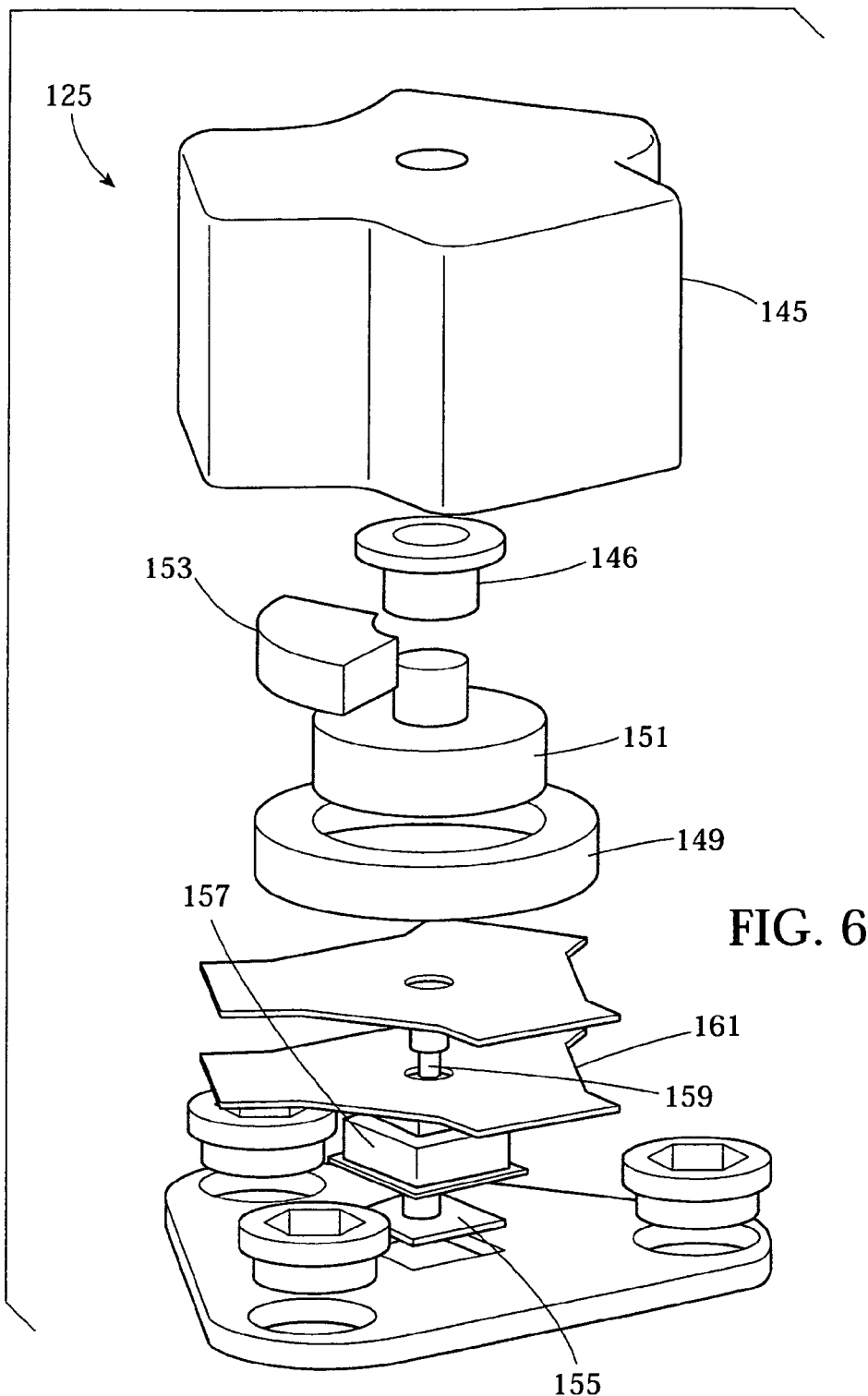
FIG. 6 is another exploded perspective view of the node unit of FIG. 4A.

As best seen in FIGS. 5 and 6, the inner structure of the node includes a generator, generally indicated at 147, that comprises a generator stator 149, an armature 151 supported by armature bearing 146 and a tungsten counterweight 153 that together work to produce electricity when the wheel 123 is rotated. The node also includes a sensor array 155, including thermocouple, microphone and accelerometer, that is adjacent the axle. A sensor array cover 157 overlies the sensor array 155, which is connected with one or more circuit boards 161 that are powered by electricity from the generator. After the node 125 is secured to the locking collar adjacent the wheel 123, an Allen wrench tool is inserted in the center hole on the ARMS device and access adjustment screw 159 for adjustment of the sensor position and to bring the MEMS accelerometer and the temperature sensor in direct physical contact with the wheel axle assembly. A torque value is used to ensure adequate contact without crushing the sensors. A rubber sealing plug is inserted into the sensor adjustment hole to seal the assembly.

A particularly preferred embodiment of the mechanical design and packaging of the sensor unit 125 is shown in FIGS. 24 to 29B.

Figure 24:
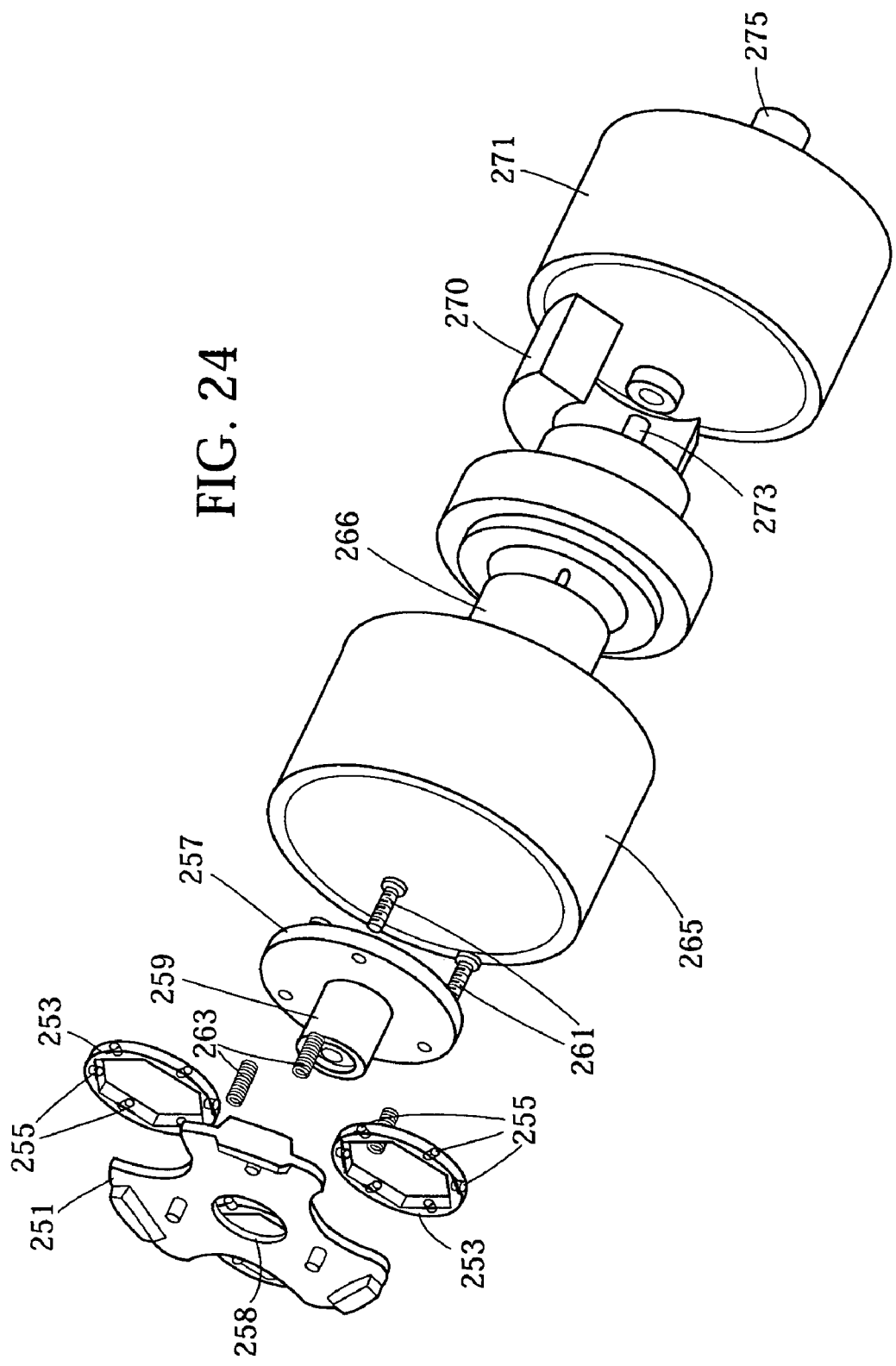
FIG. 24 is an exploded perspective view of another embodiment of the node unit of the invention.
Figure 25:
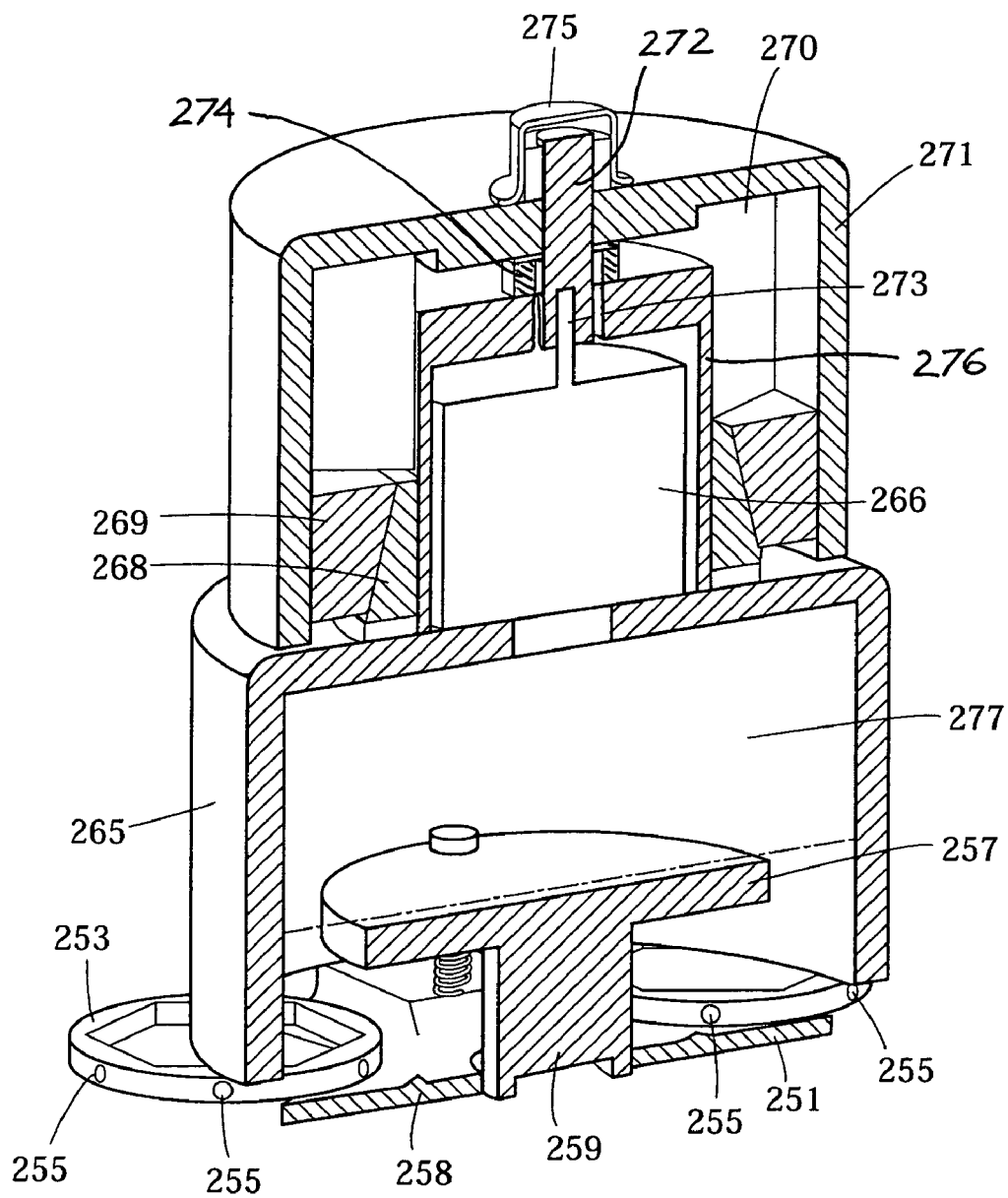
FIG. 25 is a cross-sectional perspective view of the node unit of FIG. 24 taken through a plane extending through the rotational axis thereof.

As best seen in FIG. 24, a mounting plate 251 is secured behind three locking rings 253, each of which fits over a respective hex bolt head 249 of the cap bolts on a standard railroad truck axle cap. The locking rings 253 are equipped with one or more threaded bores 255 into which locking screws 256 are threadingly inserted, and when the locking ring is fitted over the bolt head, the screw or screws are tightened so as to secure the locking ring 253 on the bolt head. Locking rings 253 are sized so that once they are on the bolt heads, they entrappingly retain mounting plate 251 on the end of the axle.

Sensor hub 257 extends through a central aperture 258 in the mounting plate so that the sensor portion 259 engages the cap on the end of the axle so as to obtain optimal sensory readings. The sensor hub is supported on the plate 251 by adjusting screws 261 that are tightened to press the sensor portion 259 into engagement against the bias of die springs 263.

Lower housing 265 fits over the assembly and is secured to mounting plate 251. A DC current generator 266, which may be a commercial off the shelf unit, extends laterally outward from the lower housing 265. Cylindrical bearing 267 has one portion 268 secured to the lower housing 265 and a second portion 269 supported for rotation with respect thereto. The second bearing portion 269 supports a counterweight 270 and an outer housing 271, which are fixedly secured to a shaft 272 extending through a bearing 274 on an inner housing 276 enclosing generator 266 (illustrated schematically) and fixedly secured to lower housing 265. Shaft 272 is secured to rotate a central shaft 273 connecting to the rotating part of the DC generator 266 by castle nut and cap 275.

When the wheel is rotated, the imbalance of counterweight 270 causes the outer housing 271 to rotate relative to the lower housing 265, which causes the shaft 272 and attached shaft 273 to be rotated and the DC generator 266 produces power for circuit boards that operate the node 125. The circuit boards of the node 125 are sealed in a watertight chamber indicated at 277 in FIG. 25.

The sensor hub 257 has a sensor cavity 277 at its inboard end that supports therein a temperature sensor 278, such as the sensor sold under the model number AD22103 by Analog Devices, Inc., a two-axis accelerometer 279, returning accelerations in the radial and lateral (i.e., axial) directions of the wheel, and acoustic sensor 280. Wiring (not shown) connects these three sensors to the circuitry in the housing 265 for processing and analysis.

Figure 28:
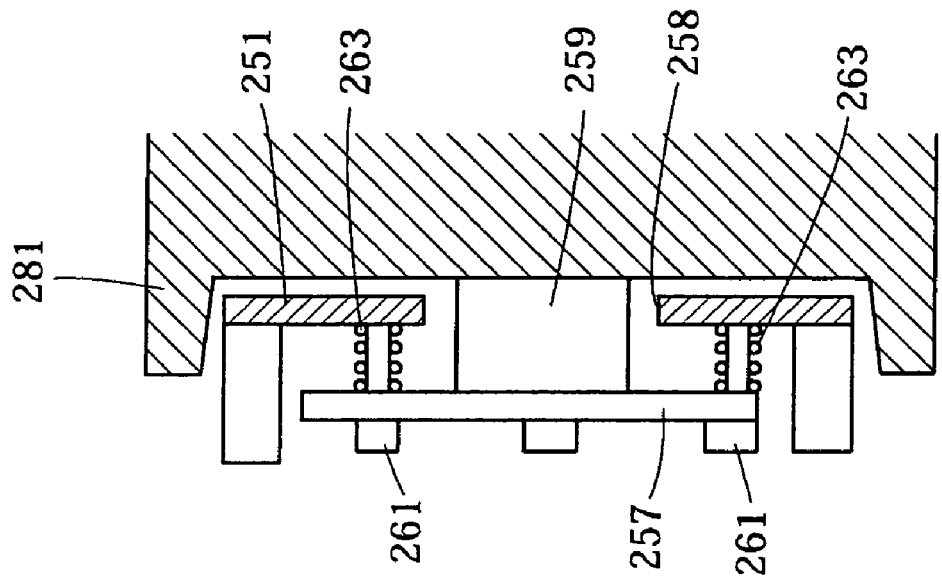
FIG. 28 is a partially cut-away side view of the engagement of the sensor hub with the axle end cap.
Figure 27:
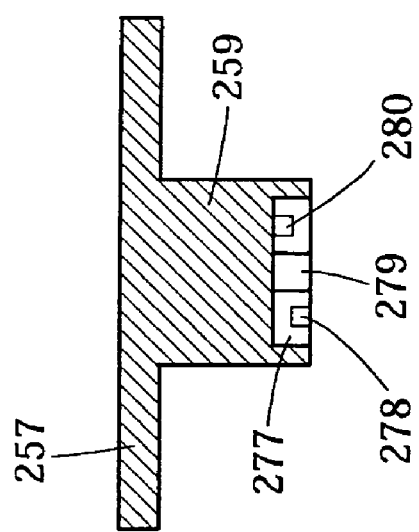
FIG. 27 is a cross-sectional view of the sensor hub of the node unit of FIG. 24.

The sensor portion 259 is pressed into engagement with the actual end cap 281 of the wheel assembly 140 as shown in FIG. 28. The sensor engagement portion is pressed into engagement with the cap 281 by screws 261, which are tightened against the outward bias of springs 263 until the engagement is firm and the temperature, acceleration and acoustic data is as reliable as possible.

Figure 29B:
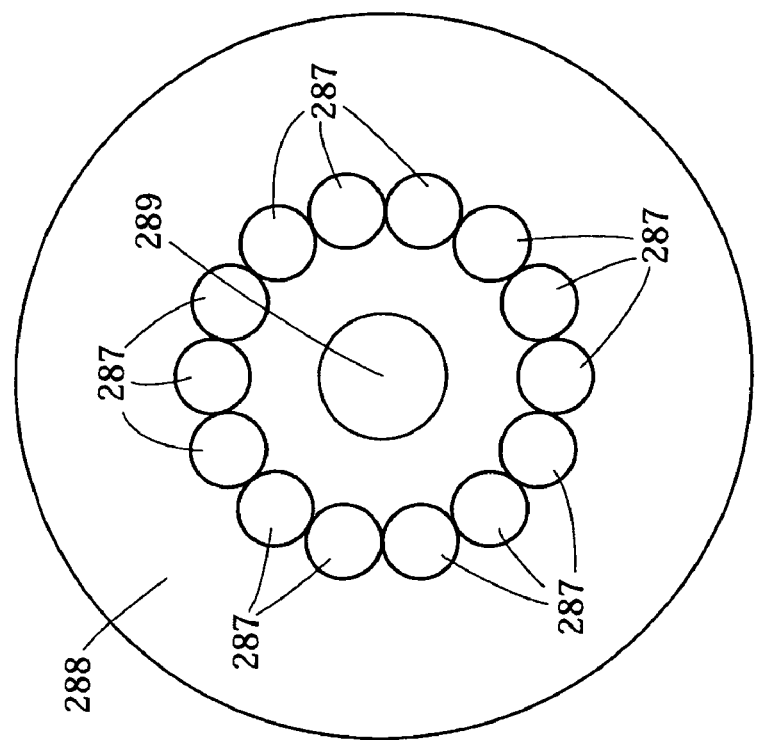
FIG. 29B is a schematic diagram of the rotor of the power generator.
Figure 29A:
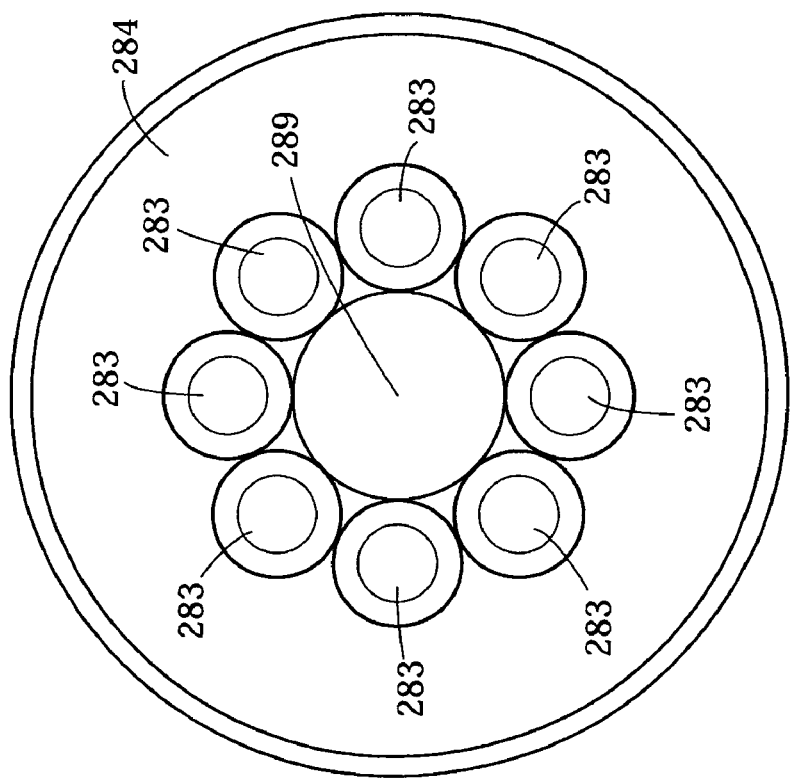
FIG. 29A is a schematic diagram of the coils of the power generator.

The DC generator design may be that of a COTS generator, or, in the preferred embodiment, it may be assembled specifically for the node application. In the preferred embodiment, the DC generator comprises eight coils 283 arranged in a circular pattern in the stationary part 284 of the generator, as shown in FIG. 29, which are supported stationary relative to lower housing 265, and a rotating set of twelve or more magnets 287 on a rotor 288 supported for rotatory movement relative to plate 284 about axis 289, which produces an AC current that, when rectified, is adequate for the operation of the node unit 125.

Circuitry of the ARMS Node Unit

Figure 7:
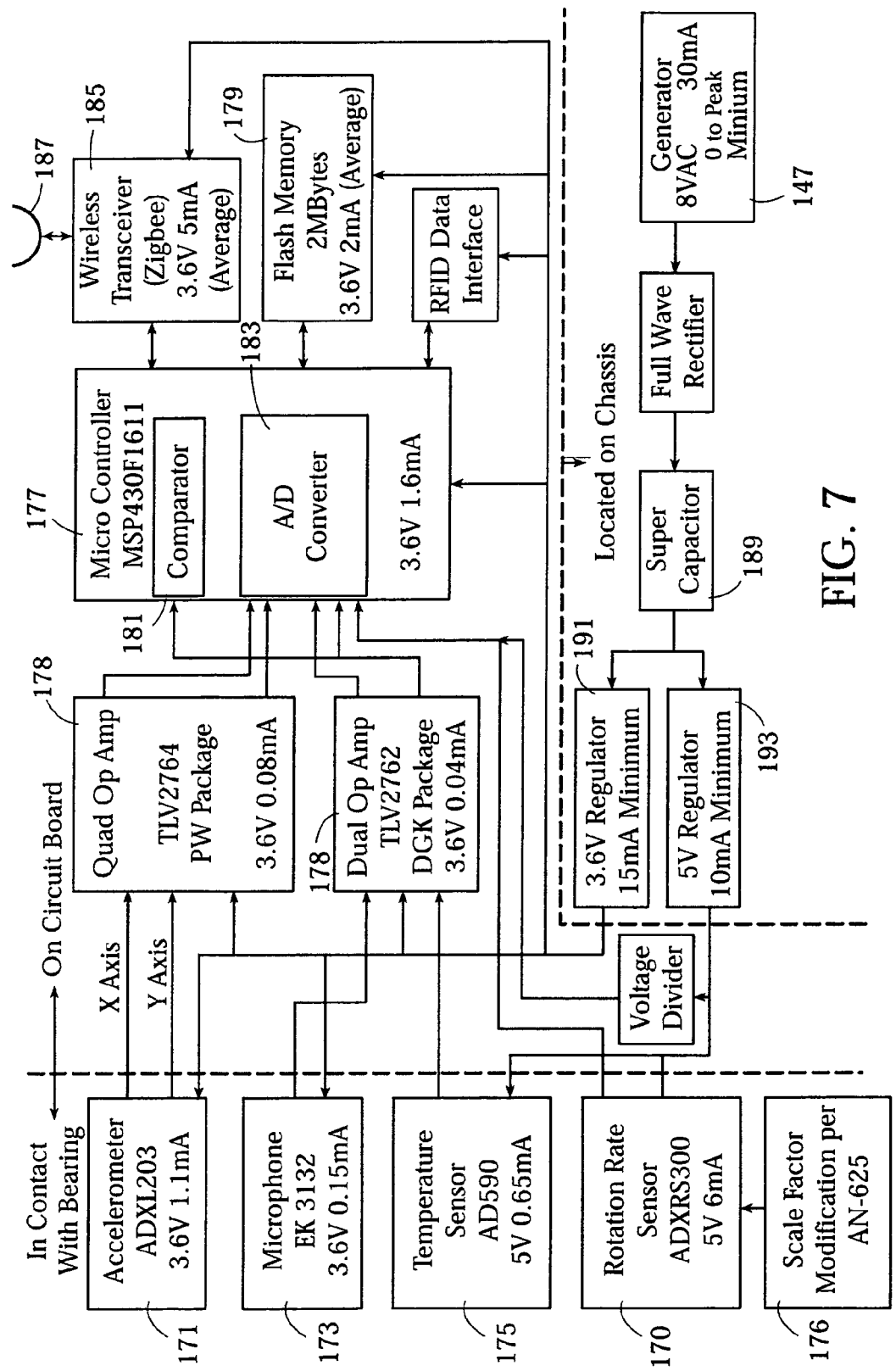
FIG. 7 is a schematic of the node unit.
Figure 8:
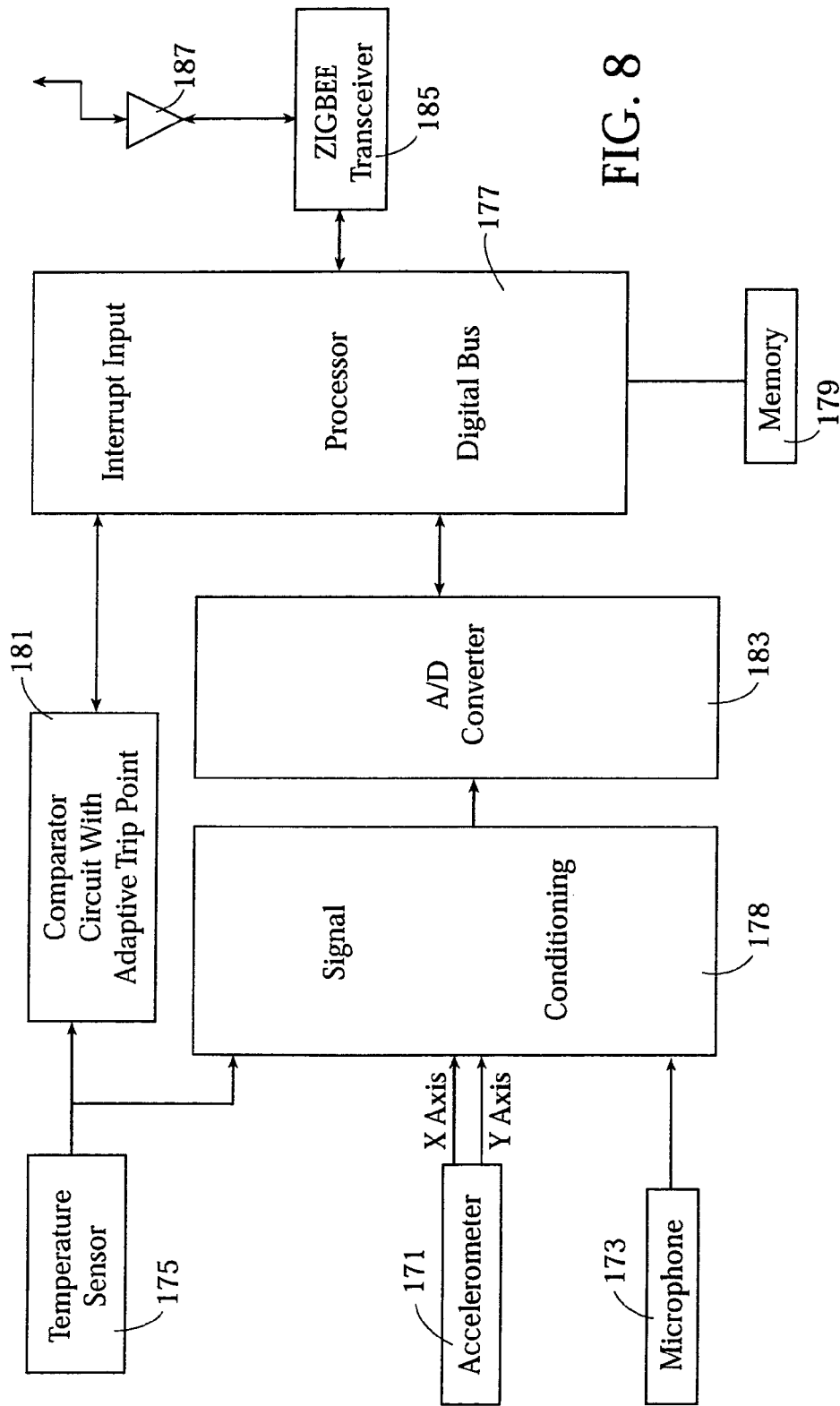
FIG. 8 is a general diagram of the functional components of the node unit.

The electrical functional block diagram for a preferred embodiment of the ARMS unit 125 is shown schematically in FIG. 7 and diagrammatically in FIG. 8.

The circuitry of the unit is an ultra-low-power design configured to be left without maintenance on the railcar when it is not moving for long periods of time with little electrical power demand, in a "sleep" condition. When the railcar is moved, it turns the wheel, which generates power via the generator, which powers the circuit of the node 125, and causes the node to "wake up" and begin monitoring activity and communications with other nodes. The node 125 also may be "woken up" by a ping from another node 125 seeking to set up a network, as will be discussed below. Such an event is a low-power interrupt, based on an analog input to the micro-controller that trips an interrupt circuit.

The onboard monitoring system of the ARMS node unit 125 monitors the associated bearing, wheel, and car using miniaturized, low power Micro Electro Mechanical Systems (MEMS) sensors and electronics. As best seen in FIGS. 7 and 8, the monitoring and detection algorithms are built into a single chip microcontroller with a self-contained 8-channel A/D converter, a comparator, and a flexible and expandable serial bus architecture.

The ARMS node has sensors in the form of MEMS accelerometers 171 in contact with the bearing of the wheel, one for the x-axis and one for the y-axis of the device. Suitable for this component are the accelerometers sold by Analog Devices Inc. under the model designation ADXL 203. Because the ARMS node is preferably mounted to rotate with the wheel, the x-y axis orientation is essentially two orthogonal axes, one of which is oriented to extend horizontally and laterally of the railroad car, parallel with or in line with the rolling axis of the wheel, so as to detect lateral accelerations, and the other axis is directed radially relative to the wheel, rotating therewith and identifying accelerations that are radial, i.e., perpendicular to the rolling axis of the wheel axle.

A rotation rate sensor 170 is also in the sensor array and is oriented to output signals indicative of the rotation of the wheel. A suitable component for this purpose is the MEMS rate sensor or gyroscopic device sold by Analog Devices Inc. under the model designation ADXRS 300. Ideally, the rotation sensor has an operational range of zero to 6500 to 7000 degrees per second, obtained using a scale factor modification component 176 sold as AN-625 by Analog Devices, Inc.

The sensor array also includes an acoustic sensor or microphone 173, suitably the microphone sold by Knowles Electronics under the model designation EK 3132, with an operational range of 2,000 to 40,000 Hz.

The sensor array further has a temperature sensor 175, suitably the component sold by Analog Devices Inc. under the model designation AD 590 or AD22103. Optionally, the ARMS node can also include a GPS component (not shown) that identifies the location of the railcar. The preferred embodiment does not include a GPS component for cost reasons, but since only one of the eight wheels needs to be equipped with a GPS to identify the location of the associated railcar, this additional component may be added. Particularly suited for this application is the miniature IC sold by Trimble under the designation SND GPS Solution.

Various types of other sensors may be used, depending on the application. If the output of a sensor is bipolar, such as for a microphone, rectification is used to rectify the signal to a Direct Current (DC) voltage level. After full wave rectification, including the output capacitor to remove ripple and stabilize the voltage, a Resistor/Capacitor (RC) time constant circuit is implemented as the input to the comparator trip circuit.

As seen in FIG. 8, the output of the accelerometer 171, the microphone 175, and the temperature sensor 175 (as well as the output of any other analog sensors, such as geophones, accelerometers, acoustic sensors, ultrasonic sensors, electric field sensors, magnetic field sensors, light intensity sensors, light selective frequency sensors, humidity, angular rate sensors, Global Positioning System (GPS), mechanical shock, pressure, or fluid or gas flow rate sensors) are transmitted to signal conditioning 178, where the analog signals are amplified and/or filtered as appropriate, and then routed to fast analog to digital (A/D) converters 183.

The fast A/D converters 183 coupled with the high-speed processor 177 allow all high speed, wide bandwidth calculations and data manipulations to occur on the node, thus eliminating the need for wide bandwidth wireless communication.

The circuit of the node 125 also includes a low-power micro-controller 177 such as the MSP430F1611 or MSP430FG4618 sold by Texas Instruments, programmed with algorithms to determine the health of bearings through vibration and acoustic trending and temperature monitoring received from the sensor array via operational amplifiers and/or signal conditioners 178, and comparator 181 and/or analog/digital converter 183. The micro-controller 177 performs these algorithms accessing flash memory 179 where necessary, to obtain software for the operation of the algorithms, to access historical data where appropriate, to store data and reports as necessary, and for storage of intermediate results during signal processing activity. This processor is preferably configured to enter a low-power "sleep" condition to preserve power when not in use, or when the generator is not supplying power to operate the circuit.

Low-power communications are provided in the form of a self-assembling mesh network (which will be described herein in greater detail) using a standard Zigbee (IEEE 802.15.4) interface 185. A patch antenna 187 is used for an omni-directional antenna pattern.

The power demands of the various components are provided in FIG. 7. Power is supplied by the generator 147, which produces power from the wheel rotation, which is augmented by a super capacitor 189 to power the circuit board through ultra-efficient voltage regulators 191 and 193. Total power dissipation should be approximately 170 mW (RMS), and as a result, heat dissipation is not an issue. The analog signal conditioning circuits (Op Amps and required passive devices), flash memory, voltage regulators, super capacitor, MSP430F1611 microcontroller and Zigbee transceiver are preferably packaged on a single circuit board.

The communications via the Zigbee transceiver consume on average 5 mA at 3.6 volts, amounting to about 18 mW total power consumption. This is a low-power communication protocol, and an aspect of the invention is the use of such a low-power low-bandwidth communication system. Generally, the nodes each transmit a block of data as described in Table 2 below once every ten minutes and transmit it over the network to the locomotive via Zigbee. Each node is also involved in transmitting data received from other nodes in back of them to nodes in front of them to network the entire train in communication with the locomotive. According to the invention, the peak power required by the wireless communications should not exceed 100 mW, and preferably should be less than 50 mW, and in an especially preferred embodiment, is 30 mW or less.

The circuit described allows each ARMS node 125 to constitute an autonomous bearing, wheel and car monitoring system that monitors:

Bearing temperature for detecting catastrophic lubrication failure and resulting runaway temperature rise using a solid state miniature temperature sensor;

Wheel rotation rate to enable bearing defect frequency determination using a MEMS gyroscope;

Bearing vibrations to detect the classic bearing defect frequencies using a MEMS accelerometer;

Bearing acoustics for the very earliest possible detection of bearing wear using a miniature microphone with frequency range up to 45 KHz;

Wheel impact loads associated with wheel flatting using a MEMS accelerometer; and Truck lateral accelerations, associated with car hunting, using a MEMS accelerometer.

In addition to the above functionalities, the ARMS node 125 also has an RFID communication interface in its circuitry. This RFID interface provides a secondary communication interface that allows bearing status communication with existing wayside RFID readers, used in pre-existing systems. Additionally the RFID interface or Zigbee can be used by a handheld device to allow an operator to approach the car at relatively short range, and communicate directly with an individual ARMS device.

Self Power Generation

One of the innovations that make ARMS a viable product is the self contained generator and the low power sensors and electronics that make self power generation feasible. Due to self generating power, the need for routine maintenance, such as changing batteries, has been eliminated.

The circuit of FIG. 7 is an integration of low power components that allows a miniaturized generator producing 30 mA at 8 $VAC_{0\ to\ Peak}$ integrated with a super capacitor to supply ample power to the system. The supercapacitor used in the preferred embodiment is sold by the AVX Corporation under the trade name BestCap as part number BZ025A404ZHB, which is a 5.5 V capacitor at 400 mF. In the preferred embodiment, the power demands of all the components of the ARMS node unit require about 69.142 mW to function in the awake state of the unit (in which the sensors, microcontroller and the Zigbee transceiver are active), to be contrasted with the low-power sleep state. The total power requirements of the node of the invention in its operational awake state are below 150 mW, and preferably below 100 mW. As such it is readily powered by the generator when operational at 30 mA at 8 VAC, providing 240 mW.

In the low-power sleep state into which the node drops when the generator stops producing power for a period of time, and which will be discussed further below, is one in which only limited functionality is realized, mainly allowing the Zigbee transceiver the limited capability of receiving a ping that can trigger a limited functionality of the device. In the low power sleep state, the power demands of the unit are less than 5 mW, preferably less than 2 mW, and most preferably below 1 mW.

In the preferred embodiment, an 8 $VAC_{0\ to\ Peak}$ generator powers "buck" regulators. A generator supplying more current at a lower voltage may also be used, alternatively, in which case the regulators may be changed to a "boost" configuration.

The armature or the counterbalance is configured with a pendulosity such that it is not possible, or at least very unlikely, that the armature or the counterbalance will start to rotate ("drag along") with the stator due to magnetic coupling. This may be accomplished by configuring the coils so that they are discontinuous around the stator. The gaps or breaks in the coil area will break the magnetic coupling.

Alternatively, active control on the output of the coils may be applied, so that, if coupling "drag along" occurs, the load can be opened thus eliminating the magnetic coupling. The control in that case would be an active closed loop system that could also be used to regulate the amount of power generated to avoid excessive voltage generation. This is a permanent magnet generator without field coils. Incorporation of field coils requires slip rings to carry current to the stationary armature.

As can be seen in FIG. 6, the generator is preferably an "inside out" or "reversed" generator design in terms of the normal stationary and rotating elements.

Ultra Low Power Algorithm Implementation

In addition, the software executing the algorithm used in the ARMS node 125 is designed so as to minimize the electrical energy used for computation.

The algorithm used screens digital data derived from conditioned signals produced from the analog microphone and/or accelerometer output for characteristics of various degrees of bearing degradation or damage. The characteristics are generally peaks of ultrasonic sound or acceleration that repeat periodically according to certain wheel rotation or bearing defect frequencies that are dependent on the physical parameters of the bearing assembly involved.

These characteristic frequencies may be calculated by the following equations:

$$\text{cup defect frequency} = (N/2)(RPM/60)[1-(Bd/Pd)\cos(phi)] \quad (1)$$

$$\text{cone defect frequency} = (N/2)(RPM/60)[1+(Bd/Pd)\cos(phi)] \quad (2)$$

$$\text{roller defect frequency} = (1/2)(Pd/Bd)(RPM/60)[1-(Bd/Pd)(Bd/Pd)(\cos(phi))(\cos(phi))] \quad (3)$$

wherein

N=number of rollers

RPM=bearing rotation rate in revolutions per minute

Bd=diameter of bearing rollers

Pd=bearing pitch diameter phi=angle between roller spin axis and rotation axis of bearing The acoustic and accelerometer data does not have to be processed in real time or simultaneously. There is no time limit on the processing time as long as it is "reasonable", e.g., less than 15 seconds. A discrete Fourier transform is used, wherein only the specific frequency components of interest are determined, and because only a limited number, e.g., 144, of specific discrete lines of Fourier transform are required. This avoids the computation and power cost of a fast-Fourier transform, which would entail unnecessary determination of all composite frequencies in the sensor data, not just the relevant frequencies.

According to one embodiment, this is achieved at least in part by implementing the software that performs an algorithm in the low power microcontroller with a need to calculate only 144 frequency lines, including 16 bearing defect frequencies, whether the source is the acoustic sensor or the accelerometer, and whether using enveloping or just the basic bearing defect equations. The 16 frequencies are: rotor (i.e., frequency of wheel rotation), cup, cone, roller, cup+rotor, cone+rotor, roller+rotor, cup-rotor, cone-rotor, roller-rotor, $2^{nd}$ harmonic cup (i.e., a frequency twice the cup failure frequency), $2^{nd}$ harmonic cone, $2^{nd}$ harmonic roller, 3rd harmonic cup (i.e., a frequency three times the cup failure frequency), 3rd harmonic cone, 3rd harmonic roller.

In addition to these 16 basic frequencies, four adjacent frequency bins above and below each of the 16 basic frequencies are calculated in order to account for bearing slip, speed variation during the measurement, and any inaccuracies in the rotation rate measurement. These bins are preferably adjacent frequencies separated by increments of 0.5 Hz to 1 Hz or greater.

The preferred embodiment employs a discrete Fourier transform for these frequencies applied to data samples taken from both the accelerometer and the microphone.

In one embodiment, the data sample analyzed is two seconds of accelerometer data readings that are taken and analyzed as a time record, which allows 0.5 Hz frequency resolution, which is an appropriate resolution to optimize the resolution versus time required for data acquisition. The highest frequency of interest is 833 Hz, as will be discussed below, and in order to acquire 4 samples on an 833 Hz signal the sample rate should be 3332 samples per second. Thus, 6664 data points are acquired during the two-second interval for post-processing to determine the 144 frequency amplitudes.

According to the preferred embodiment, the accelerometer data is sampled in a set of readings over ten revolutions of the wheel, and is processed by the microcontroller operating according to software causing it to perform another algorithm on the accelerometer data, as will be discussed below, that takes advantage of the fact that the defect frequencies are directly related to the rate of rotation of the wheel, and operates using samples taken over a period dependent on the rate of rotation of the wheel, and at frequent enough intervals to pick up the highest frequency of interest.

These processes result in improved power efficiency relative to more computation intensive algorithms used in the prior art, where power is not a significant concern.

ARMS Monitoring Techniques for the Various Sensors

The ARMS system has sensors that enable it to detect and identify the four stages of bearing failure as defined in Gluzman, supra, and Reliability Direct, supra. Catastrophic bearing lubrication failure, high wheel impact, and car hunting are also detected and reported by the ARMS system.

1. Microphone

The microphone 173 is preferably a Knowles EK3132 microphone that is capable of detecting up to 45 kHz. The microphone 173 is used to detect the first and second stage of bearing degradation (see Gluzman, supra, Reliability Direct, supra) when approximately 5% to 20% of the bearing life remains.

The microphone 173 is at the base of the ARMS device on the sensor array assembly 155. This assembly 155 also contains and positions the accelerometer 171 and the temperature sensor 175 in contact with the wheel axle and positions the microphone 173 in very close proximity to the wheel axle 135. The microphone 173 is pointed at the wheel axle and is shielded from any interfering acoustic sources by the ARMS structure. Acoustic damping material surrounds the microphone such that ARMS structural vibration does not contaminate the measurement. The wheel axle is in the near field of the microphone. The position and shielding of the microphone allows unprecedented ultrasonic bearing signal detection.

The acoustic data from the microphone is sampled and analyzed using two distinct methods and in two frequency bandwidths, low and high frequencies.

Low frequency analysis is performed on the microphone output after a signal conditioning circuit modifies the analog output to assist in the identification of periodic spikes of ultrasonic noise that repeat at frequencies corresponding to the defect frequencies described above. The processing of this conditioned signal is discussed below, and is similar or identical to that described for the accelerometer (144 frequency lines).

Data is collected to determine the filtering that should be implemented. However, based on Howard, supra, signal conditioning including an initial high-frequency band pass filter with a band pass of 20 kHz to 40 kHz is suggested, but a different advantageous band-pass range may be determined for a specific application based on further data acquisition. This range may be determined by collecting bearing data, but also will be verified by use of a dynamics signal analyzer to excite the wheel axle assembly. The dynamics signal analyzer allows impulse excitation of the assembly and determines the natural frequencies of the structure as seen at the location of the ARMS microphone. It is these natural frequencies of the associated railway car wheel assembly and/or truck that are excited by the impacts of the bearing elements on a defect at the characteristic bearing frequencies derived in Howard, supra, (and many other places in the literature). The low-frequency analysis of the microphone output makes use of this.

Expressed in other words, bearing degradations or defects exhibit the characteristic of periodic spikes recurring at the above described bearing defect frequencies (or other frequencies of interest). The spikes are made up of noise that comprises high frequency sound that is especially concentrated at the natural resonance frequencies of the railway truck, and therefore those frequencies may be the focus of monitoring of the microphone output.

Time domain data analysis including Peak, RMS, Crest Factor and Kurtosis, and enveloped frequency domain analysis are performed on this data by the ARMS microprocessor using, e.g., the method of Howard, supra. Additionally, pattern recognition techniques using the time domain parameters discussed above are used as discussed in G. Krishnappa and M. Donovan, "TP 13472E Railway Bearing Diagnostics: Laboratory Data Analysis", National Research Council Canada, Vancouver, Canada, September 1999, herein incorporated by reference. This enhances the standard trending technique of monitoring for increasing magnitude.

The preferred embodiment, however, makes use of a high-frequency band pass envelope method, as has also been discussed as a method of early bearing degradation detection in SKF Reliability Systems, "Early Warning Fault Detection in Rolling Element Bearings Using Microlog Enveloping", Application Note CM3021, herein incorporated by reference. In their discussion, as well as others in the literature, special wide bandwidth accelerometers are used. In the ARMS device, the microphone can also be used to provide data processed according to the same method, due to the availability of wide bandwidth within the device unit itself, low power, and to the low cost of microphones versus the cost and power requirements of wide bandwidth accelerometers.

The use of microphones in the ARMS onboard application herein has some similarities with usages by the FRA in wayside applications was reported in two FRA publications. See, U.S. Department of Transportation Federal Railroad Administration, "Acoustic Detection Off Roller Bearing Defects: Phase II, Field Test", Final Report, National Technical Information Service, Springfield, Va., August 2003; and U.S. Department of Transportation Federal Railroad Administration, "Acoustic Detection Off Roller Bearing Defects: Phase III, System Evaluation Test", Final Report, National Technical Information Service, Springfield, Va., August 2003, both incorporated herein by reference. Although these were wayside applications, the bearing defect physical mechanism being measured and producing the high frequency signature is the same, i.e., surface crack nucleation and growth. See, J. Miettinen, P. Pataniitty, "Acoustic Emission in Monitoring Extremely Slowly Rotating Rolling Bearings", Proceedings of COMADEM '99. Oxford, Coxmoor Publishing Company, 1999, ISB 1-901892-13-1, pages 289-297, incorporated herein by reference.

The ARMS microphone 173 is in very close proximity (near field) to the bearing and is shielded from extraneous rail, track and other noise sources such as car bow waves. It is also shielded from neighboring bearings. Thus, continual monitoring of the same bearing with respect to a constant sensor location allows true trending analysis, allowing for reporting of the bearing condition to a user by an appropriate display device, to arrange for appropriate remediation. The benefits and success rate of the present system are at least as good as, if not superior to, TADS.

Bearing life under field conditions is highly dependent on many factors, especially load, as discussed in Amsted Rail Group, "Technical Forum, Bearing Life, Fatigue Life vs. Service Life in Freight Car Applications", www.amstedrail.com/tech_sheets/9001.asp, herein incorporated by reference. However, under rated load conditions, if installed within the specified cleanliness, mounting and alignment, the predicted $L_{10}$ life should be reached or exceeded. See Timken, "Calculate Bearing Life", www.timken.com/products/bearings//fundmen/calculate.asp, herein incorporated by reference. Regardless, $L_{10}$ will only be used as a guide in the broadest sense when determining this first state of bearing degradation.

In the low-frequency analysis of the microphone output, the algorithm preferably takes advantage of the ultrasonic resonance frequencies of the truck as being particularly meaningful in terms of output of the microphone, and any initial high-pass or band-pass filter should allow passage of one or more of those ultrasonic resonance frequencies.

To process the ultrasonic sound, the output of the microphone is passed through a preprocessing circuit, i.e., signal conditioner 178 of FIG. 8, before the microphone output is converted to digital and analyzed by the microprocessor of the node. In the preferred embodiment, the microphone analog signal conditioning comprises passing the output to a high-pass filter allowing passage of frequencies of 19.5 KHz (or about 19.5 KHz, e.g., 20 kHz) and above, which obtains the ultrasonic sound of the axle. A band pass filter passing only a band of frequencies from 19.5 kHz or 20 kHz up to 30 or 40 kHz may also be employed. (The microphone of the preferred embodiment is responsive only up to about 45 kHz)

The ultrasonic output of that high-pass filter is then passed through an amplifier with a gain of 11, or about 11, and that amplified output is then sent to a ½ wave rectifier and load having a time constant of 0.68 ms (or approximately 0.68 ms). The result is a rectified waveform output.

The rectified output is then sent to a low-pass filter transmitting only frequencies that are below a highest frequency of interest, which may be the third higher harmonic of the cone frequency, but is preferably only high enough to allow passage of the cone frequency. In the preferred embodiment, with the railway truck involved, the low-pass filter passes only frequencies of 290 Hz or below (or approximately 290 Hz or 300 Hz or lower). The output of the low-pass filter output is then analyzed by the node circuitry. Instead of a low-pass filter, a band-pass filter transmitting frequencies only in a range of about 1 Hz to a frequency above the highest frequency of interest, e.g., 290 Hz or 300 Hz, may also be used. The resulting output is the periodic peaks in the ultrasonic signal that are repeating at a frequency of less than 290 or 300 Hz (depending on the range of the low-pass or band-pass filter). This conditioned output is then converted to digital and transmitted to the microcontroller for sampling and analysis.

That analysis of the digital conditioned output of microphone 173 is performed, as described above, by the microprocessor using a discrete Fourier transform implemented by software instructions stored in memory thereof to yield the frequencies of interest for the associated wheel and bearing assembly. Responsive to detection of one or more spikes occurring at one or more of the failure frequencies derived, or of combinations of peaks in those frequencies as described in the literature as characteristic of bearing degradation, the microprocessor generates and transmits data over the node network that is indicative of a first or second stage of bearing degradation. In addition, the ultrasonic data may also be used to determine the third or fourth stages of bearing degradation discussed below by a process analogous to that described for analysis of the accelerometer data. Generally, the processing of the conditioned ultrasonic data signal from the microphone is processed similarly to the conditioned output of the accelerometers, in that the defects being screened for are periodic peaks repeating at the above described defect frequencies, either as periodic peaks in ultrasonic frequencies or periodic peaks repeating at the same frequencies in lower accelerometer resonance frequencies of the truck.

In addition, the microphone output is analyzed by a purely high-frequency analysis in which the raw data from the microphone is screened for its intensity. For high frequency analysis, the microcontroller collects 0.05 seconds of raw data from the microphone converted to digital at 180 KSPS (kilosamples per second), allowing for four data points to be acquired for each cycle of a 45 kHz signal, resulting in the collection of 9000 data points. This raw microphone data is analyzed using time domain data analysis including Peak, RMS, Crest Factor and Kurtosis as described in Howard, supra.

In the preferred embodiment, high frequency analysis includes passing the raw microphone analog signal through a high pass or band pass filter that transmits only frequencies above 19.5 or 20 kHz, and preferably up to at least 30 kHz or 40 kHz, which may be the initial high-pass or band-pass filter of the signal conditioner described above. This filtered analog signal is rectified and converted to digital, and then compared with a predetermined alarm threshold data value stored by the microcontroller to determine if the amplitude of the ultrasonic output exceeds that threshold value. If so, historical data is examined by the microcontroller to determine if the high ultrasonic signal has been present for a period of time that is indicative of a potential failure, meaning that historical ultrasonic intensity data stored in the microcontroller and the current data value are screened for exceeding a preselected maximum threshold value for more than a predetermined period of time, constituting an extended loud ultrasonic sound that would be indicative of a defect. Responsive to determining that the intensity has exceeded the threshold for a period longer than that predetermined time limit, the microcontroller transmits over the network data indicative of the condition, which is received at the locomotive for processing as an alarm or other type of report to alert an operator.

2. Accelerometers

In the preferred embodiment, the accelerometers are Analog Devices ADXL203 accelerometer with a 2.5 kHz bandwidth, and are mounted on the wheel so as to provide radial or vertical acceleration data to the ARMS node.

It has been noted that the resonant frequencies of a railway truck of common design produced vibration peaks at some specific frequencies when subjected to a test impact, which were primarily in the range of about 200 to about 700 Hz, and specifically, for the truck tested, having x-axis resonance peaks at 299 Hz, 408 Hz, and 633 Hz, and a y-axis resonance peak at 648 Hz. Accelerations due to various bearing defects, and any other conditions, are reflected especially in these resonance frequencies of the trucks. Due to the standard configuration of trucks, of which there are usually only a few types in service, these resonance frequencies are exemplary of a substantial number of trucks.

The output of the accelerometers is preferably analog signals, and these are processed to enhance the quality of data derived. To take advantage of the resonance frequencies of the truck as being particularly meaningful in terms of output of the accelerometers, the outputs of the accelerometers (both x (or axial) and y (or radial) axes) are passed through a preprocessing circuit, i.e., signal conditioner 178 of FIG. 8, before the accelerometer outputs are analyzed by the microprocessor of the node.

The signal in the preferred embodiment is split into two signals, each of which is sent through signal conditioning 178. One of these signals is conditioned as set out above for the microphone output except that it is sent through a high-pass filter that permits only frequencies of 200 or 300 Hz or above to pass, which transmits the accelerations of the axle that preferably have the resonance frequencies of the truck, which are usually above about 300 Hz to about 900 Hz. A band pass filter may also be used instead of the high-pass filter, but preferably the upper limit of passed frequencies in the band-pass filter is 2 kHz or higher, the upper limit of the accelerometer detection being at 2.5 kHz max, and the filter should pass at least one resonant frequency of the truck. This filtered output signal is then transmitted to an amplifier and amplified with a gain of about 11. The amplified signal is sent to a half wave rectifier and load with a time constant of about 0.68 ms, yielding a rectified waveform signal. The rectified signal is sent through a low pass filter or band pass filter that filters out frequencies substantially above the highest frequencies of interest in the bearing degradation analysis, preferably, e.g., 290 or 300 Hz, yielding a signal that is composed of any periodic peaks in the accelerometer data that repeat below that frequency.

Figure 30:
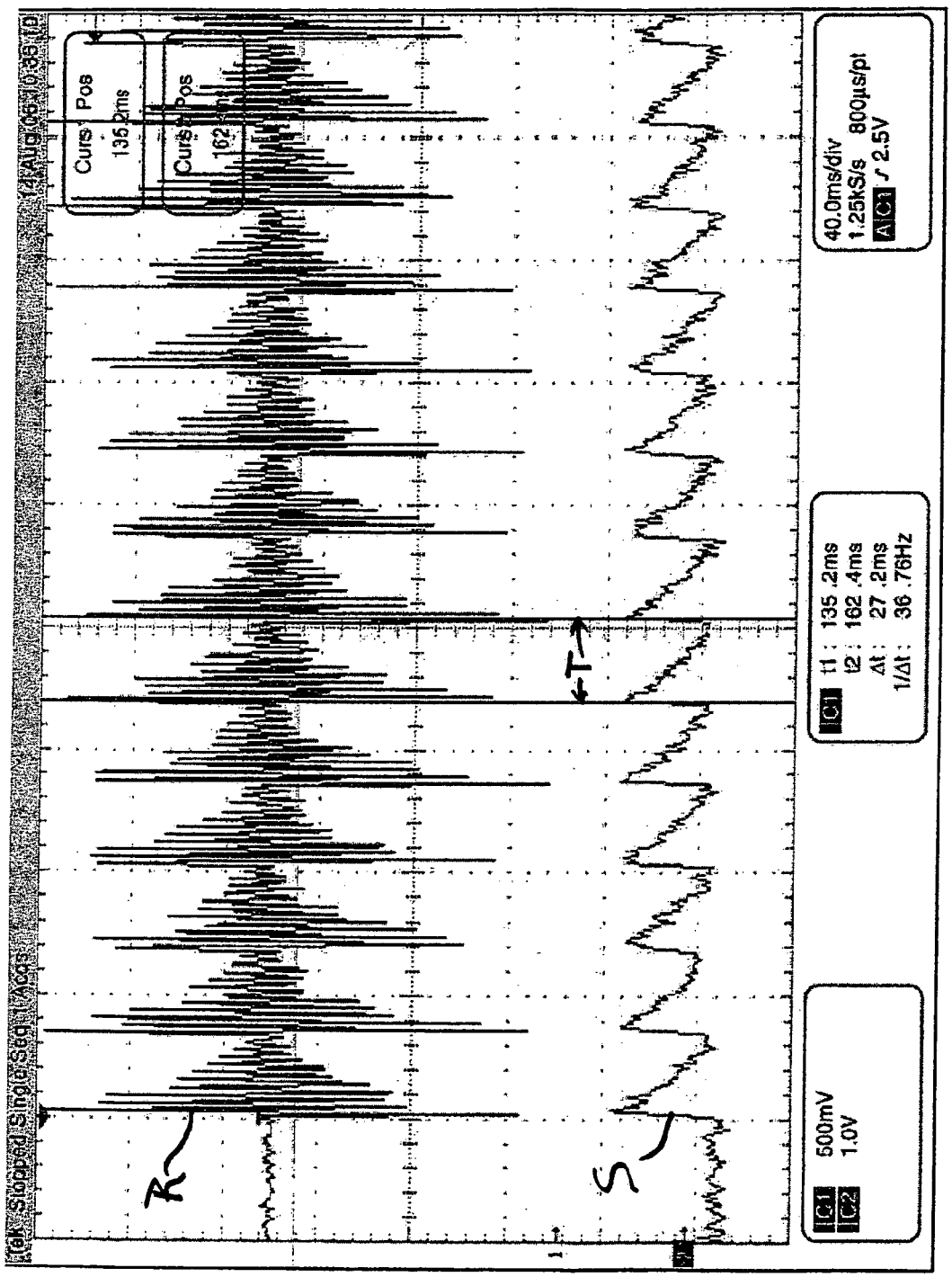
FIG. 30 is a graph showing raw accelerometer output and the accelerometer output after signal conditioning.

This type of conditioning is illustrated in FIG. 30. The raw analog output of the accelerometer is shown as R. This is a large amplitude wave made up of a frequency of about 500 or 600 Hz that repeats in pulses of intensity at about 37 Hz. (i.e., at interval T) The high-pass filter of the signal conditioner passes this high frequency out of the input, rectifies it, and then sends it through a low pass filter passing less than 300 Hz. The result is output S, which exhibits periodic repeating peaks at about 37 Hz. This output can then be digitized and analyzed whether the bearing defect frequencies are present.

Preferably, the other of the signals derived from the accelerometer is transmitted through a similar circuit, but without the initial high-pass filter, only the amplifier, rectifier and low-pass (or band-pass) filter, and the two conditioned digital signals are then combined and sampled by the microcontroller. The resulting samples are subjected to the discrete Fourier transform to identify therein the frequencies identified above, and determine if the accelerometer output includes any periodic peaks repeating at any of the listed defect frequencies.

Alternatively, a simple band-pass or low-pass filter transmitting only a range of frequencies that includes some of the major resonance spikes of the railroad truck, such as, for the truck of the preferred embodiment, 2000 Hz or less, and preferably below 800 Hz, and even a range wholly below approximately 300 Hz, can be used to condition the accelerometer output. Different frequencies may be used, however, with different railroad trucks, since these may have differences in their resonance frequencies. Fundamentally, the range of frequencies transmitted must include the defect frequencies of interest, and at least one resonant frequency of the truck, to ensure that any repeating peaks formed by acceleration resonance at that frequency are permitted to pass.

This device has demonstrated capability and is used to detect the third stage of bearing degradation (see Gluzman, supra, Reliability Direct, supra) when approximately 1% to 5% of the bearing life remains. At this stage, a single bearing defect frequency appears without 1×RPM sidebands. Subsequently, harmonics of the single defect frequency appear. Next, 1×RPM sidebands surround the bearing defect frequency. Finally, other bearing defect frequencies appear as the bearing damage propagates. Gluzman, supra, claims this signature occurs in 80% of the monitored bearing failures. The ARMS node screens the data obtained for these characteristics.

Because there is such a characteristic signature, it can easily be detected by the continual onboard monitoring offered by ARMS. The bearing defect frequencies, from the equations above, are shown in Table 1 for various speeds. The accelerometer has the ability to monitor beyond the third harmonic of the cone defect (208 Hz×3=624 Hz) when traveling at 100 MPH.

TABLE 1

| MPH | Cup Defect (Hz) | Cone Defect (Hz) | Roller Defect (Hz) | Rotor Frequency (Hz) | Rotation Degrees/second |
|---|---|---|---|---|---|
| 25 | 42.1 | 51.9 | 19.2 | 4.1 | 1476 |
| 50 | 84.3 | 103.8 | 38.4 | 8.2 | 2952 |
| 100 | 168.6 | 207.6 | 76.7 | 16.4 | 5904 |

Allowing bearing defects to progress to within 5% or less of remaining life minimizes or reduces the cost of premature bearing replacement, and with the ARMS system can safely be achieved. With the continual onboard monitoring offered by ARMS, trending ensures detection of this failure signature with time to remediate.

Additionally, the accelerometer also detects the last (fourth) stage of bearing degradation (see Gluzman, supra, Reliability Direct, supra) when approximately 1% of the bearing life remains. At this stage harmonics of the rotation speed appear and only the primary bearing defect frequencies with sidebands remain. The higher harmonics of the defect frequencies disappear.

Although particularly effective for later stages of degradation, the accelerometer data may also be used to detect earlier stages of bearing degradation as well.

The ARMS microprocessor screens the accelerometer data using the discrete Fourier transform for the various defect frequencies and identifies these peaks in defect frequencies and their harmonics, or the rotor frequency, that are characteristic of specific defects or degrees of bearing degradation or wear as set out above. Based on the identification of defect characteristics in the Fourier transform analysis, the ARMS node then reports over the node network to the locomotive the condition of the bearing, indicating the condition of the bearing, or, at the least, where appropriate, an alarm condition based on the nature of the peaks detected and the above protocols for assessing the stage of bearing degradation and the projected remaining bearing life.

Detection of Other Defects and Conditions

Also, the ARMS node relies on data from the accelerometer 171 to detect wheel flats and car hunting.

As described by A. Bracciali, G. Lionetti, M. Pieralli, "Effective Wheel Flats Detection Through Simple Device", Dipartimento di Meccanica e Tecnologie Industriali—Univesita di Firenze via Santa Marta, 3-50139 Firenze, General Electric Transportation Systems S.p.A. via P. Fanfani, 21-50127 Firenze, (herein incorporated by reference) the vibratory response to wheel flats is concentrated below 1 kHz due to the mismatch in wheel and rail impedance. In that article, the authors described an approach using Hilbert transforms, unbiased autocorrelation and power spectral density estimation to determine with very high confidence the existence of a wheel flat condition.

A similar technique to the one described in the referenced article, modified for onboard monitoring vs. wayside as described in the article, is used by the ARMS node 125 to detect wheel flats. Detection of a flat is usually made responsive to a spike in acceleration (vertical or radial) one every revolution of the wheel. A spike at the calculated frequency of rotation of the wheel is considered a flat by the ARMS microcontroller.

Low frequency transverse acceleration, i.e., in the direction of the axis of rotation of the axle 135, is also monitored to determine if car hunting is present. The low frequency transverse acceleration due to car hunting is evident in the accelerometer signal as a frequency that can be readily picked up against the background of the accelerometer data reflecting transverse acceleration.

When the microprocessor detects either a flat or of hunting, the microprocessor generates data indicative of the condition and transmits it over the node network to the locomotive. The locomotive computer system, responsive to that data then generates an appropriate alarm or indication to prompt a human user to take remedial action.

Low Energy Sampling and Data Processing

According to a particularly preferred embodiment, the microprocessor samples and processes the accelerometer and microphone outputs using a method that takes advantage of the fact that the defect frequencies derived using the above formulae for cup defect frequency, cone defect frequency and roller defect frequency, are products of the rate of revolution of the wheel multiplied by a constant based on the bearing geometry. Expressed in another way, the ratio of the defect frequency of each type of defect to the rate of rotation of the wheel is constant at all velocities.

Whichever signal conditioning is used, the node processor of the preferred embodiment is programmed to receive the output of the accelerometer and process it according to the following method.

1. The ratio of the frequency of the cup defect frequency, cone defect frequency and roller defect frequency to the wheel rotation rate is determined based on formulae (1), (2) and (3) above, i.e., the ratios using the bearing geometries of the truck in question as defined above, according to the formulas $$\text{cup defect ratio} = (N/2)[1-(Bd/Pd)\cos(\text{phi})] \quad (4)$$

$$\text{cone defect ratio} = (N/2)[1+(Bd/Pd)\cos(\text{phi})] \quad (5)$$

$$\text{roller defect ratio} = (\tfrac{1}{2})(Pd/Bd)[1-(Bd/Pd)^2 \cos^2(\text{phi})] \quad (6)$$

The results are determined to three decimal places and supplied to the ARMS node unit applied to the wheel. As an example of the nature of the frequency data calculated, a calculation was performed for a standard truck bearing. The cup defect to rotation frequency ratio for a wheel was determined to be 10.306; the cone defect to rotation frequency ratio was determined to be 12.694, and the roller defect to rotation frequency ration was determined to be 4.692.

This may be done at the factory by loading the various frequency ratios for the defects into the node flash memory to be accessed by the microprocessor once the node is installed. Alternatively, the node may be programmed at the time of installation by a human operator via the Zigbee wireless communication system by a suitable computerized device, such as a handheld PDA equipped with a Zigbee communications card that interfaces with setup software stored and running on the microprocessor. The software on the microprocessor allows the operator to set up the parameters of operation of the ARMS node, including the defect frequency ratios, either by direct input or by selecting the type of truck on which the node is being installed and directing the microprocessor to load the appropriate corresponding frequency ratio data from flash memory.

2. The ARMS unit, once installed on the wheel, and when activated by the rotation of the wheel, begins processing the output of the accelerometer by determining the duration of the data to be included in the sample set to be analyzed. According to the preferred embodiment, the total sample data duration for an analytical step is ten (10) revolutions of the wheel.

3. The ARMS unit also calculates a data value controlling the frequency or rate of sampling in the sample duration, meaning the frequency (samples per second) of the sample data points taken from the accelerometer. The frequency of the sampling should be at least twice the cone defect frequency to be able to detect any defect, and is preferably at least three times the cone defect frequency, and in the most preferred embodiment at least nine (9) times the cone defect frequency. The cone frequency ratio is used as the determining factor because it is the highest ratio of the three ratios determined, and the sample frequency needed to detect the cone defects will necessarily be adequate to detect the cup or roller defects. Expressed in a slightly different way, the frequency of sampling is preferably a data value determined 9 times the cone defect ratio times the rotation speed of the wheel in rps (rotations per second).

A data value is also determined for the time between samples, i.e., seconds per sample, which is the simple inverse of the frequency of sampling. The number of samples in the sample duration can be derived as the product of the sample duration times the sample rate. This is a constant data value, independent of the rate of rotation.

For the exemplary defect ratios identified above, the number of samples per sample duration was 1142 or 1143 samples for all rotation speeds of the wheel. The number of bytes required for this set of data is 4 bytes per each sample, comprising 12 bits (requiring two bytes) for the x-axis accelerometer data, and 2 bytes (for 12 bits) for the y-axis accelerometer data. The total required for this bearing configuration is therefore 1146×4 bytes, roughly 4.6 kilobytes, stored in the RAM of the processor.

4. When all the data points are acquired from the accelerometer for the data sampling duration, the data is then subjected to a focused discrete Fourier transform, in contrast to a fast Fourier transform, to identify the presence of the cup, cone and/or roller defect frequencies, or their harmonic overtones, in the accelerometer data. A discrete Fourier transform allows data values representing a specific frequency to be calculated without requiring calculation of all possible frequencies, as in a fast Fourier transform. Because the frequencies of the various defects are a few known frequencies of the spectrum, the discrete Fourier transform is over-all preferable in terms of energy costs and speed of total computations of the frequency data values.

The discrete Fourier transform is implemented by the ARMS processor to derive data values corresponding to the presence in the sample data of the following sixteen frequencies:

1. rotation frequency (indicative of a flat in the wheel)= Line 1×10;
2. cup defect frequency=Line 10.306×10 of the exemplary data;
3. cone defect frequency=Line 12.694×10 of the exemplary data;
4. the roller defect frequency=Line 4.692×10 of the exemplary data;
5. cup defect frequency+rotation frequency=Line 11.306× 10 of the exemplary data;
6. cup defect frequency−rotation frequency=Line 9.306× 10 of the exemplary data;
7. cone defect frequency+rotation frequency=Line 13.694×10 of the exemplary data;
8. cone defect frequency−rotation frequency=Line 11.694×10 of the exemplary data;
9. the roller defect frequency+rotation frequency=Line 5.692×10 of the exemplary data;
10. the roller defect frequency−rotation frequency=Line 3.692×10 of the exemplary data;
11. 2×cup defect frequency=2×Line 10.306×10 of the exemplary data;
12. 2×cone defect frequency=2×Line 12.694×10 of the exemplary data;
13. 2×roller defect frequency=2×Line 4.692×10 of the exemplary data;
14. 3×cup defect frequency=3×Line 10.306×10 of the exemplary data;
15. 3×cone defect frequency=3×Line 12.694×10 of the exemplary data; and
16. 3×roller defect frequency=3×Line 4.693×10 of the exemplary data.

The term "line" means that the discrete Fourier transform extracts the waveform having that many wavelengths per the entire sample period, which represents ten revolutions of the wheel. Accordingly, Line 1×10 is the frequency of revolution of the wheel. The factor "×10" is due to the fact that the sample period is ten times the rotation rate resolution as previously discussed.

In other words, the discrete Fourier transform detects the presence of the defect frequencies, and their first and second harmonic overtones, in the data samples. The discrete Fourier transform is preferable to a fast Fourier transform in this situation because the frequencies of interest are limited, and calculating those frequencies values with the discrete Fourier transform requires less energy than the fast Fourier transform would require to determine all of the frequency data values.

Detecting these 16 frequency data values requires 32 bytes of data, i.e., two bytes each. The microprocessor of the preferred embodiment, the Texas Instruments MSP430FG4618 has 8 kilobytes of RAM and 116 K of flash memory, which can accommodate more frequencies around the calculated defect frequencies screened for, to allow for any slight variation in the accuracy of the detection of the rate of rotation of the wheel. Accordingly, the discrete Fourier transform is further used to derive data values corresponding to the presence in the data samples of twenty (20) lines of frequencies in steps of 0.5 to 1 Hz above and below the above-defined defect frequencies and their harmonic overtones, i.e., ±0.5 or 1 Hz to 10 to 20 Hz of the identified exemplary frequencies. It may be noted that the range of frequencies is preferably enough to allow analysis of the defect frequency plus and minus the wheel rotation frequency. The size of the incremental difference of frequency varies with the rate of rotation of the wheel because it is is expressed as a ratio of wheel rpm, as are all other frequencies of interest. At some rate of wheel rotation, however, the increments are desirably in the 0.5 to 1 Hz range. If the wheel turns faster, the increment will become larger in real terms, although its ratio to the wheel rpm will remain constant.

The discrete Fourier transform is performed according to any numerical computing method therefor known in the art. In the preferred embodiment, the microcontroller performs a software implemented algorithm for each of the above 16 defect frequencies, and for each of the ten frequencies above and below each of the defect frequencies. For each frequency kk, representing a number that is 10 times the ratio to wheel rpm, being detected, the following iteration is performed:

Cosine coefficient and sine coefficient data fields are zeroed.

For o=1 to the number of time domain samples (e.g., 1143 samples) in a sample data value array in which are stored all the sample data values obtained for the current analysis period, the following steps are performed:

cosine coefficient=cosine coefficient+sample data value (o)*cos((o−1)*sample time, i.e., the time interval between consecutive data samples*3.1415927*2*kk/ (sample duration, the total sampling period of ten revolutions of the wheel))

sine coefficient=sine coefficient+sample data value (o)*sin ((o−1)*sample time*3.1415927*kk*2/(sample duration))

Next o is then iterated until o exceeds the number of samples.

The totals are then scaled, i.e., cosine coefficient=(cosine coefficient)*2/number of samples sine coefficient=(sine coefficient)*2/number of samples An array of data values is loaded with a magnitude value for each of the frequencies pulled out of the sample data by the Fourier transform, the magnitude value for the frequency kk being determined as:

Magnitude Of Defect Frequency (kk)=Square Root (cosine coefficient $^2$+sine coefficient $^2$)

The magnitude value array is filled with a data value for each defect frequency and the adjacent frequencies screened. This array is then reviewed for magnitudes above predetermined threshold values, i.e., peaks, and for peaks that represent characteristics of bearing wear or also of wheel flats.

If the above-described signal conditioning is used, there is no aliasing problem because the output of the conditioning circuit is filtered for frequencies below about 290 or 300 Hz. However, if a different type of signal conditioning, or no conditioning, is used, then the use of a sampling frequency that is dependent on the rate of wheel rotation raises a potential issue of anti-aliasing filtering, specifically, whether any anti-aliasing filter should have a varying anti-aliasing transition band as well. Generally, an anti-aliasing filter will be a low-pass filter or a filter that attenuates or tapers off the transmission of frequencies above a certain frequency, e.g., at or above 200 Hz. If an anti-aliasing filter is provided with a −3 dB point at approximately 200 Hz, it will meet the anti-aliasing requirements at a reasonable threshold speed, e.g., 20 mph, and will also meet the requirements at any higher speed. This may attenuate the $2^{nd}$ or $3^{rd}$ harmonics in some cases, but not completely, and the effect will be a constant one that can be compensated for in the processing of the data, i.e., spikes detected at these frequencies.

In such an embodiment, the anti-aliasing filter circuitry is part of the signal conditioning 178 shown in FIG. 8, and is applied to the analog signal before conversion to digital, either before the signal conditioning is applied or after it is applied, depending on the nature of the conditioning and the qualities of the raw signal being processed.

5. Detection of defects is accomplished by screening the Fourier data for peaks that are characteristic of the various types of defects and degrees of bearing degradation according to the methods described above, which are known to those of skill in the art and described in the references incorporated herein by reference. If any of the data values for the defect frequencies or relevant nearby frequencies, such as ±wheel rps, exhibits a spike in the data sample for that frequency, the ARMS unit for the wheel processes the accelerometer data so as to derive data constituting an indication of the degree of bearing wear as set out above, and sends data corresponding to the degree of bearing wear or the appropriate defect indication (cone, cup or roller) through the network, as described elsewhere herein.

In addition, the continuous monitoring of the frequencies allows for a trending analysis at the node, and this provides high reliability of the bearing monitoring. The microprocessor stores at least partial data representative of historical peak levels in dB or other units, and changes therein that exceed a pre-selected threshold trigger special processing and alarm data generation and transmission to the locomotive system.

3. Temperature Sensor

The temperature sensor is preferably an Analog Devices AD590 temperature sensor with a range from −55° C. to +150° C. and ±0.5° C. accuracy. It is used to detect the last (fourth) stage of bearing degradation (see Gluzman, supra, Reliability Direct, supra) when approximately 1% of bearing life remains, or when catastrophic lubrication failure occurs. As will be readily understood, when the temperature of the bearing becomes abnormally high, the cause is likely to be friction due to lubrication failure, indicating imminent catastrophic failure of the bearing.

Referring to FIG. 8, temperature sensor 175 connects with a comparator circuit with an adaptive trip point 181 that triggers an interrupt when the temperature detected exceeds a certain preselected threshold value. The interrupt generated by the comparator 181 is processed as a failure alarm, as will be detailed elsewhere herein.

The comparator 181 is preferably a software-implementation in which the microprocessor 177 compares a digital signal indicative of the temperature to a stored data value corresponding to the preselected temperature threshold value, and then transmits data indicating imminent failure over the node network to the locomotive. Alternatively, a hardware-based system may be used in which the temperature is compared via an analog comparator 181 that latches up so as to create an interrupt for the microprocessor when the signal indicates that the temperature of the bearing is above a pre-selected threshold level, triggering alarm processing and alert transmission by the microprocessor. The microcontroller 177 thus triggers an alert action when the temperature detected for its associated wheel exceeds a pre-selected threshold temperature.

The node unit uses the temperature sensor not only to monitor absolute temperature but also calculates from its output a temperature rate of change. The micro-controller monitors the absolute temperature and temperature rate of change for any "out of family" measurements based on trending analysis.

As previously discussed, the temperature sensor is located with the other sensors on the ARMS sensor array assembly and placed in contact with the wheel axle assembly. This sensor serves the same monitoring function as the Hot Box Detector (HBD) but due to its intimate contact with the wheel axle assembly yields superior performance.

4. Rotation Sensor

The rotation rate sensor 170 is preferably an Analog Devices ADXRS300 angular rate sensor, which, when modified per application note AN-625, can measure up to 50,000°/sec. For the ARMS application, the range is adjusted for a maximum of 6500°/sec., which equates to approximately 110 MPH, or optionally to as much as 7000°/sec.

The rotation rate sensor 170 measures the rotation rate of the wheel, and this sensed rotation rate is used to calculate the expected bearing defect frequencies at the current train speed. This feature greatly enhances the detection capability, because it allows prediction of the exact bearing defect frequencies for comparison to the actual measured data.

Detection Algorithms

The ARMS system detects problems with the bearings of the railcars using algorithms that include the enveloping technique and the classic bearing equations above. According to Howard, supra, the enveloping technique was developed in the early 1970's and the classic bearing equations were published in 1947 or earlier. Gluzman, supra, theorizes that the four stages of bearing failure can be detected using these two techniques. ARMS can apply any of the prior art processes for detection of bearing defects advantageously, due to its on-board sensing and processing capabilities, which provide immediate analysis and rapid reaction to any detected problems.

It has, however, been stated in the literature that track imperfections make it impossible to measure or detect wheel bearing defect frequencies using the standard defect frequency equations common to bearing defect analysis for a railcar in a train as it is rolling down normal commercial track.

To overcome this problem, the ARMS system employs a novel approach to detection of the defect frequencies.

According to one embodiment, the ARMS detection algorithm restricts when and under what conditions the measurements of acceleration are performed. In this embodiment, specifically, the accelerometer outputs are tested only in periods where the train is at a fairly high speed, e.g., from 50 to 54 mph, for more than a short interval of time, as indicated by the wheel rotation sensor.

Also, if the time domain data reflects large transient events, such as those produced by rail imperfections, output during that time period is not used to determine the bearing condition. Once the data is so restricted, enveloping and the basic bearing defect equations are used to detect if there is a defective bearing, roller or other component.

According to Howard, supra, due to the simplicity of the bearing being monitored, compared to turbines or engines, and the close proximity of our sensor to the bearing only these simple techniques should be required.

In addition, absolute temperature and temperature rate of change are monitored and analyzed by the comparator and micro-controller for the detection of bearing fault conditions. When a railroad wheel bearing is very near catastrophic failure the temperature rapidly increases. When a predetermined trip temperature is reached, data is automatically acquired and the rate of change is used to determine if a catastrophic failure is imminent. Similarly, when the absolute temperature or the temperature rate of change exceeds a pre-selected threshold trigger value, a bearing defect or imminent failure may be determined to exist, and appropriate alert action taken responsive to the determination.

Since ARMS is a constant monitoring system trending analysis, monitoring for rapid increases and out of family magnitudes, will also be applied to all other sensor data. This includes the output of the microphone, which is transmitted to comparator 181 of micro-controller 177. If the noise detected exceeds a pre-selected threshold noise level or hits an out-of-family magnitude, etc., either at a particular frequency range or in total, the ARMS device determines that a bearing fault condition or failure is present or imminent, and takes appropriate alerting action, as will be set out below.

The processing set out above is used by the microprocessor to derive from the accelerometer or other sensor outputs data indicative of the degree of wear of the associated bearings, especially assessing the third and fourth stages of bearing degradation, when the bearing reaches 5% remaining life and 1% remaining life.

Thus the ARMS node performs screening for a number of defects by a number of methods relying on output of the three sensors, temperature, microphone and accelerometer:

1. Temperature levels and sudden increases of temperature trigger an alert of imminent bearing failure;
2. High frequency sound analysis from the microphone may be used to trigger an alert if an ultrasonic sound above a threshold and longer than a preselected time period is detected.
3. Low frequency sound analysis is used to determine, based on the presence of peaks at the sixteen frequencies screened, data indicative of degree of wear of the bearing, especially where the bearing has 5 to 20% life left, and optionally when the bearing has reached 1% or less of life left, which data is transmitted to the locomotive system.
4. Low frequency accelerometer data analysis is used to determine the degree of wear of the bearing, especially where between 1 and 5% of the life of the bearing remains, and this is also transmitted to the locomotive system.
5. Accelerometer or ultrasonic data is analyzed for peaks at the wheel rotation frequency, indicating a wheel flat, and data alerting a user of the condition is sent to the locomotive system.

Self-Assembling Discriminatory Network Formation

The present invention also involves a novel system and method involving a self-assembling discriminatory mesh network, based on some commonly sensed parameter of the environment by all the nodes that are assembled into the network. This network is particularly advantageously used with recently developed low power, low cost, unlicensed frequency band, and adequate range wireless communication technology, e.g., Bluetooth or Zigbee.

The wireless communication solution is preferably the IEEE 802.15.4 compliant Zigbee transceiver. The use of the Zigbee standard means that the network forming protocol and formatting is part of the user supplied programming tools, and thus does not have to be created as part of this project. Zigbee operates in either the 902 MHz to 928 MHz range with a data rate of 40 kbps or the 2.4 GHz unlicensed band with a data rate of 250 kbps. Peak power during transmission and reception is approximately 100 mW, but power during message preparation and processing is only 0.9 mW for an average power of approximately 17 mW. Zigbee can form a mesh network that allows limitless linear range as long as the maximum straight-line distance between any two network nodes is less than 100 meters, the transmission distance limit for a single node.

As applied to the railcar monitoring application to which the invention is particularly useful, the self-assembling discriminatory mesh network allows only railcars that are coupled into the train of interest to join the network of the train. As is well known in the art, railcars are routinely coupled into and removed from a particular train construct. The self-assembling network method consequently limits and discriminates between railcars that should join the particular construct of interest and those railcars that are not appropriate for the network, i.e., are not in the same train.

The self-assembling discriminatory network self assembles communication nodes that are experiencing a common environment. The common environment that is used for discrimination is preferably the rotation rate of each wheel that is monitored by the ARMS on-board rotation rate sensor.

The method of assembly of the train network proceeds as follows:

The nodes on a stationary car are generally in a low-power sleep mode in which the power demands of the circuitry thereof are extremely low, less than 5 mW, and most preferably less than 1 or 2 mW. A small amount of power is stored in the supercapacitor of the node to allow it to react if "pinged" by another node nearby, but there is almost no power consumption until that happens and the node can be dormant for a very long time, i.e., weeks or even months.

Figure 9:
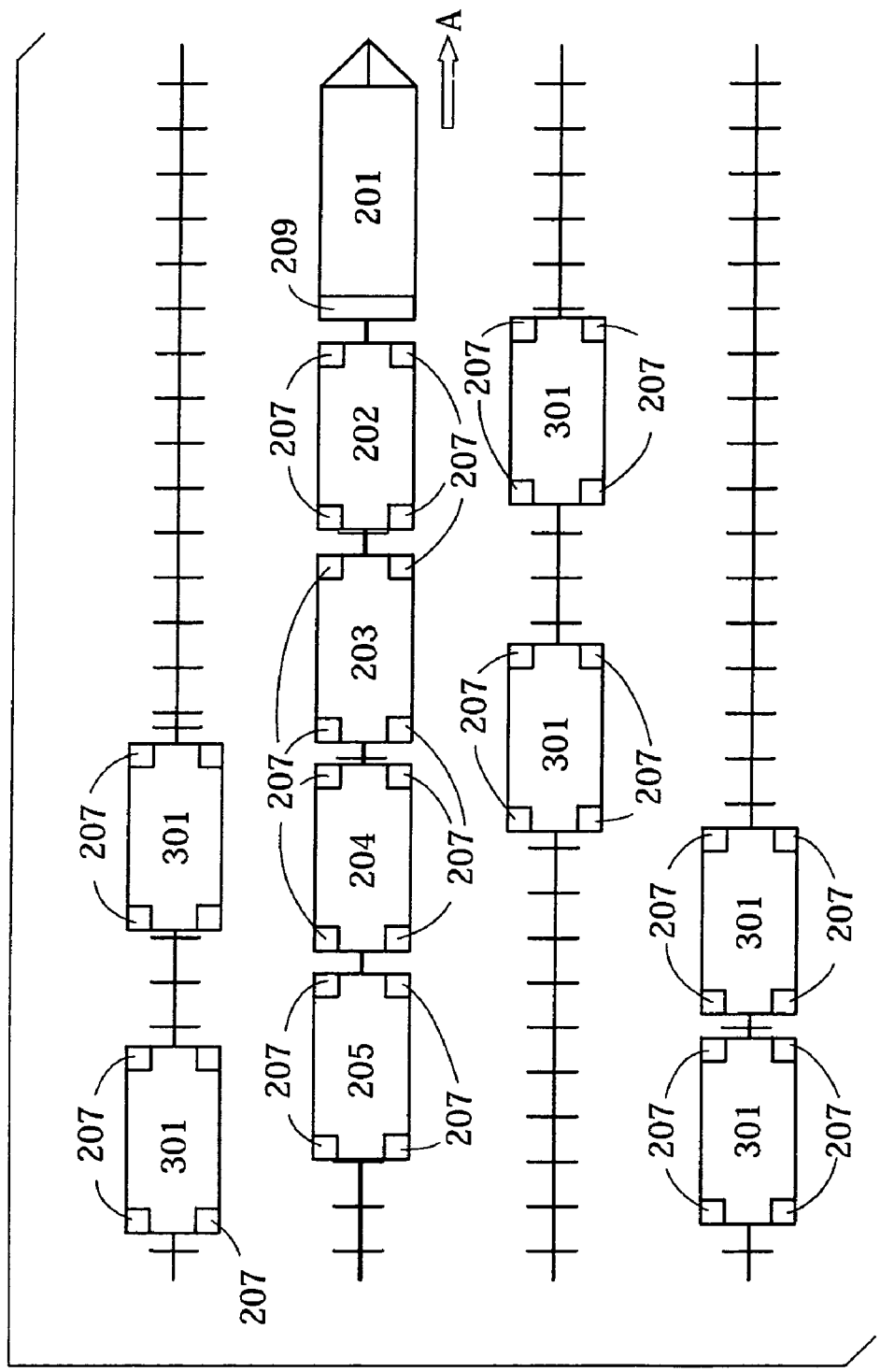
FIG. 9 is a diagram of a train having a self-assembled network passing through a rail yard.

As the train starts to pull out, each of the wheels of a car in the train with an ARMS device will begin to "wake up", as sufficient speed is reached to power the self-contained generator. Referring to FIG. 9, locomotive 201 is shown pulling cars 202 to 205, each of which is equipped with a set of ARMS nodes 207 and as described above as node unit 125, one for each wheel, in the direction indicated by arrow A. (In reality, each car would likely have eight nodes, one for each of the four wheels of each of its two trucks, but only four are shown in the diagram for clarity.) The locomotive 201 also has a node 209, which also communicates by Zigbee, and links wirelessly to communications with the outside world. The node 209 in the locomotive preferably includes a larger computer system, having processors and data storage devices, such as disk drives, storing data received from the nodes of the train construct, and powered by electrical power available from the locomotive engine, and may link to or incorporate a railroad resource control hardware/software system such as IntelliTrain™.

Each wheel mounted node unit 207 is a "Full Function Device" (FFD) as defined in the IEEE 802.15.4 specification and thus the node units 207 of the rolling cars can "find" and communicate with each other, act as a router and communicate with the "Network Coordinator" that is located in the locomotive. Due to the range limitations, each wheel mounted device 207 is only capable of communicating with devices within a radius of 100 meters.

As the wheel-mounted node devices 207 wake up and reach operational voltage, they begin transmitting and looking for a network-forming coordination message from other FFDs and from the locomotive located network coordinator 209. The initial network-forming message consists of a pinging operation that allows all transceivers in range to find each other, to register themselves on the forming network and to coordinate initial communication to avoid message collision. This basic network forming functionality is implemented per the IEEE 802.15.4 specification and is incorporated by the Zigbee hardware manufacturers into their devices.

This communication pinging wakes up the other nodes in the communication radius of the nodes 207 that are already awake to engage in limited communication. The processor 177 in each node is a digital signal processor that has low power "sleep" modes, preferably the Texas Instruments TMS320C5509. These types of processors are specifically designed for the type of signal processing that is used to determine if the discriminator criteria is met by the specific node. This type of processor has "sleep" modes that allow external stimulus such as trip circuits on analog sensors implemented by comparator circuits or "wake up" calls from the transmitter/receiver to "wake" the processor from very low power "sleep" modes. This feature is commonly used for cell phones and other wireless systems, and allows for substantial power conservation, and allows wireless devices such as the nodes in this application to have long life when powered by batteries. Specifically, the generator first supplies power to the sensors, which begin to function, and then to the signal conditioning amplifiers, etc. When those components are adequately powered, the microcontroller begins to draw power until it enters the awake state, and then the Zigbee transceiver is powered, possibly by some residual power in the supercapacitor.

Specifically, with reference to FIG. 9, the nodes 207 on cars 202 to 205, as well as the locomotive coordinator, ping and wake up the nodes 207 on all nearby cars, including the stationary nearby cars 301, that are not in the train and are not moving.

As communication is established a tentative network is formed. However the FFD nodes 207 at this point may or may not be on the same train construct. In FIG. 9, the tentative network includes all railcars shown.

Figure 10:
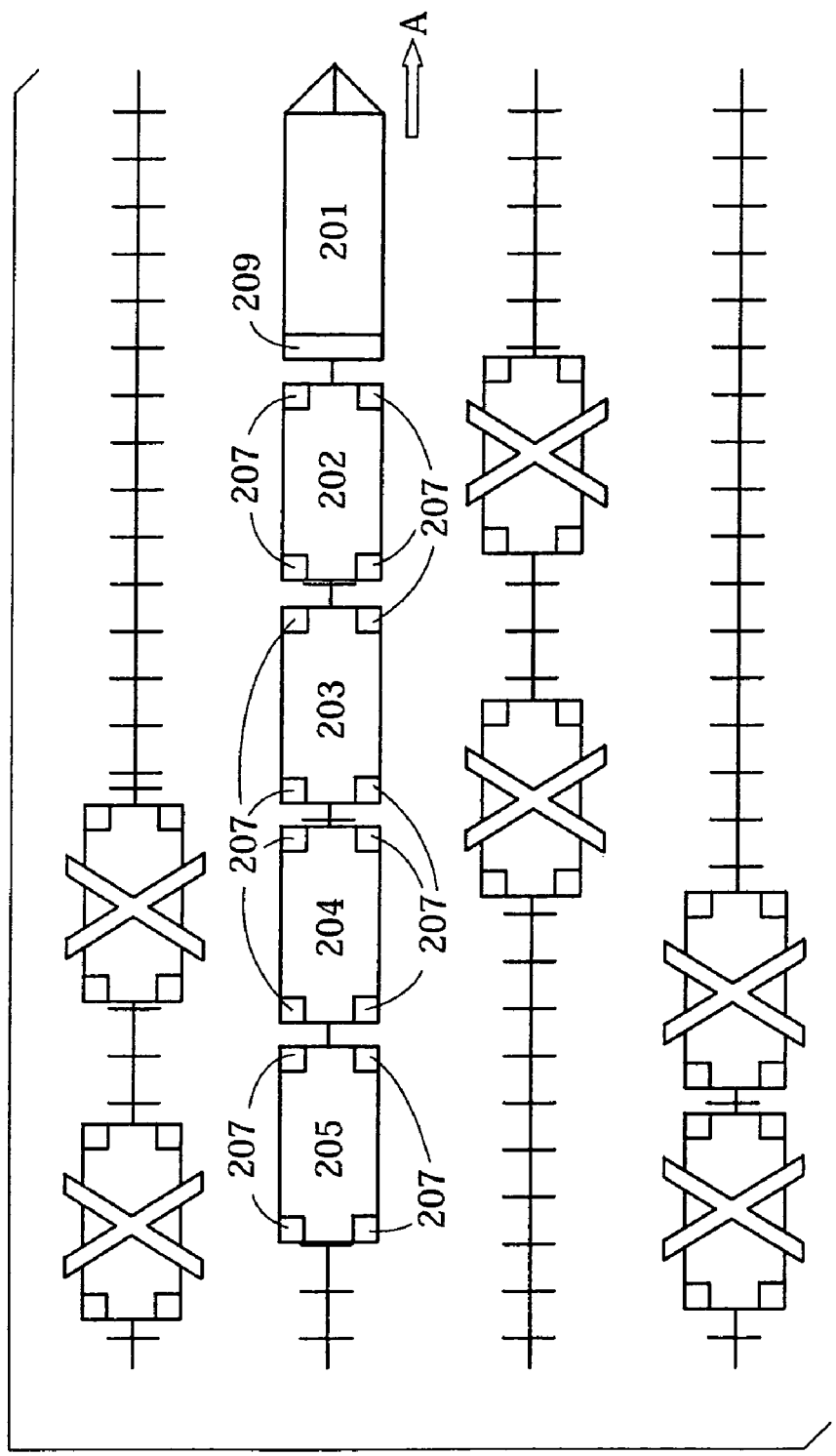
FIG. 10 is a diagram of the train of FIG. 9 illustrating those railcars that are excluded from the network.

The tentative network now starts the discrimination processing by comparing indications of the nodes 207 being on the same train construct. In the preferred embodiment, this is accomplished by comparing wheel rotation rates, although GPS velocities or other location parameters of the sort may be used as well, if supported by the component nodes 207. For cars in the train moving in direction A, all should have roughly the same velocity, and all wheels of that train should have the same rotation rate. Wheels (FFDs) that do not share approximately the same rotation rate, for example within a range of 2% above or below a train speed data value, are eliminated from the tentative network. This process of rotation rate verification and discrimination is continued for several message cycles to ensure that all appropriate wheels are joined to the network. Generally, nodes on the train in motion will drop communication with the nodes of the stationary cars 301 in the rail yard. The result is the arrangement of FIG. 10, wherein only the moving railcars are communicating with each other, and the rest are released to sleep again.

At this point FFD serial numbers are exchanged between the wheel mounted devices of cars 202 to 205, which are deemed on the network, and this data is transmitted, by jumping car to car, through the wireless mesh network of the train construct to the network coordinator 209 in the locomotive 201. The network coordinator 209 stores data received from these nodes regarding the identity of the railcars, the conditions of the bearings, and any and all other data available from the nodes 207. This data is stored at the locomotive in computer-accessible memory, and/or transmitted to remote computer systems with data storage by long range communications supported on the locomotive 201.

Periodically network integrity is verified by repeating the network discriminatory rotation rate verification process. This may be controlled from the network coordinator on the locomotive, or by each node 207 addressing the integrity check when deemed appropriate.

The network is now formed, and wheel monitoring and communication to the network coordinator in the locomotive will continue until power down, due to low rotation rate and super capacitor discharge, returns the wheel mounted devices to the sleep state. In order to ensure network integrity the rotation rate discrimination verification process will be periodically repeated.

Since there is a super capacitor as part of the design, small duration stops, such as pulling onto sidings to allow another train to pass, will not power down the system. Thus whenever rotation rate goes to zero and then returns to the rate required to generate power, prior to the super capacitor discharging, the network verification process will be repeated but the more complicated process of network formation will not be required. Whenever the wheel FFD nodes 207 or 125 return to the sleep state, the super capacitor completely discharges to the point where insufficient power is available to power the microcontroller. After that, any power application by the self-contained generator will reinitiate the network formation process described above.

In the case where the train has stopped and cars are uncoupled, however, and the train pulls out prior to super capacitor discharge, the network verification process will remove the stationary cars (uncoupled cars from the train construct of interest) based on their different wheel rotation speed, and then ultimately based on distance (100 meter range limitation of the Zigbee transceivers). Data identifying the cars that are no longer part of the train construct is stored by the computer system of the locomotive network coordinator (they are no longer registered as part of the network), and this data is transmitted back to the central monitoring station via the locomotive wireless communication system, e.g., a satellite uplink or a cell telephone link to a PSTN.

The applicability of this self-assembling mesh network goes beyond the suggested railroad application. The discriminating parameter for nodes in a self-assembling network may be virtually any stimulus that is commonly experienced by some of the available nodes. For example, the sensors might be geophones, accelerometers, acoustic sensors, ultrasonic sensors, electric field sensors, magnetic field sensors light intensity sensors, light selective frequency sensors, humidity, angular rate sensors, Global Positioning System, mechanical shock, pressure, or fluid or gas flow rate sensors.

In the general concept of the system, a first node or transmitter/receiver receives a "wake up" ping or communication from a central command node that defines the desired network discriminator. If the node satisfies the parameter or rules for the self-assembling discriminator, the node transmits that the discriminator is met, joins the discriminated network, and transmits the processed data if requested and waits for further instructions. If the node does not meet the requested self-assembling discriminating criteria the node transmits that the discriminator is not met, handshakes with the central command node, and returns to the sleep mode, and does not self-assemble itself onto the discriminated network.

The central command node may be a specifically designated entity/node or alternatively, in another embodiment, may be any node that "wakes up" due to an external stimulus such as a trip circuit on an analog sensor implemented by comparator circuits, as in the above-described train network. In that embodiment, any node that senses the first occurrence of the desired environment can "wake up" all other nodes in transmitter/receiver range and begin the self-assembly process. The node that first sensed the environment, detected the trip point, and broadcasted the "wake up" call would be designated the central command node.

Wheel to Locomotive Communication Message Scenario and Content

After the network has been formed and verified, a standard message protocol is be implemented between each wheel node 202 to 205 and the locomotive 201. Generally, the data sent from the nodes will be a status word advising of the bearing condition of the associated wheel. The vast majority of the messages will contain a "Green" status that indicates that the bearing is healthy and has sufficient life remaining. In addition to a "Green" status message, it will be possible to transmit a "Yellow" status indicating 5% of remaining bearing life, and a "Red" status indicating 1% of remaining bearing life or immediate failure due to thermal runaway is planned. Percent of remaining life is dependent on many parameters such as load, etc. as described on the Amsted Rail Group website (www.amstedrail.com/tech_sheets/9001.asp), supra, but the 5% and 1% points are selected to make use of the teachings of the Gluzman and Reliability Direct references identified above.

According to the preferred embodiment, the message word format and content options transmitted from each node 125 or 207 to node 209 of the locomotive and its coordinator system will be:

TABLE 2

| Status Message Content | OK | Potential Problem | Imminent Problem |
| --- | --- | --- | --- |
| Word 1 | Car ID | Car ID | Car ID |
| Word 2 | Wheel ID | Wheel ID | Wheel ID |
| Word 3 | Green | Yellow | Red |
| Word 4 | End Of Message | Bearing defect type (cup, cone or roller) | Bearing defect type (cup, cone or roller) or thermal runaway |
| Word 5 | | Temperature | Temperature |
| Word 6 to Word 8 | | Bearing Defect Amplitudes (cup, cone and roller) | Bearing Defect Amplitudes (cup, cone and roller) |
| Word 9 to Word 17 | | Most recent 3 sets of Bearing Defect Amplitude (cup, cone and roller) trending data | Most recent 3 sets of Bearing Defect Amplitude (cup, cone and roller) trending data |
| Word 18 to Word 20 | | Most recent 3 sets of Bearing temperature | Most recent 3 sets of Bearing temperature |
| Word 21 to Word 23 | | Baseline Bearing Defect Amplitude Data for trending comparison | Baseline Bearing Defect Amplitude Data for trending comparison |
| Word 24 | | End Of Message | End Of Message |
| Duty Cycle | Every 10 minutes | Immediately Upon Detection And Repeated Every 15 Seconds Until An Acknowledge Is Received From Central Monitoring System. After Acknowledge then repeat per normal 10-minute duty cycle with most recent data. | Immediately Upon Detection And Repeated Every 2 Seconds Until An Acknowledge Is Received From Central Monitoring System After Acknowledge then repeat per normal 10-minute duty cycle with most recent data. |

Locomotive to Central Monitoring Communication Message Content

After the network has been formed and verified, the locomotive 201 transmits a first message from the locomotive via, e.g. satellite link, to the Central Monitoring Station. This message contains data defining a Locomotive ID, a destination and data defining the identities of the railcars, e.g., cars 202 to 205 in FIG. 10, that were derived from the network formation. Any user desired information could be added to this message. The Central Monitoring Station stores this data and processes it to maintain the bearings of the railcars, but also to optionally manage the data identifying the railcars and indicating their locations so as to track their movement in a more direct fashion than is possible in the stationary wayside system of the prior art.

Alternate Embodiment of a Node

Figure 11:
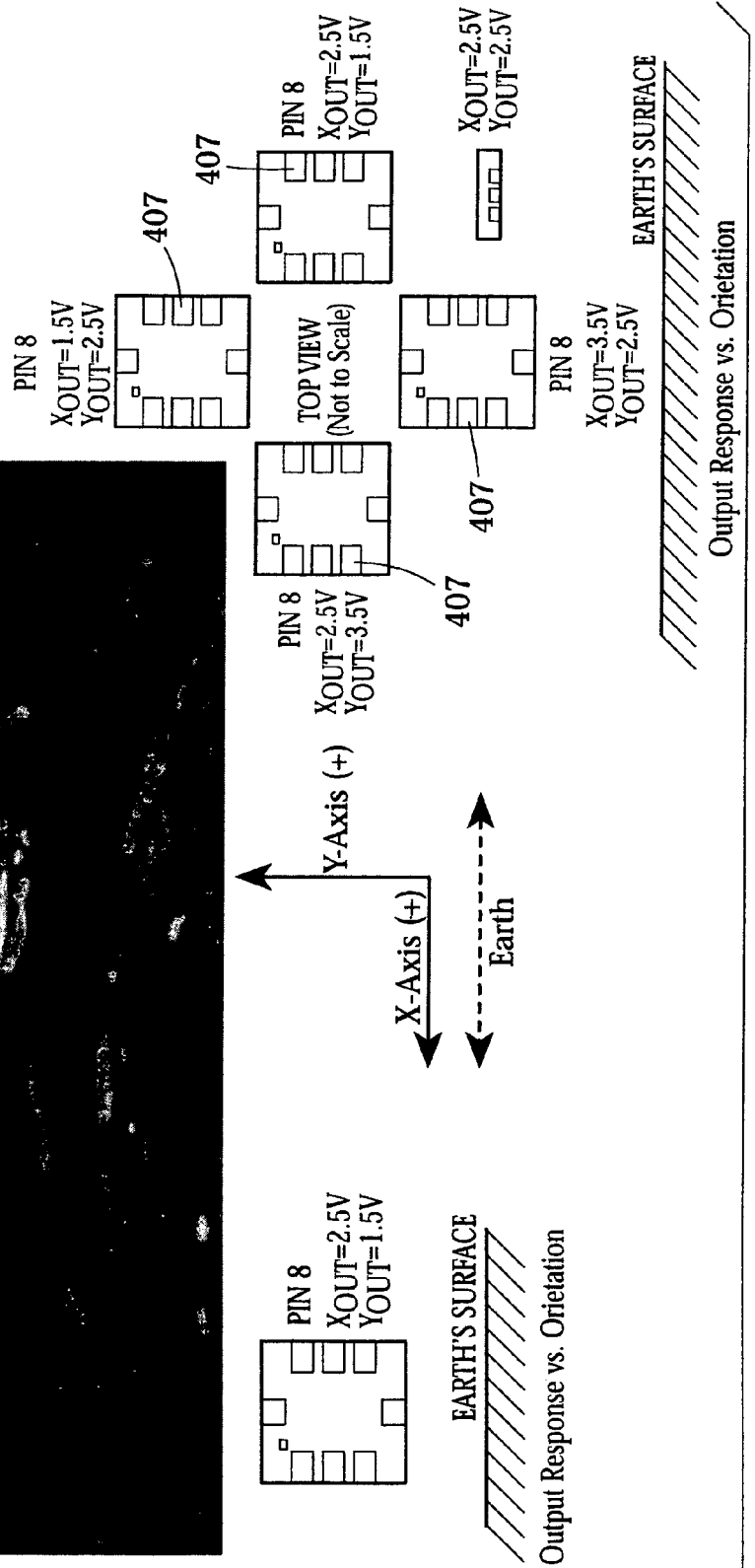
FIG. 11 shows an accelerometer mounting on a railroad truck in an alternate embodiment using an x-y acceleration detection.
Figure 12:
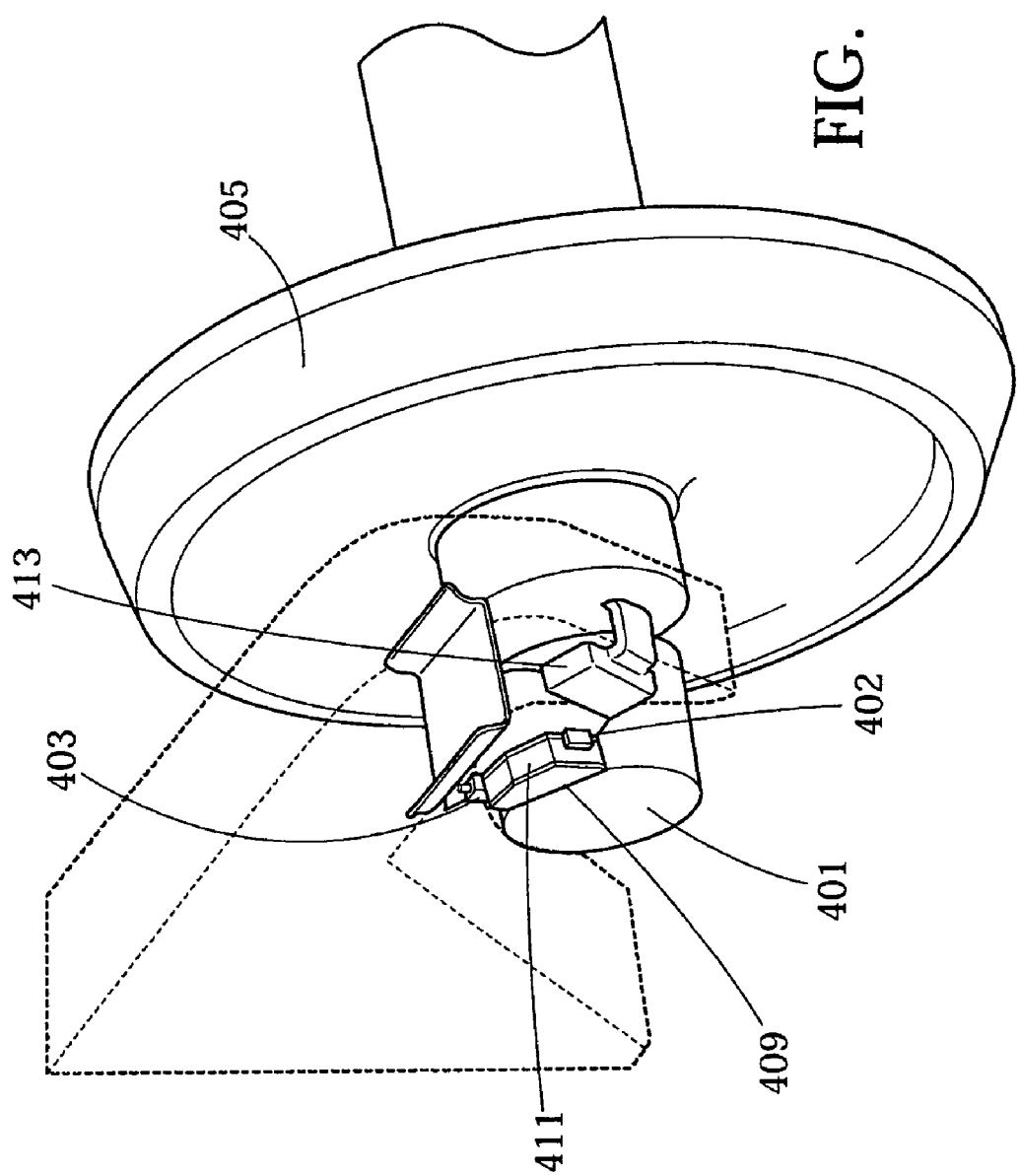
FIG. 12 shows a perspective view of an alternate embodiment of node unit.
Figure 13:
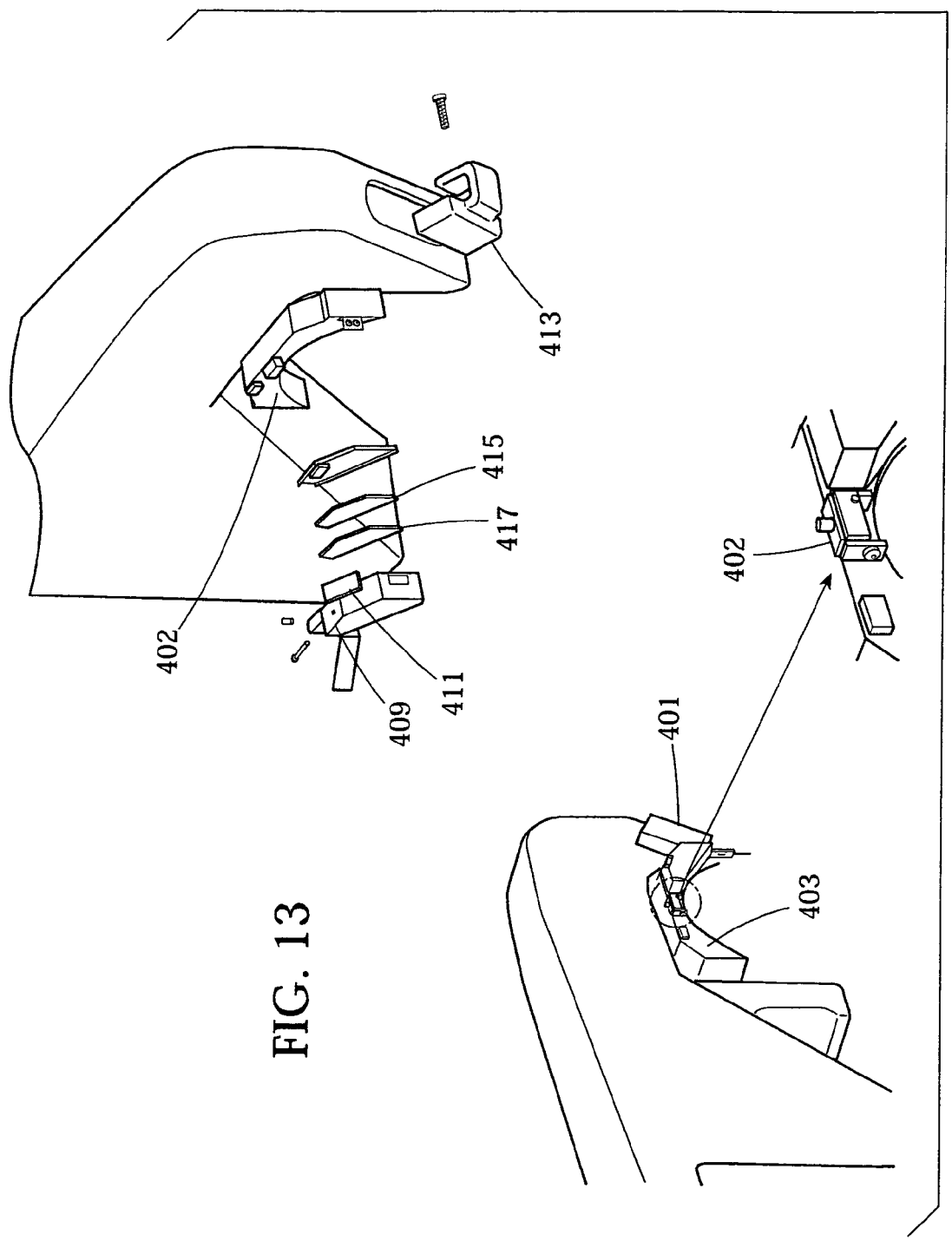
FIG. 13 is a diagram showing a two perspective views of the embodiment of FIGS. 11 and 12.

FIGS. 11 to 13 show an alternate embodiment of sensor node unit that may be used in a system according to the invention. The unit 401 of this embodiment is mounted on a bracket 402 on the truck's adaptor 403, not on the wheel 405. As a consequence, the unit 403 does not rotate.

The unit 401 is equipped with sensors that include two accelerometers oriented in the x and y-axes. The x-axis is a horizontal axis extending longitudinally of the length of the train, and the y-axis is simply vertical, as seen in FIG. 11. This arrangement of axes is defined by four MEMS accelerometer components 407 supported as seen in FIG. 11. Data from this accelerometer is expected to be analogous to that from the radial accelerometer discussed in the preferred embodiment.

Unit 401 includes a sensor pack 409 that includes the four accelerometers 407, a temperature sensor as described above with respect to the embodiment of node 125, and a GPS system with antenna 411. A battery pack 413 is provided as well, as there is no generator for the unit 401. Unit 401 relies on the GPS data received to determine its location and velocity, and from that determines the rotational speed of the wheel. Circuit boards 415 and 417 process the signals from the sensors and the GPS and record and/or transmit the relevant data to the train network.

Apart from the above distinctions, i.e., the GPS, the stationary mounting position of the unit, the orientation of the accelerometers, the battery power unit, and the absence of a generator and a rotation sensor, the unit 401 is similar to the node unit 125 discussed above, and contains similar circuitry.

Example

A railcar equipped with a unit similar to unit 401, but with a computer recording its sensory data instead of a wireless network connection, was subjected to an experimental trip to determine whether the sensor data acquisition, especially using MEMS sensors, could be used to monitor rail car bearings.

Figure 14A:
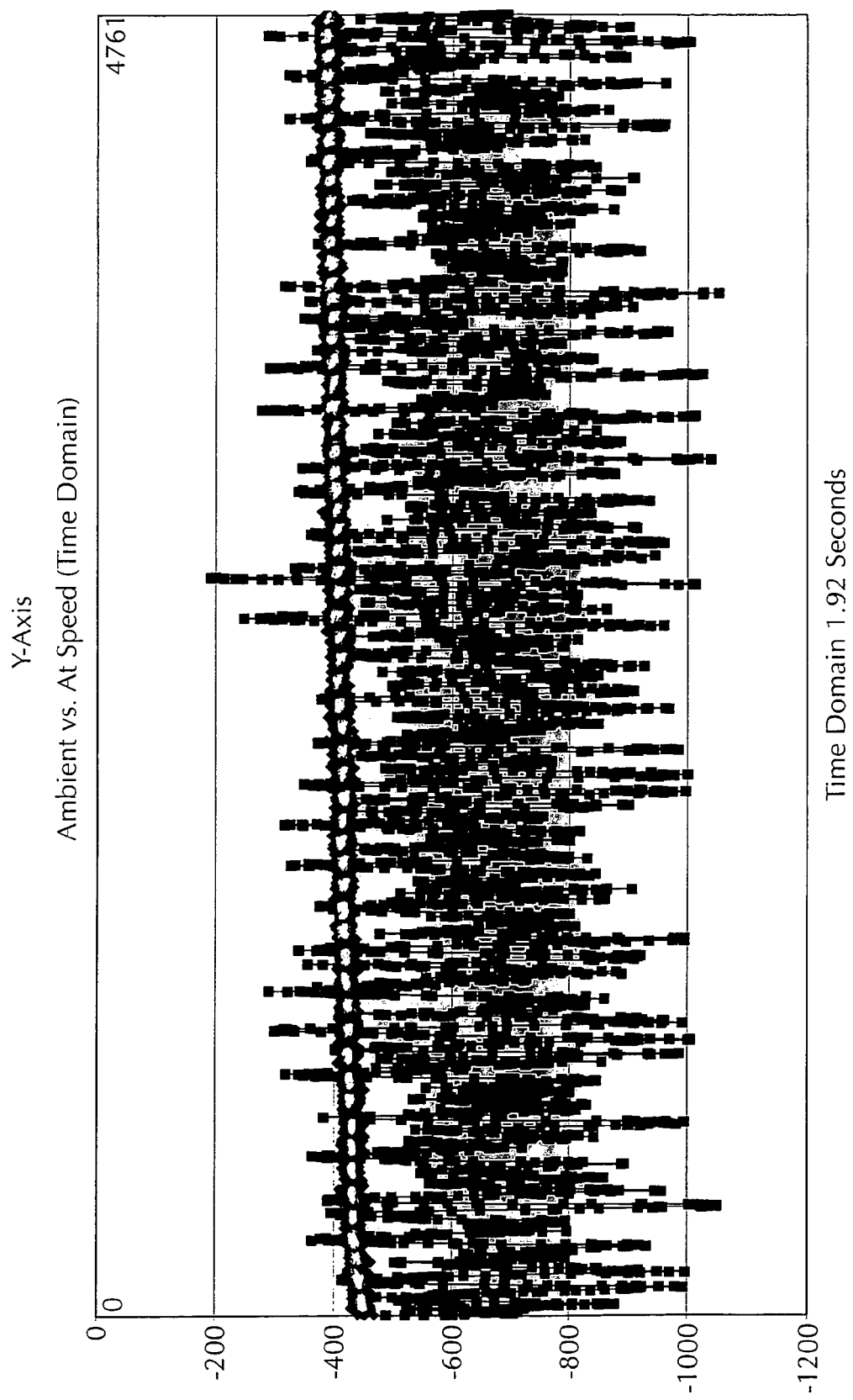
FIG. 14A is a parallel comparative graph of the y axis accelerometer output from a real node when the associated car is stationary and in movement at speed.
Figure 14B:
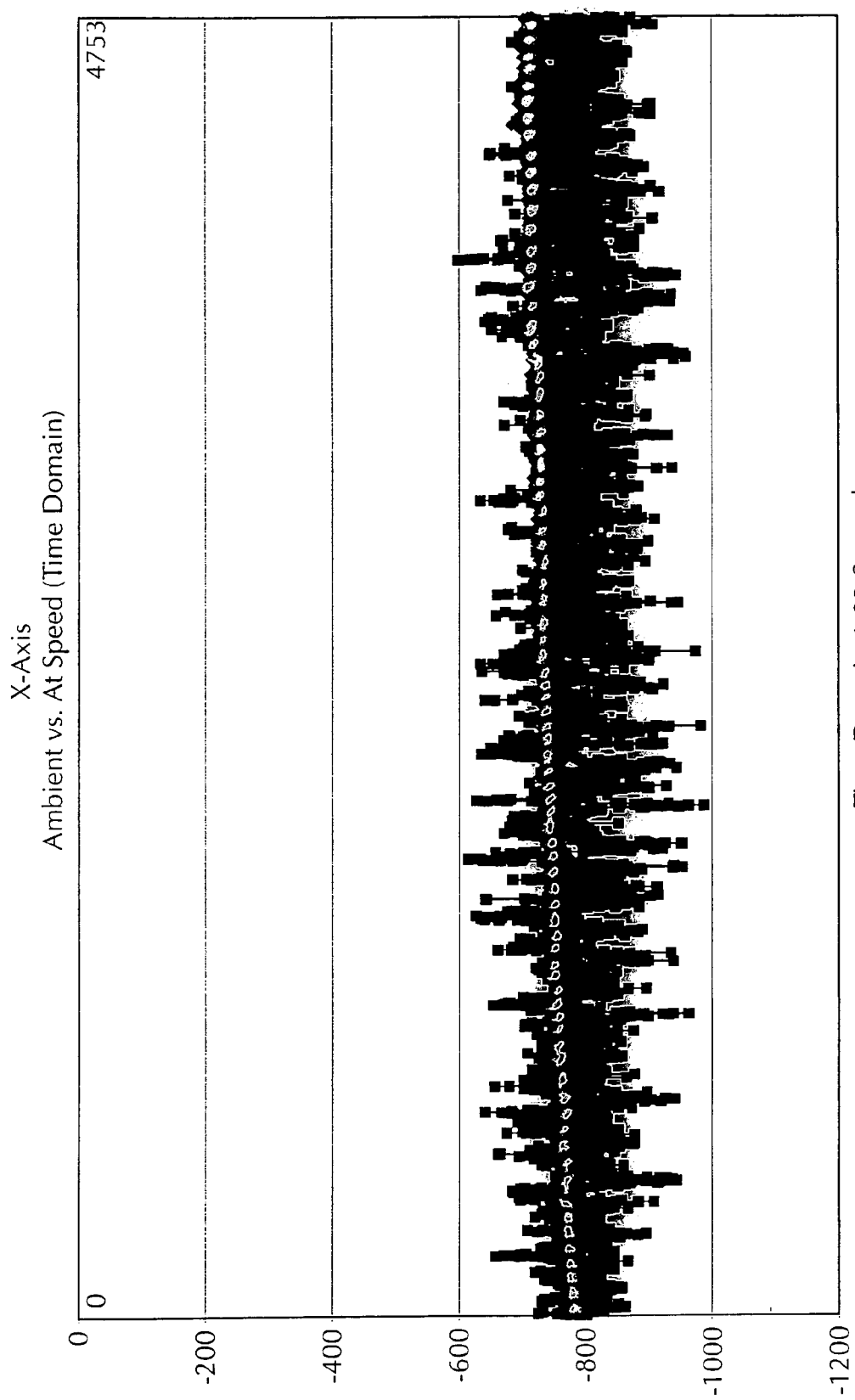
FIG. 14B is a parallel comparative graph of the x axis accelerometer output from a real node when the associated car is stationary and in movement at speed.

FIGS. 14A and B show time-domain graphs of the raw accelerometer data from the sensor unit at ambient (the steady horizontal lines) and at speed (the noisier lines) over a time period of 1.92 seconds. This shows the degree of vibration in the sensor array.

Figure 15A:
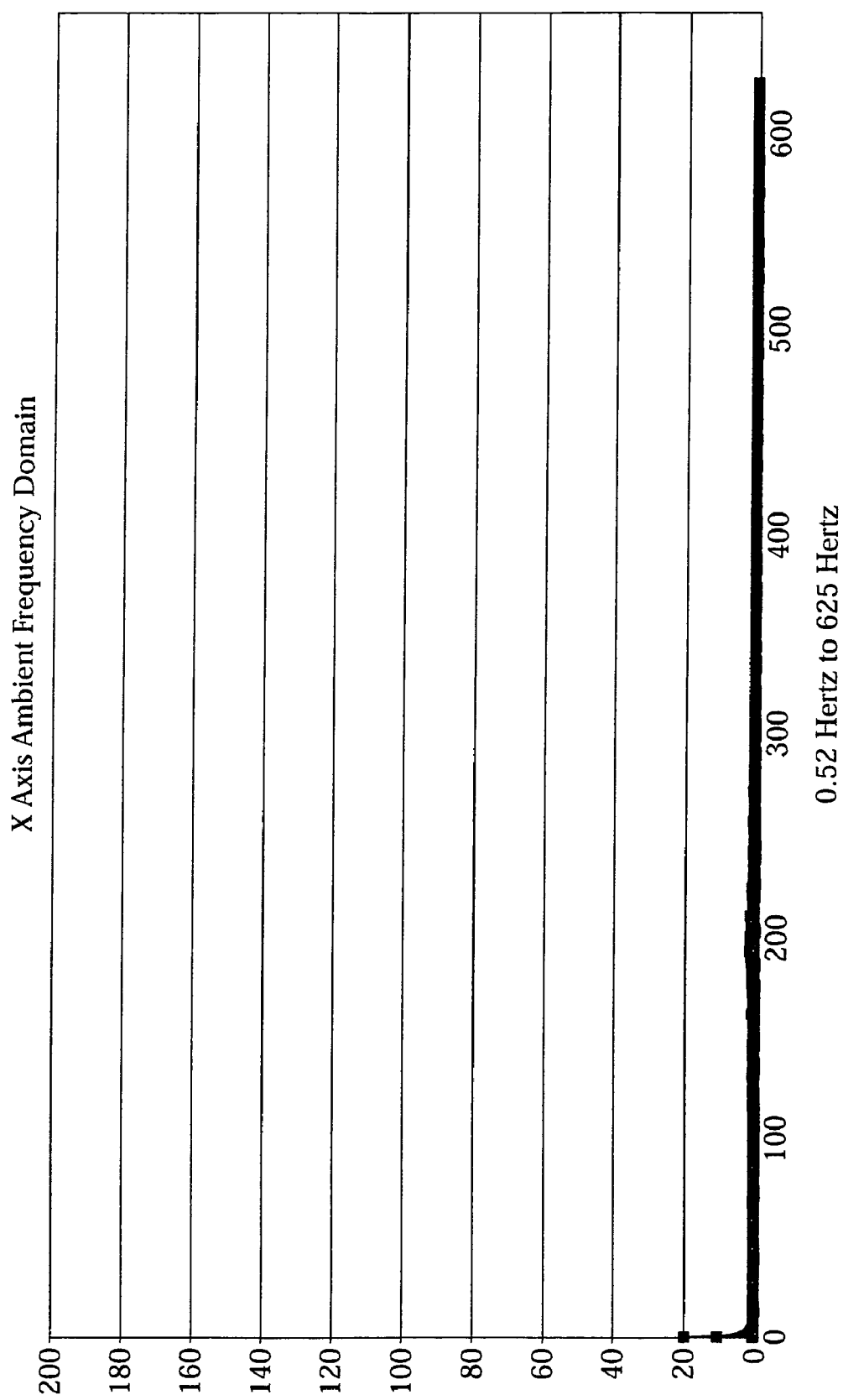
FIG. 15A shows a graph with a frequency domain of an ambient x-axis accelerometer output.
Figure 15B:
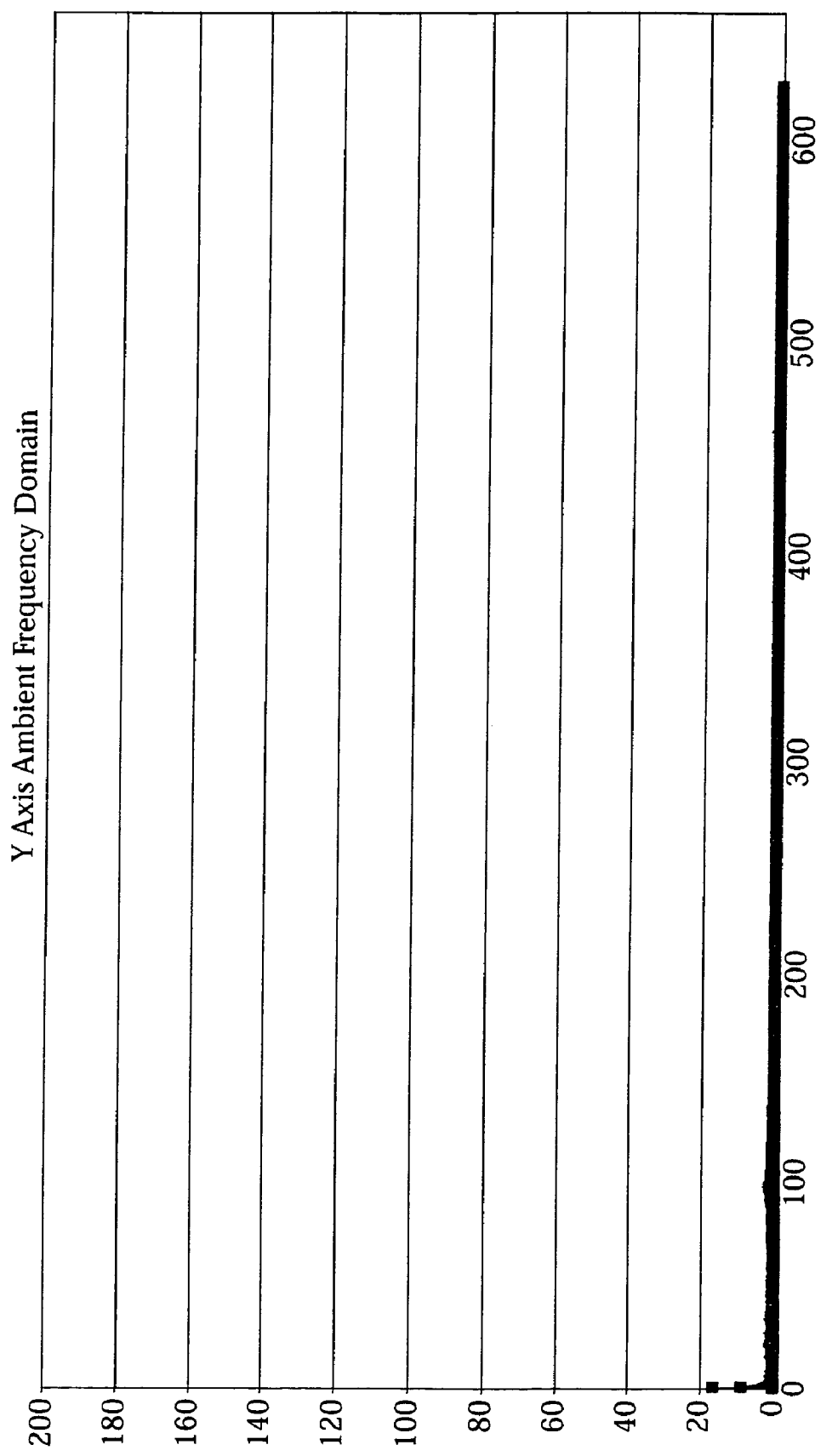
FIG. 15B shows a graph with a frequency domain of an ambient y-axis accelerometer output.

FIGS. 15A and B show frequency domain graphs that represent Fourier transforms of the x and y axis ambient frequencies, indicating a system with no accelerations or vibrations in the analyzed range of frequencies.

Figure 16A:
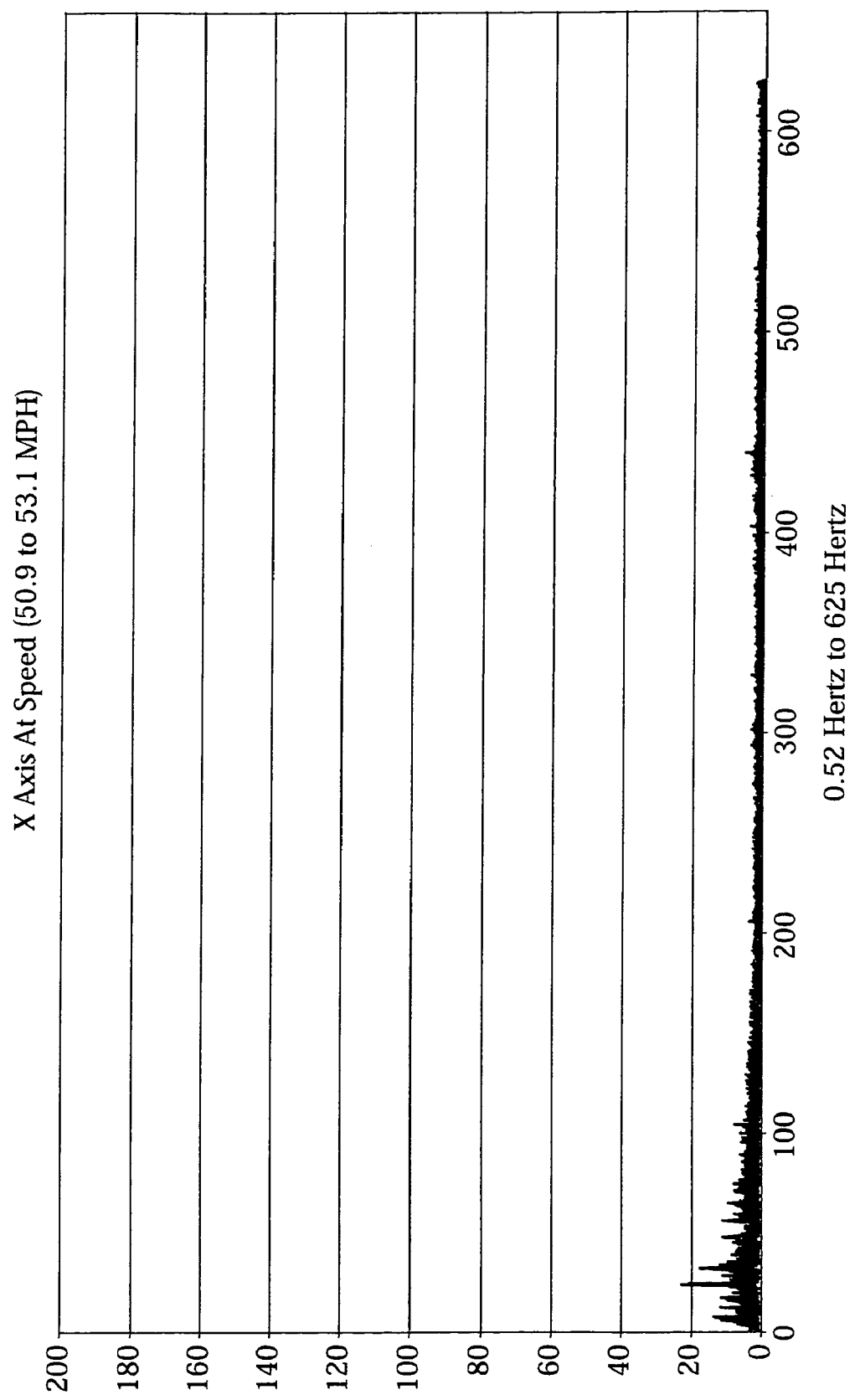
FIG. 16A shows a graph an x-axis accelerometer output in movement at speed with a frequency domain.
Figure 16B:
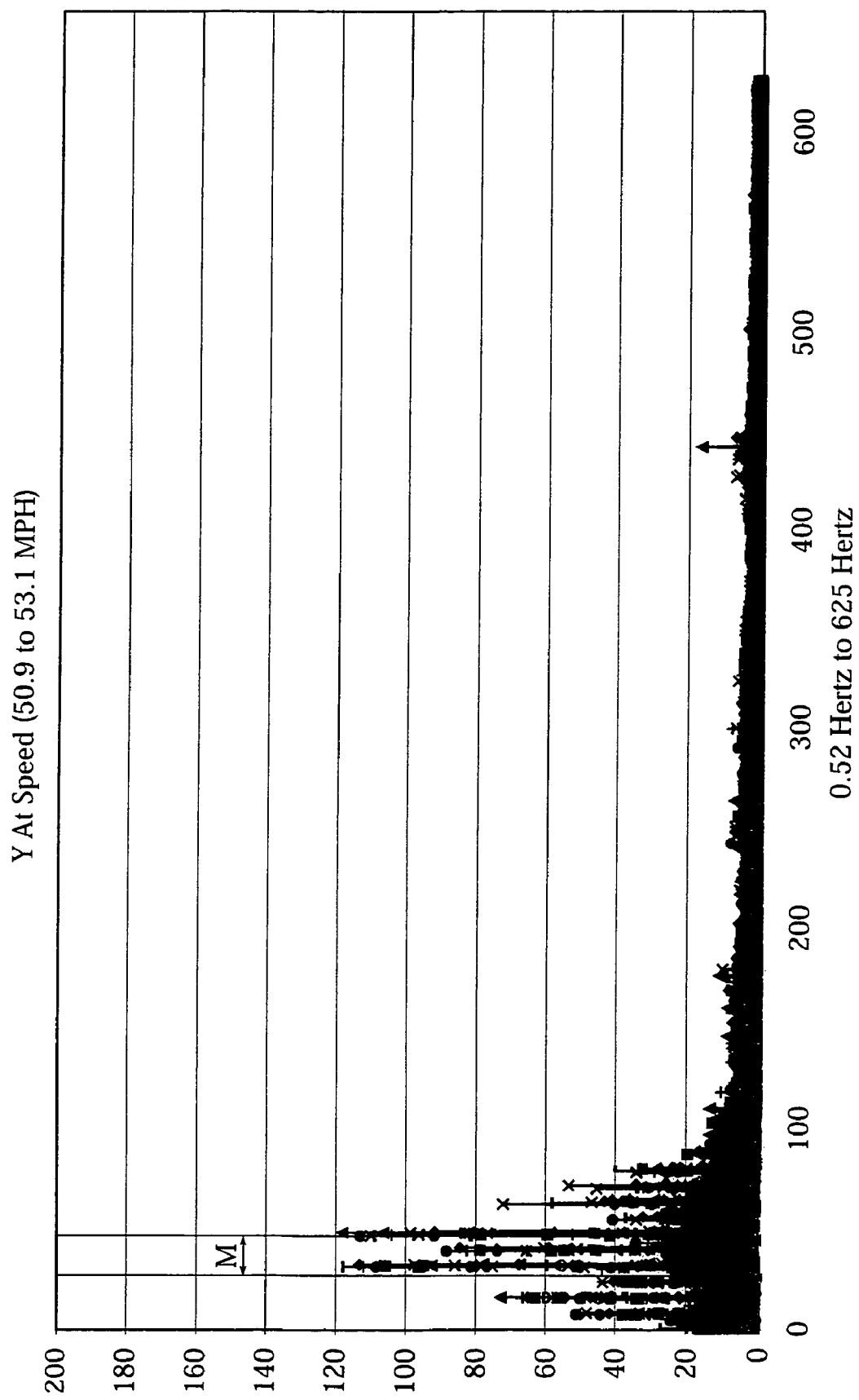
FIG. 16B shows a graph a y-axis accelerometer output in movement at speed with a frequency domain.

FIGS. 16 A and B show Fourier transforms of the x-axis and y-axis accelerometer outputs at speed. It is apparent that there are distinct frequency peaks in the y-axis accelerations at speed, as can be seen in FIG. 16B, especially in the frequency range labeled M, which is roughly 30 to 50 Hz.

Figure 17:
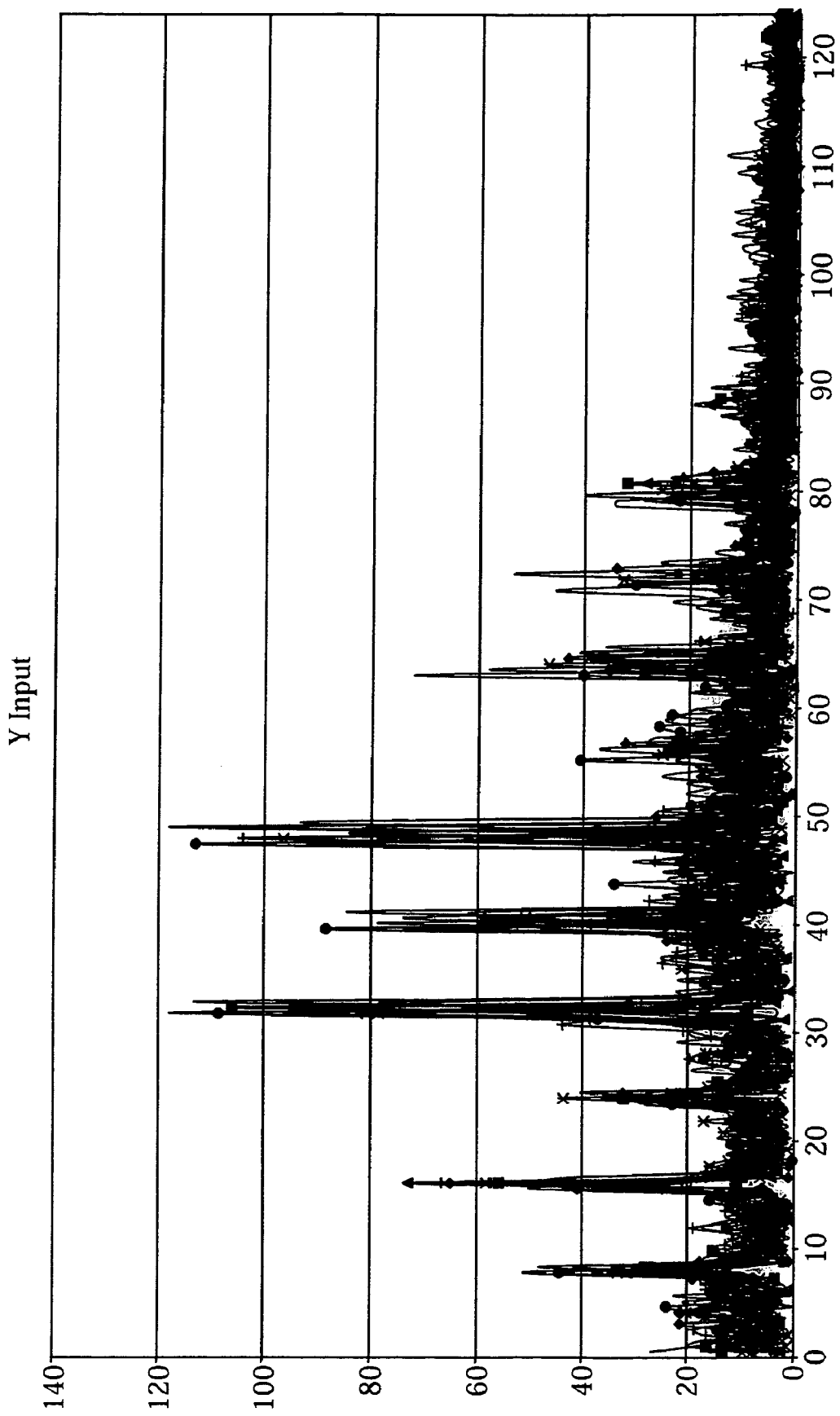
FIG. 17 shows a graph as in FIG. 16B expanded to show sidebands and harmonics in the frequency distribution.

FIG. 17 is an enlarged detail view of the Fourier transform of FIG. 16B, and it shows the various sidebands of the y-axis acceleration frequencies in the frequency domain. Again, a number of peaks corresponding to defect frequencies are visible.

Figure 18:
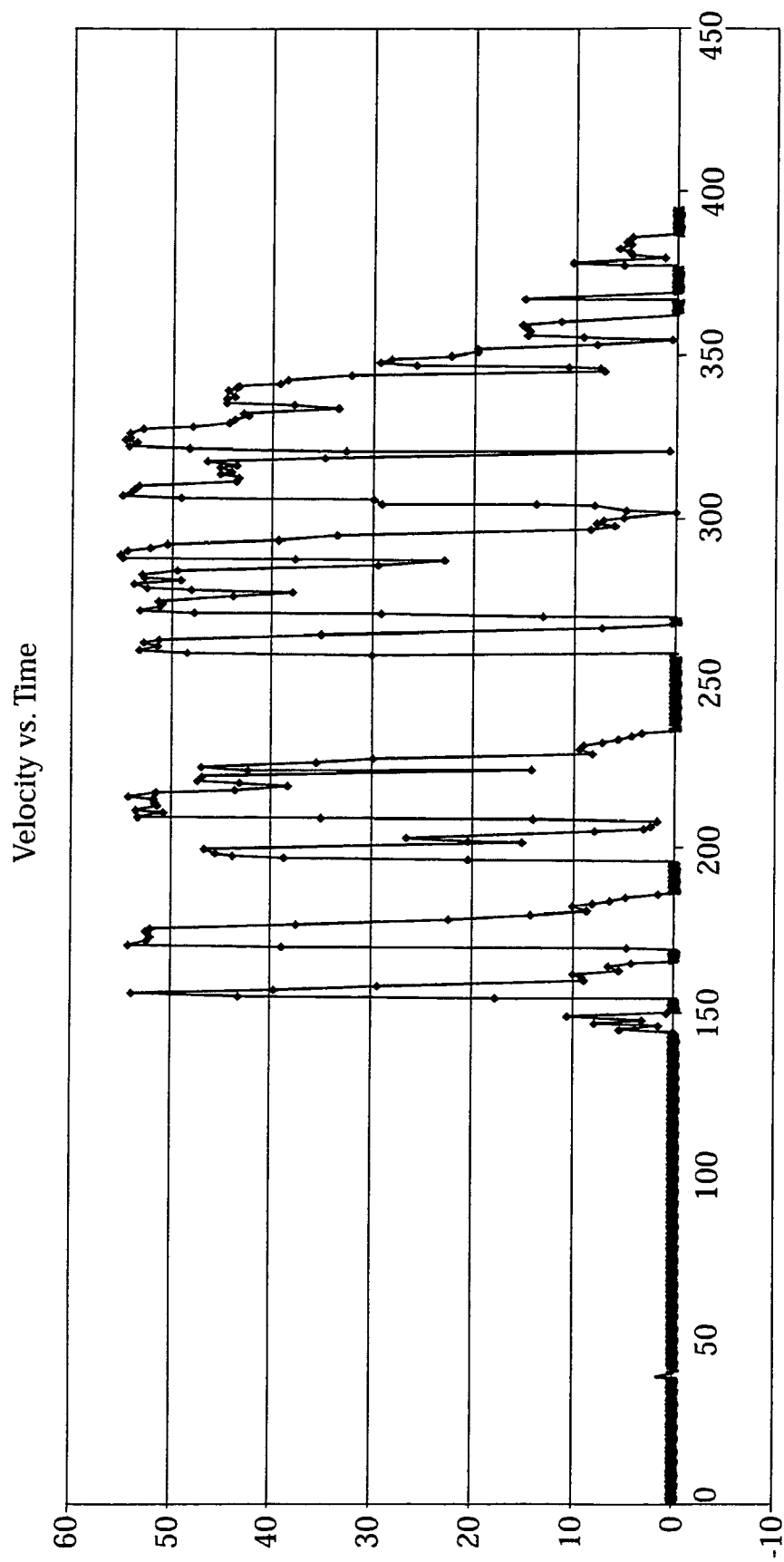
FIG. 18 is a graph of time and velocity detected by the unit.

FIG. 18 shows the velocity of the railcar over the two-day period of the test. Movement was not continuous, as the graph clearly displays.

Figure 19:
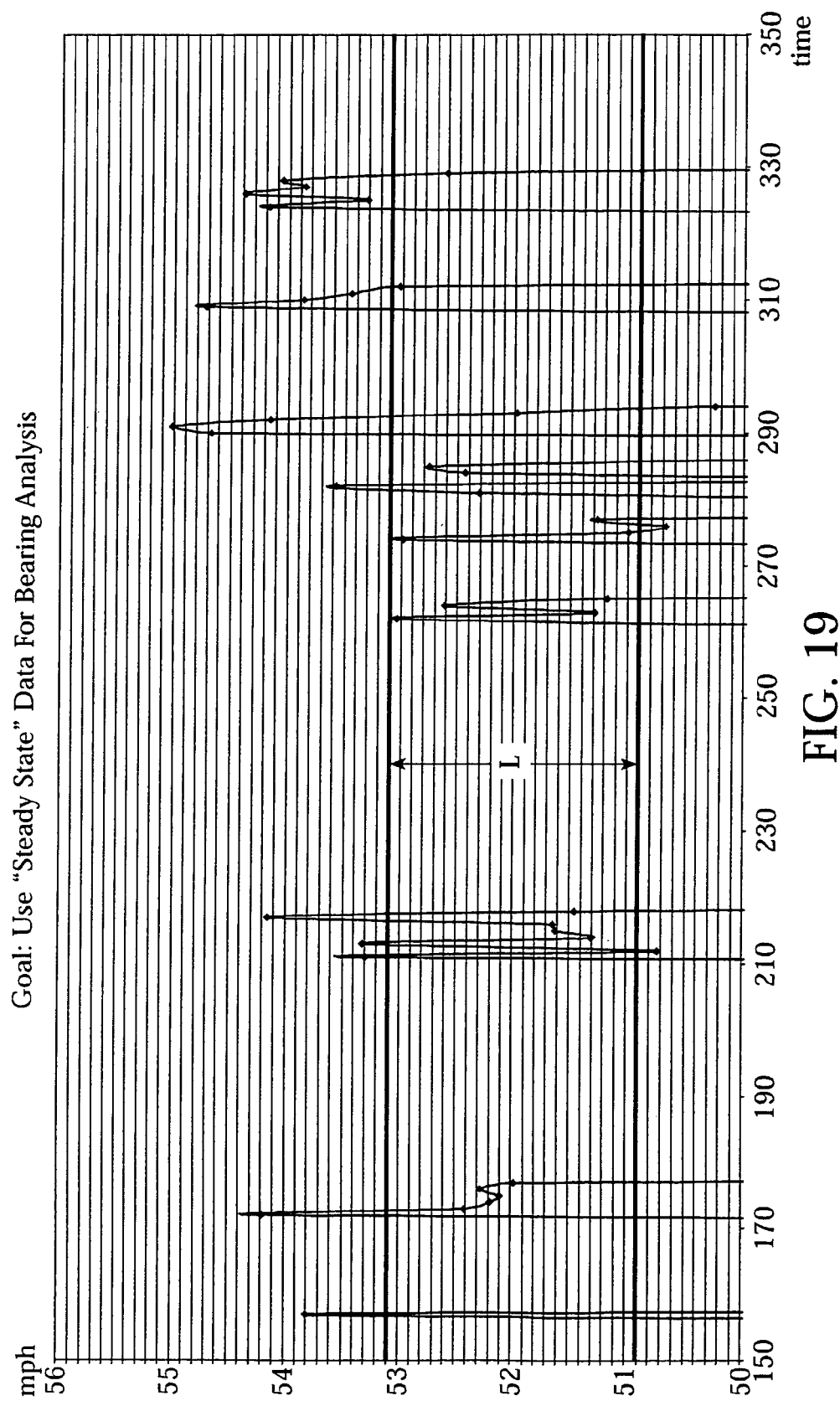
FIG. 19 is a graph of time and velocity detected by the unit showing the range of data used.

FIG. 19 shows the data records and the speed of the data records that were used for the bearing analysis, i.e., the portion of the data that was selected for use in the analysis. The experiment detected the wheel bearing defect frequencies using the standard defect frequency equations common to bearing defect analysis but was unique in detecting the defect frequencies as the train was rolling down normal commercial track. The detection of the defect frequencies was accomplished by placing restrictions on when and under what conditions the measurements would be performed. In this experiment bearing defect frequencies were only measured in the range L, representing those times when the train was between 50.9 MPH and 53.1 MPH. Where the time domain data contained large transient events, such as those produced by rail imperfections, it was also not used to determine the bearing condition.

Figure 20:
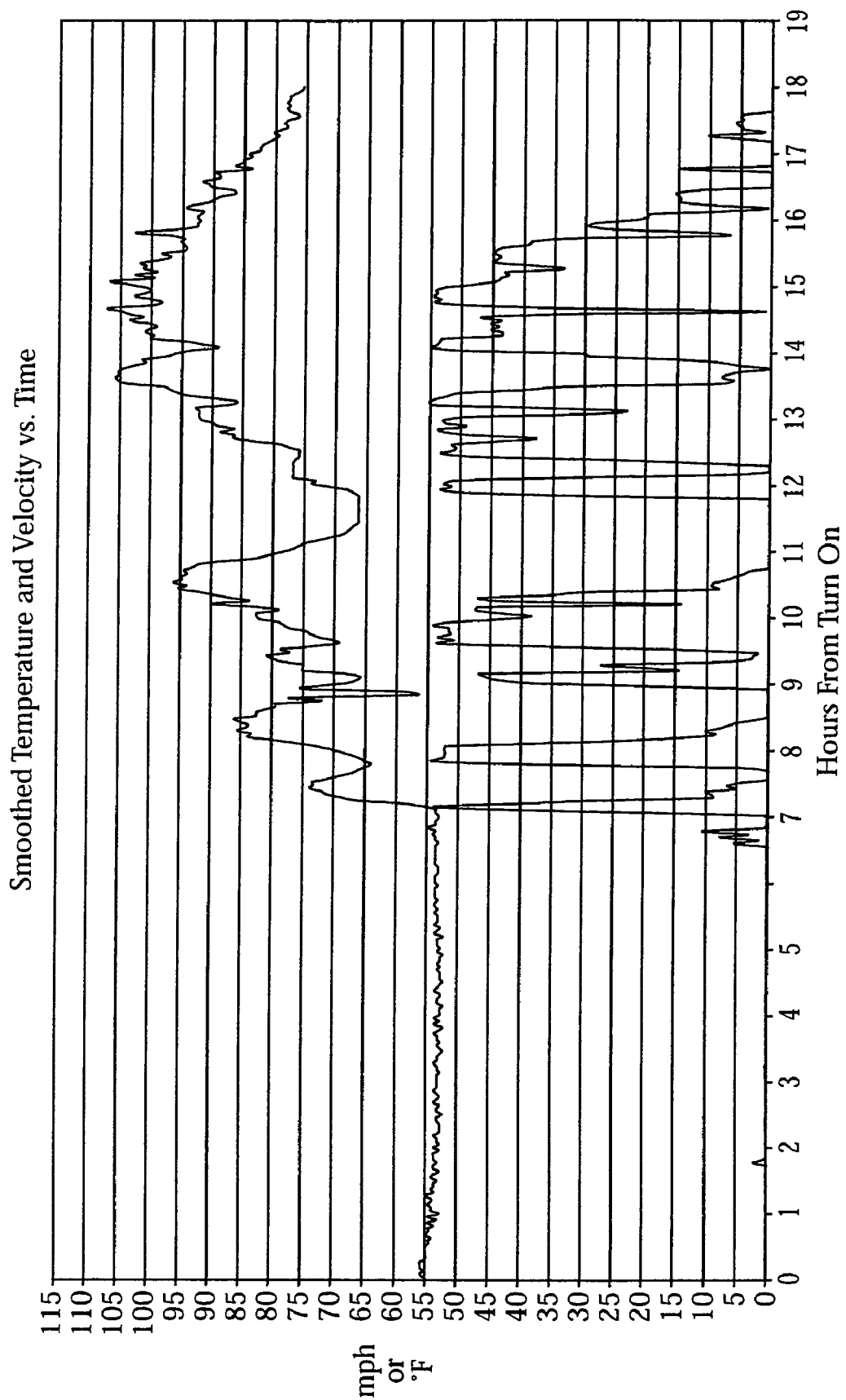
FIG. 20 is a graph of time, velocity and smoothed temperature detected.

FIG. 20 shows a graph of the smoothed sensed temperature versus a time domain. The temperature vs. velocity data in FIG. 20 demonstrates the capability of the AD 590 temperature sensor to detect even small temperature changes due to velocity. The operation was within expected operational norms and the sudden temperature increases and high temperatures associated with catastrophic bearing lubrication failure are not seen. However, the data is shown to be accurate and consequently can be used to provide an accurate trending model to determine and evaluate "out of family" measurements, and to detect potential bearing problems that produce a symptom of rapid temperature rise or high absolute temperature.

Figure 21:
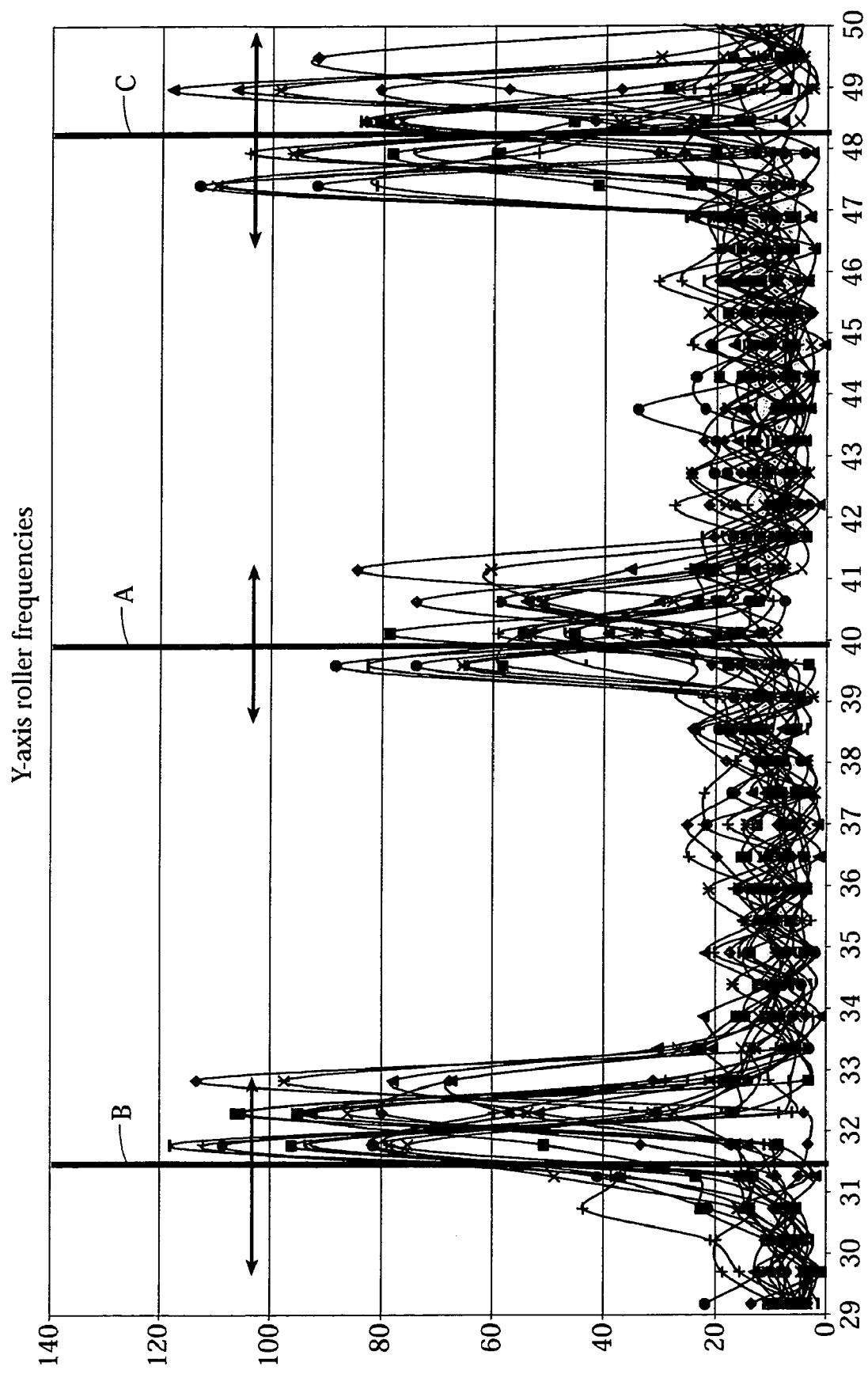
FIG. 21 is a graph as in FIG. 16 showing the frequency peaks around a demarcation of the expected roller defect frequency.

FIG. 21 shows the expanded frequency spectrums of the graph of FIG. 16B, displaying data from the y-axis MEMS accelerometer, taken for data records with speed between 50.9 mph and 53.1 mph. The data spikes are at the roller defect frequency A, and also at frequency A the rate of wheel rotation (frequencies B and C) that indicates a defective roller. Peaks are clearly evident at the expected roller defect frequencies, and a defect in the roller was in fact present. This indicates that detection of bearing damage can be achieved using MEMS accelerometers as in this Example.

Sufficient data to determine trending was not available in the example. In the preferred embodiment, however, data reflective of previous detected peaks is stored and compared with current detected peaks so as to provide data indicative of a trend toward failure or further degradation of the bearing.

Figure 22:
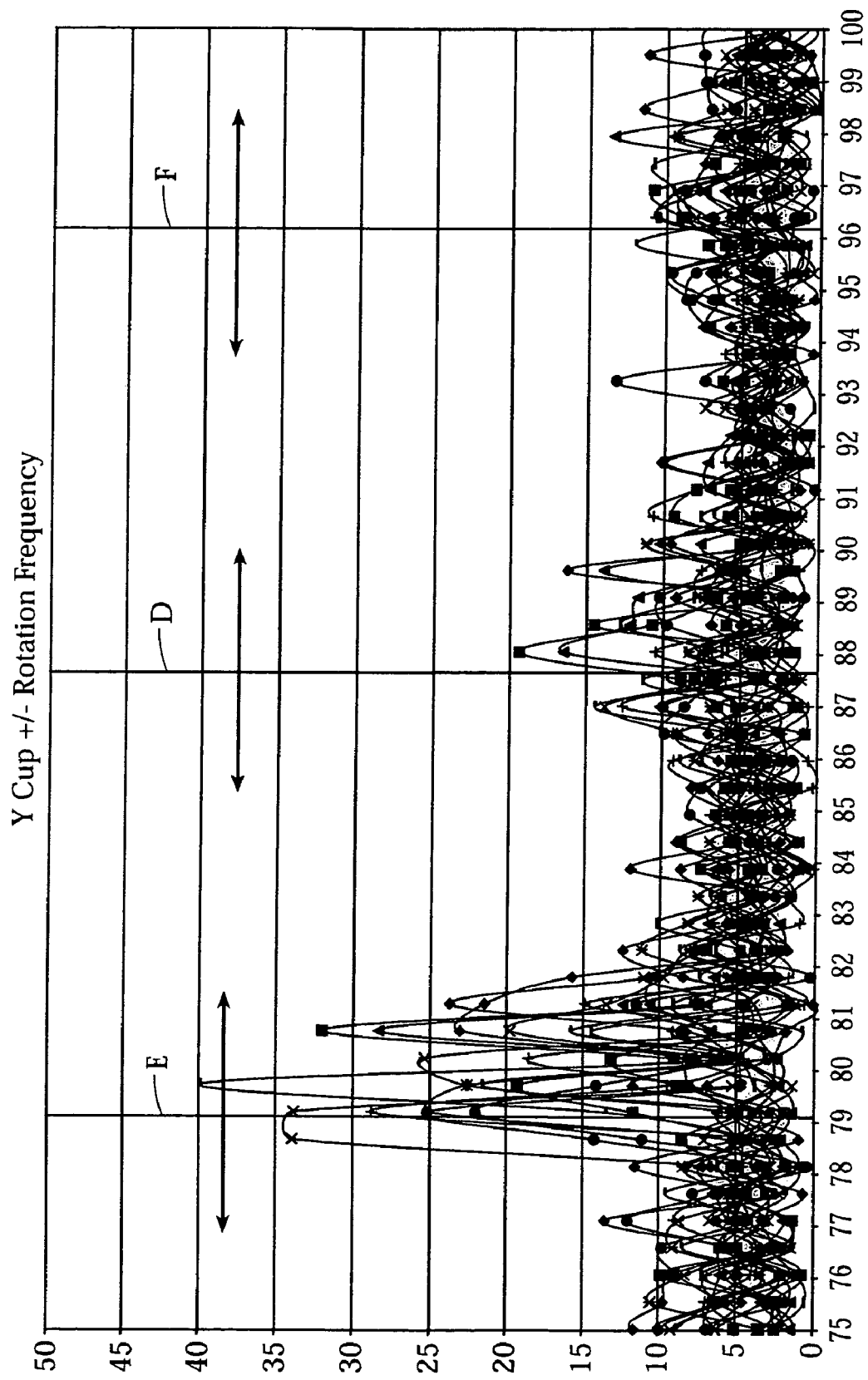
FIG. 22 is a graph of the y-axis output with a frequency domain showing the frequency peaks around a demarcation of the expected cup defect frequency.

FIG. 22 shows a detail of the y-axis acceleration Fourier transform plot in another part of the frequency domain, the range surrounding cup defect frequency D, which includes the frequency D±the rate of wheel rotation (frequencies E and F). Peaks are visible, particularly at frequency E, indicative of a degree of bearing wear.

In addition to bearing condition the experiment also collected data and performed analysis to determine wheel condition. Wheel flats are a major concern for the railroad industry because the high impact load damages the track and also lead to derailments.

Figure 23:
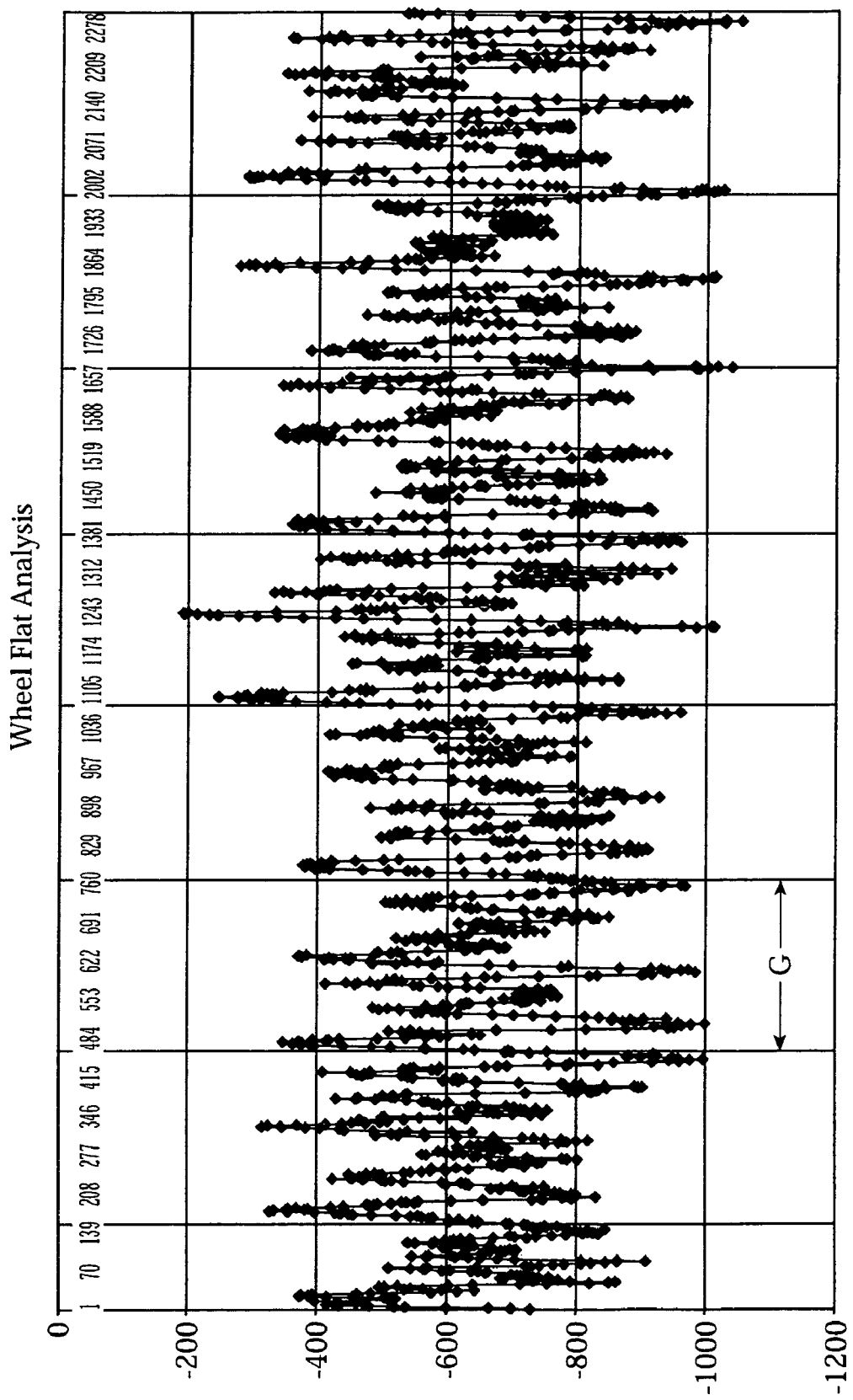
FIG. 23 shows a graph of y-axis acceleration from the node relative to time to determine if wheel flatting is present.

FIG. 23 shows a graph of raw y-axis acceleration against time to determine if a wheel flat is present. Wheel flatting was analyzed by looking for repetitive high transients in the time domain data separated by the delta time for the wheel to make one revolution at the GPS measured velocity of the trains. The vertical lines in FIG. 23 each represent an interval G corresponding to the period of rotation of the wheel at the railcar speed at the time. No prominent cyclic peaks having a period equal to that of the wheel are visible, and no flat was present in the wheel in question. It is apparent however that acceleration data was properly obtained, and that a wheel flat, if present, can be easily detected by the analysis of this data.

Specifically, as discussed above, the ARMS node of the preferred embodiment screens the data as described previously herein to identify wheel flat accelerations.

Additionally, the railroad experiment also analyzed the accelerometer data for car hunting, i.e., yaw oscillation about a vertical axis. This is where the car wobbles as it goes down the track because the wheels no longer have the required geometry to keep centered on the track. The data was analyzed for X acceleration and Y acceleration cross coupling indicative of car "wobble".

This onboard example showed that MEMS-type sensors accurately monitor and determine the condition of railway car bearings.

Based on the foregoing described embodiments of the invention, one of skill in the art will appreciate that multiple alternative embodiments might be created. For example, part of the embodiment was described as being implemented in software programmed on a processor or DSP. A more sophisticated implementation may be reducing the described hardware and software implementation to an FPGA (Field Programmable Gate Array) or an ASIC (Application Specific Integrated Circuit) containing a processor kernel. Further, array processors might be used to implement the described processes extended to multiple signal or sensors in parallel. Another variation may be to use the described invention of self-assembly on wireless bands that allow wide bandwidth communication and transmit the requested raw high-speed sensor data to a central node for processing thus reducing the number of required processors.

The system was described in connection with a railroad application but it is applicable to any stationary sensor network such as those used in factories to monitor distributed machines or it can be applied to cars traveling jointly down an interstate. In another vehicle application, automobiles or other highway vehicles traveling in close proximity on a highway self-assemble into a network based on a determination that they are all in proximity based on a GPS location, and that they are all traveling in the same direction (velocity vector). Such a self-assembled network of moving automobile "packs" or platoons allows sharing of data regarding the operational condition of each vehicle, and results in increased highway safety by alerting adjacent vehicles of various conditions affecting the individual car operation by sensors on the vehicle that indicate, e.g., a tire blowout, swerving, excessive braking, loss of traction, etc.

Furthermore, references to data or values should be understood as data stored in a type of computer-accessible format or transmitted as electrical or wireless signals, and any calculations or process steps or determination or detection described herein is to be understood as actions taken by electronic components with respect to electronic data or electrical signals, especially by a microprocessor or another electronic computer system having data processing components and data storage devices such as memory connected operatively therewith.

The terms used in this specification should be understood to be language of description, not limitation, as those of skill in the art with this specification before them will be able to make changes and modifications therein without departing from the scope of the invention.

What is claimed is:

1. A networking system comprising:
    a plurality of wireless communication nodes communicating wirelessly with each other so as to form a low power wireless network;
    the nodes each having a sensor providing a respective sensor data value indicative of a physical parameter in the environment of the node;
    said wireless network discontinuing communication with any nodes therein in which the sensor data value is outside a range of network sensor data values.

2. The networking system of claim 1, wherein one of said nodes determines whether the sensor data value from the sensor thereof is within said range of sensor data values, and responsive to a determination that the sensor data value thereof is outside said range, discontinues wireless communication with any of the other nodes of the network.

3. The networking system of claim 1, wherein when a first of the nodes of the system determines that a second of the nodes of the system has a sensor data value that is outside the range of sensor data values, said first node causes the second node to be dropped or to drop itself from the network.

4. The networking system of claim 1, wherein one of said nodes joins the network as a result of receiving a communication signal from another node of said network, and transmits the sensor data thereof or receives data over the low power network defining the range of sensor data values, said node dropping from the network or being dropped from the network responsive to a determination made at one of said nodes that the sensor data of said one of said nodes is outside said range.

5. The networking system of claim 4, wherein, prior to receiving the communication signal, said one of the nodes is in a low-power sleep state that terminates and after which the node sends or receives said data.

6. The networking system of claim 1, wherein prior to joining the network, one of said nodes is in a low-power sleep state, said node waking from said sleep state responsive to a local electronic event so as to enter a higher power usage awake state, said node in said awake state transmitting data to, or receiving data from, another of the nodes of the network.

7. The networking system of claim 6, wherein after said one of said nodes enters the awake state and joins the network, a determination is made that the sensor data value thereof is within the range, and responsive to said determination, the node remains in the network and wirelessly communicates additional data with at least one other node thereof.

8. The networking system of claim 6, wherein said local electronic event is an interrupt to a microprocessor in the node.

9. The networking system of claim 6, wherein the node has a generator that generates electrical power responsive to movement of the node, and said local electronic event is an increase in a level of electrical power generated by the generator.

10. The networking system of claim 9, wherein the node is supported on a wheel of a vehicle, and the generator is configured so as to generate electrical power when the wheel rotates.

11. The networking system of claim 10, wherein the node has a supercapacitor that is charged by the generator when the wheel rotates and supplies power to the node at a later time when the power from the generator is not sufficient.

12. The networking system of claim 1, wherein the nodes are each associated with a respective vehicle.

13. The networking system of claim 1, wherein the nodes each have a Zigbee transceiver and communicate therebetween using wireless communications according to a Zigbee protocol.

14. The networking system of claim 1, wherein each node communicates wirelessly over the network using less than 50 mW of power for the communication.

15. The networking system of claim 1, wherein the sensor of each node is a rotation sensor operatively associated with a respective wheel and the sensor data value is a rate of rotation of said wheel.

16. The networking system of claim 1, wherein each node is associated with a respective wheel of railroad cars in a train moving together.

17. The networking system of claim 16, wherein the network includes a locomotive having a main node, said nodes all communicating with the main node either directly or by communicating through other nodes of the network as intermediary communication links.

18. The networking system of claim 16, wherein the nodes each have an additional sensor operatively associated with the respective wheel thereof and sensing a physical parameter thereof and providing an electrical signal corresponding to a value of said physical parameter, said node determining from said electrical signal a degree of degradation of a bearing of the wheel or a presence of a flat on said wheel, and transmitting a data signal indicating the presence of said flat or said degree of degradation to the main node, said main node communicating with another computer system using a higher power communication system and transmitting thereto data indicative of degradation of said bearings.

19. The networking system of claim 1, wherein each of said nodes is associated with a respective vehicle, the sensors each being a GPS device and the sensor data value identifying a respective location of each of the nodes, and said range of sensor data values defining a geographical area, one of said nodes dropping from the network when the location is outside said geographical area.

20. A method of forming a wireless network, said method comprising:
transmitting a wireless communication signal from a first node responsive to an interrupt therein;
receiving said wireless communication signal at a second node;
determining whether a sensor data value obtained from a sensor of the second node equals a discrimination value or falls within a discrimination range of values; and
making a determination at one of said nodes whether the sensor data value satisfies a network discrimination criterion; and
responsive to a determination that the sensor data value does not satisfy the network discrimination criteria, causing the second node to discontinue communications with the first node.

21. The method of claim 20, wherein the first node has a generator that produces electrical power as a result of turning of a wheel associated with the first node, said interrupt being caused by an increase in electrical power as a result of the wheel starting to turn.

22. The method of claim 21 wherein the second node is in a low-power sleep mode prior to receiving said wireless signal, and said wireless communication signal is a ping responsive to which the second node wakes and receives a wireless signal defining the discrimination value or range of values, or sends a wireless signal transmitting the sensor data value.

23. The method of claim 22, wherein, responsive to a determination that a third of said nodes has a sensor data value from a sensor thereof that satisfies the discrimination criteria, said first and third nodes function as a network.

24. The method of claim 23, wherein a network coordinator node joins the network, and said third node communicates with said network coordinator node by transmitting data to the first node, said first node transmitting said data as an intermediary to the network coordinator node.

25. The method of claim 24, wherein the network coordinator determines and transmits data defining the discrimination criteria for the network to the nodes of the network so as to be applied to nodes communicating with any of said nodes.

26. The method of claim 25, wherein the first, second and third nodes are each associated with a respective wheel of railroad cars, and the network coordinator node is carried on a locomotive;
said sensors of the first, second and third nodes being rotation sensors deriving said data values from a rate of rotation of the associated wheel, and the discrimination criteria being derived from a speed at which the locomotive is traveling, such that only nodes on railcars in a train being moved by the locomotive are in the network.

27. The method of claim 26, wherein the nodes each have an accelerometer detecting radial or vertical acceleration of an axle of the associated wheel and producing an electrical output signal dependent thereon, said method further comprising
analyzing the accelerometer output signal using a microprocessor in the node and determining therefrom a bearing condition data value corresponding to a degree of wear of bearings of said wheel, and
transmitting said bearing condition data value from the node over the network to the locomotive network coordinator node;
storing the bearing condition data values received from all of the nodes in a computer accessible data storage device at the locomotive network coordinator node.

28. The method of claim 27, and
transmitting data corresponding to the bearing condition data values for at least some of the nodes over a high-power wireless communication to a computer system accessible to an operator remote from the locomotive.

29. The method of claim 26, wherein the nodes each have a sensor generating an output signal indicative of a physical parameter that is affected by a flat on the associated wheel, said method further comprising
analyzing the sensor output signal using a microprocessor in the node and determining therefrom whether a flat is present on said wheel, said analyzing including determining whether elevated levels of the output signal are present periodically at a frequency corresponding to a frequency of rotation of the wheel; and
transmitting data indicative of said presence of said flat from the node over the network to the locomotive network coordinator node;
taking action responsive to said data at the locomotive network coordinator node.

30. The method of claim 27, wherein the accelerometer output signal is analyzed by screening the output signal for elevated levels therein of defect frequencies for components of the bearings.

31. The method of claim 30, wherein said analysis includes performing a discrete Fourier analysis of said output for said defect frequencies.

32. The method of claim 31, wherein said analysis includes performing a discrete Fourier analysis of said output to derive levels of harmonic frequencies for said defect frequencies thereof, and a range of frequencies around said defect frequencies separated by frequency increments of 0.5 to 1 Hz.

33. The method of claim 20, wherein said communication signal includes data defining the network discrimination criteria, and the determination is made at the second node, which enters a low-power sleep mode responsive to the determination that the sensor data value does not satisfy the discrimination criteria.

34. The method of claim 20, wherein the discrimination criteria is a data value or a range of data values to which the sensor data value is compared.

35. The method of claim 31, wherein the node has a second accelerometer sensor sensing lateral or axial acceleration of the axle, said method further comprising
analyzing output from said second accelerometer for the presence of hunting of the wheel; and
responsive to detection of hunting, transmitting data to the locomotive node configured to alert the locomotive node of the presence of hunting.

36. A node comprising:
a mounting structure configured to be secured in engagement with a railcar wheel axle assembly so that the node turns when a wheel of the railcar wheel axle assembly turns;
a housing supported on the mounting structure, said housing supporting a generator configured to produce electrical power when the wheel turns as the railcar moves;
circuitry supported in said housing and receiving said electrical power, said circuitry including a microprocessor and a low-power wireless communication transceiver;
a sensor assembly operatively associated with the axle assembly, said sensor assembly having accelerometers detecting axial and radial accelerations of the wheel axle assembly;
the circuitry receiving electrical signals from the accelerometers, said microprocessor having memory storing software configured to cause said microprocessor to analyze said electrical signals and derive therefrom bearing condition data corresponding to a degradation condition of bearings of the associated wheel axle assembly;
a rotation sensor operatively associated with the circuitry and supplying thereto a rotation frequency signal corresponding to the rate of rotation of the wheel;
the circuitry being configured to assemble the node into a network communicating wirelessly via said low-power transceiver wherein the network is made up of nodes traveling in a train together with a locomotive node to which the nodes transmit the bearing condition data, said nodes being retained in the network only if the rotation rate of the associated wheel is consistent with the railcars moving together in said train.

37. The node of claim 36, and
said sensor assembly having a temperature sensor sensing temperature of the axle assembly, the circuitry receiving electrical signals from the temperature sensor and using said signals to determine the condition of the bearings, said circuitry triggering an alarm reaction causing an alert to be given to an operator when the electrical signals indicate that the temperature of the axle has risen sharply or has exceeded a predetermined threshold temperature indicative of imminent bearing failure.

38. The node of claim 36, and
said sensor assembly having a temperature sensor sensing temperature of the axle assembly, and a microphone sensing sound in the axle assembly, the circuitry receiving electrical signals from the temperature sensor and the microphone and using said signals to determine the condition of the bearings.

39. The node of claim 36, wherein the node is configured to go into a low-power-usage sleep state using less than 5 mW of electrical power when the generator produces a low level of electrical power indicative of the wheel ceasing to rotate, and to wake up to a higher power operational state responsive to an increase of electrical power from the generator corresponding to the wheel beginning to turn or to a wireless communication ping from another node received via the transceiver.

40. A method for monitoring a wheel assembly of a railway car, said method comprising:
providing a monitoring unit on an axle structure connected with a wheel of said assembly so that an accelerometer of said monitoring unit detects radial accelerations of said axle and transmits a data signal corresponding thereto;
obtaining accelerometer data from said data signal over a period of time while the railway car is in movement; and
analyzing said accelerometer data so as to derive data indicative of whether the wheel has a flat, or bearing condition data corresponding to a degree of degradation of a bearing of the wheel;
said analyzing comprising screening the accelerometer data for characteristics of presence of said flat or of bearing component failure;
wherein said analyzing includes determining an intensity for a set of predetermined defect frequencies for the bearing of the wheel;
wherein the determining of the intensity includes performing a Fourier analysis on the accelerometer data;
wherein the Fourier analysis on the accelerometer data is a discrete Fourier analysis directed to said set of defect frequencies; and
wherein the set of defect frequencies includes a frequency of rotation of the wheel, a cup defect frequency, a cone defect frequency and a roller defect frequency, and a frequency corresponding to the cup defect frequency minus the frequency of rotation of the wheel, a frequency corresponding to the cup defect frequency plus the frequency of rotation of the wheel, a frequency corresponding to the cone defect frequency minus the frequency of rotation of the wheel, a frequency corresponding to the cone defect frequency plus the frequency of rotation of the wheel, a frequency corresponding to the roller defect frequency minus the frequency of rotation of the wheel, and a frequency corresponding to the roller defect frequency plus the frequency of rotation of the wheel.

41. The method of claim 40 wherein the period of time in which the data is taken comprises data is at least ten revolutions of the wheel, and a predetermined number of samples are taken for the time period regardless of the rate of rotation of the wheel.

42. The method of claim 40 wherein the data signal from the accelerometer is passed through a signal conditioner that comprises a high pass filter, a rectifier, and a low pass or band pass filter filters out frequencies above about 300 Hz.

43. The method of claim 40, wherein the discrete Fourier analysis is also directed to a group of frequencies above and below said defect frequencies.

44. The method of claim 40, wherein the screening of said accelerometer data includes determining whether a peak is present for one of the defect frequencies and a second of the defect frequencies separated therefrom by the rotation frequency of the wheel.

45. The method of claim 40, wherein the group of frequencies are separated from each other by a frequency interval of 0.5 to 2 Hz.

46. The method of claim 40, wherein said analysis is performed by a microprocessor supported at the monitoring unit and the method further comprises:
transmitting said bearing conditioning data from said monitoring unit to a central computer system receiving bearing condition data from other monitoring units on other wheels of other railcars in a train of which the railcar is part.

47. The method of claim 46, wherein the bearing conditioning data is transmitted from the monitoring unit wirelessly using a low-power local communications protocol, and wherein the monitoring units of the train and the central computer system together form a network transmitting data from each monitoring unit to the central computer system using some of the monitoring units as intermediary communication nodes for monitoring units that are too distant from the central computer system to communicate directly therewith.

48. The method of claim 47, wherein the monitoring unit has a generator producing electrical power responsive to rotation of the wheel, said monitoring unit going into a low-power sleep state when the wheel stops turning, and returning to a higher-power awake state when the wheel turns again.

49. A method for monitoring a wheel assembly of a railway car, said wheel assembly having a wheel on an axle and a bearing on said axle, said method comprising:
providing a monitoring unit on the wheel assembly so that a microphone of said monitoring unit detects ultrasonic sound of said axle and transmits a data signal corresponding thereto;
obtaining acoustic data from said data signal over a period of time while the railway car is in movement; and
analyzing said acoustic data so as to derive condition data comprising flat data indicative of whether the wheel has a flat or bearing condition data corresponding to a degree of degradation of the bearing of the wheel;
said analyzing comprising screening the acoustic data for characteristics of the flat or bearing component failure; and
wherein the microphone analog signal conditioning comprises passing the output to a high-pass or band-pass filter allowing passage of frequencies of about 19.5 KHz and above, then through an amplifier with a gain of about 11, through a ½ wave rectifier and load having a time constant of approximately 0.68 ms, and then through a low-pass or band-pass filter transmitting frequencies of approximately 300 Hz or lower.

50. The method of claim 49 wherein said analyzing includes determining an intensity for a set of predetermined defect frequencies for the bearing of the wheel.

51. The method of claim 50 wherein the determining of the intensity includes performing a Fourier analysis on the acoustic data.

52. The method of claim 51 wherein the Fourier analysis on the acoustic data is a discrete Fourier analysis directed to said set of defect frequencies.

53. A method for monitoring a wheel assembly of a railway car, said wheel assembly having a wheel on an axle and a bearing on said axle, said method comprising:
providing a monitoring unit on the wheel assembly so that a microphone of said monitoring unit detects ultrasonic sound of said axle and transmits a data signal corresponding thereto;
obtaining acoustic data from said data signal over a period of time while the railway car is in movement; and
analyzing said acoustic data so as to derive condition data comprising flat data indicative of whether the wheel has a flat or bearing condition data corresponding to a degree of degradation of the bearing of the wheel;
said analyzing comprising screening the acoustic data for characteristics of the flat or bearing component failure;
wherein said analyzing includes determining an intensity for a set of predetermined defect frequencies for the bearing of the wheel;
wherein the determining of the intensity includes performing a Fourier analysis on the acoustic data;
wherein the Fourier analysis on the acoustic data is a discrete Fourier analysis directed to said set of defect frequencies; and
wherein the set of defect frequencies includes a cup defect frequency, a cone defect frequency and a roller defect frequency, and a second and third harmonic frequency of each of said frequencies.

54. The method of claim 53, wherein the discrete Fourier analysis is also directed to a group of frequencies above and below said defect frequencies and said second and third harmonics of said frequencies, said group of frequencies encompassing frequencies separated from the respective defect frequency by the frequency of rotation of the wheel.

55. The method of claim 53, wherein the screening of said acoustic data includes determining whether a peak is present for a frequency separated from one of said defect frequencies by the rotation frequency of the wheel.

56. The method of claim 53, wherein said analysis is performed by a microprocessor supported at the monitoring unit and the method further comprises:
transmitting said bearing conditioning data from said monitoring unit to a central computer system receiving bearing condition data from other monitoring units on other wheels of other railcars in a train of which the railcar is part.

57. The method of claim 56, wherein the bearing conditioning data is transmitted from the monitoring unit wirelessly using a low-power local communications protocol, and wherein the monitoring units of the train and the central computer system together form a network transmitting data from each monitoring unit to the central computer system using some of the monitoring units as intermediary communication nodes for monitoring units that are too distant from the central computer system to communicate directly therewith.

58. The method of claim 57, wherein the monitoring unit has a generator producing electrical power responsive to rotation of the wheel, said monitoring unit going into a low-power sleep state when the wheel stops turning, and returning to a higher-power awake state when the wheel turns again.

59. A method for monitoring a wheel assembly of a railway car, said wheel assembly having a wheel on an axle and a bearing on said axle, said method comprising:
providing a monitoring unit on the wheel assembly so that a microphone of said monitoring unit detects ultrasonic sound of said axle and transmits a data signal corresponding thereto;
obtaining acoustic data from said data signal over a period of time while the railway car is in movement; and
analyzing said acoustic data so as to derive condition data comprising flat data indicative of whether the wheel has a flat or bearing condition data corresponding to a degree of degradation of the bearing of the wheel;
said analyzing comprising screening the acoustic data for characteristics of the flat or bearing component failure; and
wherein the acoustic data from the microphone is analyzed so as to determine whether the output of the microphone indicates the presence of ultrasonic sound having a frequency of at least 20 kHz at an intensity above a preselected threshold and for more than a preselected period of time, and responsive to detection of said presence of said ultrasonic sound above said threshold and for more than the period of time, triggering an alert indicative of a bearing failure.

60. A node comprising:
- a mounting structure configured to be secured in engagement with a railcar wheel axle assembly so that the node turns when a wheel of the railcar wheel axle assembly turns;
- a housing supported on the mounting structure;
- circuitry supported in said housing, said circuitry including a microprocessor and a low-power wireless communication transceiver;
- a sensor assembly operatively associated with the axle assembly, said sensor assembly having accelerometers detecting accelerations of the wheel axle assembly;
- the circuitry receiving electrical signals from the accelerometers, said microprocessor having memory storing software configured to cause said microprocessor to analyze said electrical signals and derive therefrom bearing condition data corresponding to a degradation condition of bearings of the associated wheel axle assembly;
- the circuitry being configured to assemble the node into a network communicating wirelessly via said low-power transceiver wherein the network is made up of nodes traveling in a train of railcars together with a locomotive node to which the nodes transmit the bearing condition data, said nodes being retained in the network only where each node determines that the respective railcar thereof is moving with the railcars together in said train.

61. The node of claim 60, and
said sensor assembly having a temperature sensor sensing temperature of the axle assembly, the circuitry receiving electrical signals from the temperature sensor and using said signals to determine the condition of the bearings, said circuitry triggering an alarm reaction causing an alert to be given to an operator when the electrical signals indicate that the temperature of the axle has risen sharply or has exceeded a predetermined threshold temperature indicative of imminent bearing failure.

62. The node of claim 60, wherein the accelerometers of said sensor assembly detect axial and radial accelerations of the wheel axle assembly.

63. The node of claim 60, wherein said sensor assembly has a microphone sensing sound in the axle assembly, the circuitry receiving electrical signals from the microphone and using said signals to determine the condition of the bearings.

64. The node of claim 60, wherein said node determines that the respective railcar thereof is moving with the railcars together in said train based on an indication of velocity of the respective railcar.

65. The node of claim 60, wherein the mounting structure is configured to be secured in engagement with an axial end of an axle assembly of the railcar wheel axle assembly.

66. The node of claim 60, wherein the mounting structure is configured to engage securingly to an axle cap on the end of the axial end of the axle assembly.

* * * * *